US012684277B2

(12) United States Patent
Zhang et al.

(10) Patent No.: US 12,684,277 B2
(45) Date of Patent: Jul. 14, 2026

(54) EARPHONES

(71) Applicant: SHENZHEN SHOKZ CO., LTD., Shenzhen (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 203 days.

(21) Appl. No.: 18/499,199

(22) Filed: Oct. 31, 2023

(65) Prior Publication Data

US 2024/0147113 A1 May 2, 2024

Related U.S. Application Data

(63) Continuation of application No. PCT/CN2023/083545, filed on Mar. 24, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 25/00* (2006.01)
*H04R 1/10* (2006.01)
(Continued)

(52) U.S. Cl.
CPC ........... *H04R 1/1008* (2013.01); *H04R 1/105* (2013.01); *H04R 1/1075* (2013.01); *H04R 1/345* (2013.01); *H04R 9/025* (2013.01); *H04R 9/06* (2013.01)

(58) Field of Classification Search
CPC .... H04R 1/1008; H04R 1/1016; H04R 1/105; H04R 1/1075; H04R 1/345; H04R 9/025;
(Continued)

(56) References Cited

U.S. PATENT DOCUMENTS

2007/0009133 A1 1/2007 Gerkinsmeyer
2020/0196062 A1 6/2020 Zhang
(Continued)

FOREIGN PATENT DOCUMENTS

CN 110958526 A 4/2020
CN 212909891 U 4/2021
(Continued)

OTHER PUBLICATIONS

Notice of Rejection in Japanese Application No. 2024-550245 mailed on Sep. 2, 2025, 8 pages.

*Primary Examiner* — Phylesha Dabney
(74) *Attorney, Agent, or Firm* — Metis IP LLC

(57) ABSTRACT

The present disclosure provides an earphone including a sound production component and an ear hook which is configured to place the sound production component at a position near an ear canal but not blocking the ear canal. The sound production component and an auricle have a first projection and a second projection on a sagittal plane, respectively, and a centroid of the first projection has a first distance from a highest point of the second projection in a vertical axis direction. A ratio of the first distance to a height of the second projection in the vertical axis direction is in a range of 0.25-0.6, and a ratio of a distance from a center of
(Continued)

a sound outlet provided on an inner side surface to a lower side surface of the sound production component to a short-axis dimension of the sound production component is in a range of 0.25-0.50.

20 Claims, 19 Drawing Sheets

(30) Foreign Application Priority Data

| | | | |
|---|---|---|---|
| Dec. 30, 2022 | (WO) | ................ | PCT/CN2022/144339 |
| Mar. 2, 2023 | (WO) | ................ | PCT/CN2023/079409 |
| Mar. 2, 2023 | (WO) | ................ | PCT/CN2023/079410 |

(51) Int. Cl.

| | |
|---|---|
| ***H04R 1/34*** | (2006.01) |
| ***H04R 9/02*** | (2006.01) |
| ***H04R 9/06*** | (2006.01) |

(58) Field of Classification Search

CPC .......... H04R 9/06; H04R 1/02; H04R 1/2811; H04R 1/2873; H04R 2201/10; H04R 2201/105; H04R 2400/11; H04R 2460/09; H04R 2460/11; H04R 2460/13

USPC .......................................................... 381/381

See application file for complete search history.

(56) References Cited

U.S. PATENT DOCUMENTS

| | | | | |
|---|---|---|---|---|
| 2020/0322712 | A1 | 10/2020 | Williams et al. | |
| 2021/0067857 | A1 | 3/2021 | Struzik | |
| 2022/0124428 | A1 | 4/2022 | Zheng et al. | |
| 2023/0082738 | A1 | 3/2023 | Zheng et al. | |
| 2023/0130211 | A1 | 4/2023 | Li et al. | |
| 2023/0179907 | A1 | 6/2023 | Zhang et al. | |
| 2024/0007804 | A1* | 1/2024 | Qi ............................ | G10K 9/13 |
| 2024/0107219 | A1 | 3/2024 | He | |

FOREIGN PATENT DOCUMENTS

| | | | |
|---|---|---|---|
| CN | 214014497 | U | 8/2021 |
| CN | 113542956 | A | 10/2021 |
| CN | 113556638 | A | 10/2021 |
| CN | 113573215 | A | 10/2021 |
| CN | 214799830 | U | 11/2021 |
| CN | 215682610 | U | 1/2022 |
| CN | 114286228 | A | 4/2022 |
| CN | 114286236 | A | 4/2022 |
| CN | 216357224 | U | 4/2022 |
| CN | 216649963 | U | 5/2022 |
| CN | 115175069 | A | 10/2022 |
| JP | 2001326986 | A | 11/2001 |
| JP | 2013106130 | A | 5/2013 |

* cited by examiner

EARPHONES

CROSS-REFERENCE TO RELATED APPLICATIONS

This application is a continuation of International Patent Application No. PCT/CN2023/083545, filed on Mar. 24, 2023, which claims priority of Chinese Patent Application No. 202211336918.4, filed on Oct. 28, 2022, Chinese Patent Application No. 202223239628.6, filed on Dec. 1, 2022, International Patent Application No. PCT/CN2022/144339, filed on Dec. 30, 2022, International Patent Application No. PCT/CN2023/079409, filed on Mar. 2, 2023, and International Patent Application No. PCT/CN2023/079410, filed on Mar. 2, 2023, the entire contents of each of which are hereby incorporated by reference.

TECHNICAL FIELD

The present disclosure relates to the field of acoustic technology, specifically relating to an earphone.

BACKGROUND

With the development of acoustic output technology, acoustic devices (e.g., headphones) have been widely used in people's daily lives, and can be used in conjunction with electronic devices such as cell phones and computers to provide users with an auditory feast. Acoustic devices can generally be classified into an in-ear type, a head-mounted type, and an ear-hook type according to the ways the users wear them.

Therefore, it is necessary to provide an earphone that can improve the wearing comfort of users and have good output performance.

SUMMARY

One embodiment of the present disclosure provides an earphone which includes a sound production component and an ear hook. The sound production component includes a transducer and a housing accommodating the transducer. In a wearing state, the ear hook is configured to place the sound production component at a position near an ear canal but not blocking the ear canal. The sound production component is provided with a sound outlet on an inner side surface facing an auricle for guiding a sound generated by the transducer out of the housing and to the ear canal. The sound production component and the auricle have a first projection and a second projection on a sagittal plane, respectively. A centroid of the first projection has a first distance from a highest point of the second projection in a vertical axis direction. A ratio of the first distance to a height of the second projection in the vertical axis direction is in a range of 0.25-0.6, and a ratio of a distance from a center of the sound outlet to a lower side surface of the sound production component to a short-axis dimension of the sound production component is in a range of 0.25-0.50.

In some embodiments, the ratio of the distance from the center of the sound outlet to the lower side surface of the sound production component to the short-axis dimension of the sound production component is in a range of 0.35-0.40.

In some embodiments, the centroid of the first projection has a second distance from an end point of the second projection in a sagittal axis direction. A ratio of the second distance to a width of the second projection in the sagittal axis direction is in a range of 0.4-0.7, and a ratio of a distance from the center of the sound outlet to a rear side surface of the sound production component to a long-axis dimension of the sound production component is in a range of 0.35-0.60.

In some embodiments, in the wearing state, a distance between a projection point of the center of the sound outlet on the sagittal plane and a centroid of a projection of an ear canal opening of the ear canal on the sagittal plane is in a range of 2.2 mm-3.8 mm.

In some embodiments, in a non-wearing state, an inclination angle of an outer side surface or the inner side surface of the sound production component relative to an ear hook plane is in a range of 15°-23°.

In some embodiments, in the wearing state, an inclination angle of the outer side surface or the inner side surface of the sound production component relative to an auricle plane is in a range of 40°-60°.

In some embodiments, the transducer includes a magnetic circuit assembly. The magnetic circuit assembly is used to provide a magnetic field, and a distance from the center of the sound outlet to a long-axis center plane of the magnetic circuit assembly is in a range of 1.45 mm-2.15 mm.

In some embodiments, in the wearing state, a ratio of a distance between a projection point of the center of the sound outlet on the sagittal plane and a projection point of a midpoint of an upper boundary of the sound production component's inner side surface on the sagittal plane to a distance between the projection point of the midpoint of the upper boundary of the sound production component's inner side surface on the sagittal plane and a projection point of an upper vertex of the ear hook on the sagittal plane is in a range of 0.35-0.60.

In some embodiments, in the wearing state, a ratio of a distance between a projection point of the center of the sound outlet on the sagittal plane and a projection point of a midpoint of a lower boundary of the sound production component's inner side surface on the sagittal plane to a distance between the projection point of the midpoint of the lower boundary of the sound production component's inner side surface on the sagittal plane and a projection point of an upper vertex of the ear hook on the sagittal plane is in a range of 6.1-9.6.

In some embodiments, a distance between a projection point of a midpoint of an upper boundary of the sound production component's inner side surface on the sagittal plane and a centroid of a projection of an ear canal opening of the ear canal on the sagittal plane is in a range of 12 mm-18 mm, and/or a distance between the centroid of the first projection and the centroid of the projection of the ear canal opening on the sagittal plane is in a range of 10 mm-16 mm.

In some embodiments, a distance between a projection point of a ⅓ point of a lower boundary of the sound production component's inner side surface on the sagittal plane and a centroid of a projection of an ear canal opening of the ear canal on the sagittal plane is in a range of 1.7 mm-2.7 mm, and/or a distance between the centroid of the first projection and the centroid of the projection of the ear canal opening on the sagittal plane is in a range of 10 mm-16 mm.

In some embodiments, in the wearing state, a ratio of a distance between the center of the sound outlet and an upper vertex of the ear hook to the short-axis dimension of the sound production component is in a range of 1.2-2.2.

In some embodiments, in the wearing state, a ratio of a distance between a projection point of the center of the sound outlet on the sagittal plane and a projection point of the upper vertex of the ear hook on the sagittal plane to a short-axis dimension of the first projection is in a range of 1.7-2.6.

In some embodiments, in the wearing state, a ratio of a distance between the center of the sound outlet and an upper vertex of the ear hook to a distance from the center of the sound outlet to the sound production component's upper side surface is in a range of 1.90-2.95.

In some embodiments, in the wearing state, a ratio of a distance between a projection point of the center of the sound outlet on the sagittal plane and a projection point of the upper vertex of the ear hook on the sagittal plane to a distance from the projection point of the center of the sound outlet on the sagittal plane to a projection of the sound production component's upper side surface on the sagittal plane is in a range of 2.8-4.3.

In some embodiments, in the wearing state, a ratio of a distance between the center of the sound outlet and an upper vertex of the ear hook to a distance between the center of the sound outlet and a midpoint of an upper boundary of the sound production component's inner side surface is in a range of 1.8-2.8.

In some embodiments, in the wearing state, a ratio of a distance between a projection point of the center of the sound outlet on the sagittal plane and a projection point of the upper vertex of the ear hook on the sagittal plane to a distance between the projection point of the center of the sound outlet on the sagittal plane and a projection point of the midpoint of the upper boundary of the sound production component's inner side surface on the sagittal plane is in a range of 1.75-2.70.

In some embodiments, in the wearing state, a ratio of a distance between the center of the sound outlet and an upper vertex of the ear hook to a distance between the center of the sound outlet and a ⅓ point of a lower boundary of the sound production component's inner side surface is in a range of 4.9-7.5.

In some embodiments, in the wearing state, a ratio of a distance between a projection point of the center of the sound outlet on the sagittal plane and a projection point of the upper vertex of the ear hook on the sagittal plane to a distance between the projection point of the center of the sound outlet on the sagittal plane and a projection point of the ⅓ point of the lower boundary of the sound production component's inner side surface on the sagittal plane is in a range of 4.8-7.4.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein.

DETAILED DESCRIPTION

Figure 1:
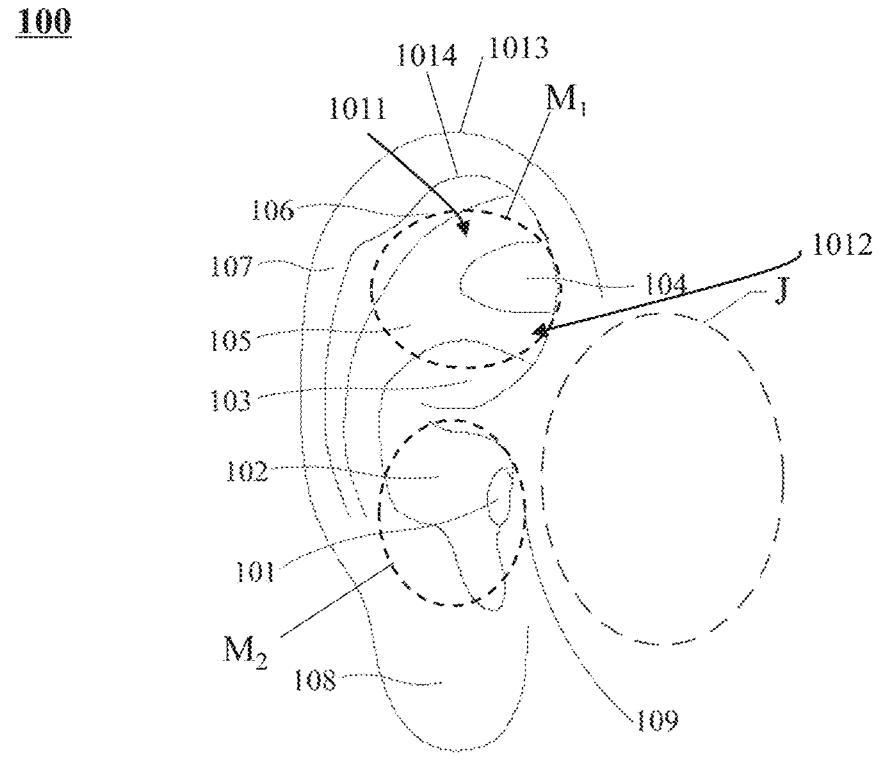
FIG. 1 is a schematic diagram illustrating an exemplary ear according to some embodiments of the present disclosure.

To better illustrate the technical aspects of the embodiments of the present application, a brief introduction to the drawings required for the description of the embodiments will be provided below. It is evident that the drawings described below are merely examples or embodiments of the present application. Those skilled in the art may apply the present disclosure to other similar scenarios without exercising inventive effort based on these drawings, unless it is explicitly stated or apparent from the context. Unless otherwise specified, the same reference numerals in the drawings represent the same structures or operations.

FIG. 1 is a schematic diagram illustrating an exemplary ear according to some embodiments of the present disclosure. As shown in FIG. 1, an ear 100 may include an external ear canal 101, a cavum concha 102, a cymba concha 103, a triangular fossa 104, an antihelix 105, a scapha 106, a helix 107, an earlobe 108, a helix foot 109, an outer contour 1013, and an inner contour 1014. It should be noted that, for ease of description, in some embodiments of the present disclosure, a superior crus of antihelix 1011, an inferior crus of antihelix 1012, and the antihelix 105 are collectively referred to as an antihelix region. In some embodiments, one or more parts of the ear 100 may be used to support an acoustic device for stable wearing to achieve stable wearing of the acoustic device. In some embodiments, parts of the ear 100 such as the external ear canal 101, the cavum concha 102, the cymba concha 103, the triangular fossa 104, etc., have a certain depth and volume in the three-dimensional space, which may be used to meet wearing requirements of the acoustic device. For example, the acoustic device (e.g., an in-ear earphone) may be worn in the external ear canal 101. In some embodiments, the wearing of the acoustic device may be achieved with the aid of other parts of the ear 100 other than the external ear canal 101. For example, the wearing the acoustic device may be achieved with the aid of the cymba concha 103, the triangular fossa 104, the antihelix 105, the scapha 106, the helix 107, or a combination thereof. In some embodiments, to improve the comfort and reliability of the acoustic device in wearing, parts such as a user's earlobe 108 may also be used. By utilizing parts of the ear 100 other than the external ear canal 101 for the wearing of the acoustic device and the transmission of sound, the user's external ear canal 101 may be "liberated." When the user wears the acoustic device, the acoustic device does not block the external ear canal 101 of the user, and the user may receive both sounds from the acoustic device and sounds from the environment (e.g., horn sounds, car bells, surrounding voices, traffic commands, etc.), thereby reducing the probability of traffic accidents. In the present disclosure, the acoustic device that does not block the user's external ear canal 101 (or ear canal or ear canal opening) when worn by the user may be referred to as an open earphone. In some embodiments, the acoustic device may be designed to adapt to the ear 100 according to the construction of the ear 100 to enable a sound production component of the acoustic device to be worn at various positions of the ear. For example, when the acoustic device is an open earphone, the open earphone may include a suspension structure (e.g., an ear hook) and a sound production component. The sound production component is physically connected to the suspension structure. The suspension structure may be matched to a shape of an auricle to place an entire or partial structure of the sound production component at a front side of the helix foot 109 (e.g., a region J enclosed by the dashed line in FIG. 1). As another example, when the user wears the open earphone, the entire or partial structure of the sound production component may be in contact with an upper part of the external ear canal 101 (e.g., a location where one or more parts such as the helix foot 109, the cymba concha 103, the triangular fossa 104, the antihelix 105, the scapha 106, or the helix 107, etc., are located). As yet another example, when the user wears the open earphone, the entire or partial structure of the sound production component may be located in a cavity (e.g., the region $M_1$ enclosed by the dashed line in FIG. 1 containing at least the cymba concha 103 and the triangular fossa 104 and the region $M_2$ containing at least the cavum concha 102) formed by one or more parts (e.g., the cavum concha 102, the cymba concha 103, the triangular fossa 104, etc.) of the ear 100.

Different users may have individual differences, resulting in different shapes, dimensions, etc., of ears. For ease of description and understanding, unless otherwise specified, the present disclosure primarily uses an ear model with a "standard" shape and dimension as a reference and further describes the wearing manners of the acoustic device in different embodiments on the ear model. For example, a simulator (e.g., GRAS KEMAR, HEAD Acoustics, B&K 4128 series, or B&K 5128 series) with a head and (left and right) ears, produced based on standards such as ANSI: S3.36, S3.25, and IEC: 60318-7, may be used as a reference for wearing the acoustic devices to present a scenario in which most users wear the acoustic device normally. Taking GRAS KEMAR as an example, the simulator of the ear may be any one of GRAS 45AC, GRAS 45BC, GRAS 45CC, GRAS 43AG, etc. Taking HEAD Acoustics as another example, the simulator of the ear may be any one of HMS II.3, HMS II.3 LN, HMS II.3LN HEC, etc. It should be noted that a data range obtained in the embodiments of the present disclosure is obtained based on GRAS 45BC KEMAR, but it should be understood that there may be differences between different head and ear models, and ranges of relevant data may fluctuate within ±10% when using other models. Merely by way of example, an ear model used for reference may have the following relevant features: a projection of the auricle on a sagittal plane may have a dimension in a range of 55 mm to 65 mm in a vertical axis direction, and a projection of the auricle on the sagittal plane may have a dimension in a range of 45 mm to 55 mm in a sagittal axis direction. The projection of the auricle on the sagittal plane refers to a projection of an edge of the auricle on the sagittal plane. The edge of the auricular is composed of at least an outer contour of the helix, a contour of the earlobe, a contour of the tragus, an intertragic notch, an antitragic apex, an antihelix-antitragus notch, etc. Thus, in the present disclosure, the descriptions such as "worn by the user," "in the wearing state," and "under the wearing state" may refer to the acoustic device described in the present disclosure being worn on the ear of the aforementioned simulator. Of course, considering that different users have individual differences, the structure, shape, dimension, thickness, etc., of one or more parts of the ear 100 may be somewhat different. In order to meet the needs of different users, the acoustic device may be designed differently, and these differential designs may be manifested as feature parameters of one or more parts of the acoustic device (e.g., a sound production component, an ear hook, etc., in the following descriptions) having different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the "front side of the ear" as described in the present disclosure refers to a side facing a facial region of the human body in a direction along the coronal axis of the human body. In this case, observing the ear of the above simulator in a direction along the coronal axis of the human body, a schematic diagram illustrating the front side of the ear as shown in FIG. 1 is obtained.

The description of the ear 100 above is provided for illustrative purposes and is not intended to limit the scope of the present disclosure. Those skilled in the art may make various changes and modifications based on the description of the present disclosure. For example, certain structures of the acoustic device may shield a portion or all of the external ear canal 101. These changes and modifications are still within the scope of protection of the present disclosure.

Figure 2:
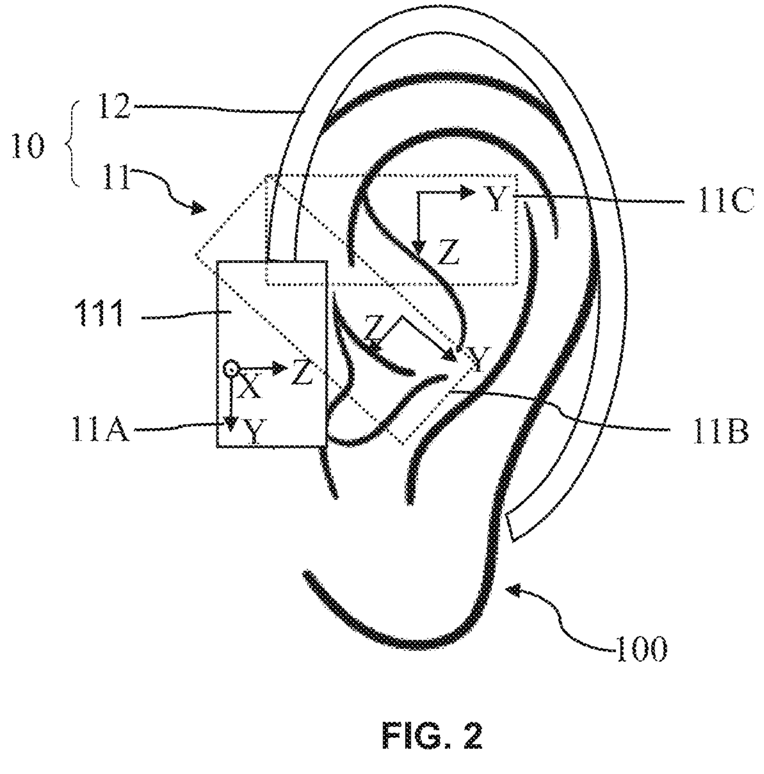
FIG. 2 is a schematic diagram illustrating an exemplary wearing state of an open earphone according to some embodiments of the present disclosure.
Figure 3A:
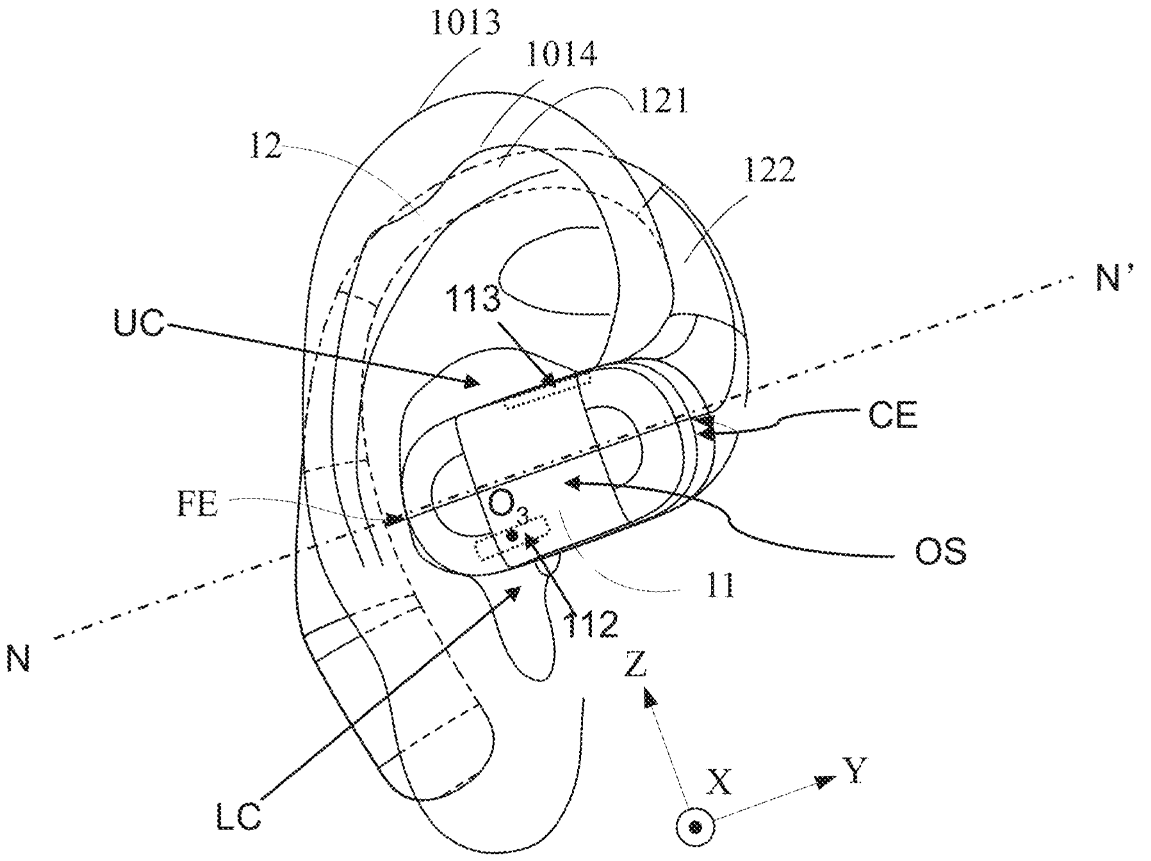
FIG. 3A is a schematic diagram illustrating an exemplary wearing manner of an open earphone where a sound production component extends into a cavum concha according to some embodiments of the present disclosure.

FIG. 2 is a schematic diagram illustrating an exemplary wearing state of an open earphone according to some embodiments of the present disclosure. As shown in FIG. 2, an open earphone 10 may include a sound production component 11 and a suspension structure 12. In some embodiments, the open earphone 10 may enable the sound production component 11 to be worn on a user's body (e.g., the head, the neck, or the upper torso of the body) through the suspension structure 12. In some embodiments, the suspension structure 12 may be an ear hook, with one end connected to the sound production component 11. The ear hook may be configured in a shape that matches a user's ear. For example, the ear hook may have an arc-shaped structure, with one end connected to the sound production component 11, and the other end extending along a junction of the user's ear and head. In some embodiments, the suspension structure 12 may also be a clamp structure that matches the shape of the user's auricle to allow the suspension structure 12 to be clamped onto the user's auricle. Exemplarily, the ear hook 12 may include a hook-shaped portion (a first portion 121 as shown in FIG. 3A) and a connecting portion (a second portion 122 as shown in FIG. 3A) connected sequentially. The connecting portion connects the hook-shaped portion to the sound production component 11, so that the open earphone 10 is curved in the three-dimensional space when the open earphone 10 is in a non-wearing state (i.e., a natural state). In other words, in the three-dimensional space, the hook-shaped portion, the connecting portion, and the sound production component 11 are not coplanar. In such cases, when the open earphone 10 is in the wearing state, the hook portion may be primarily for hanging between a rear side of the user's ear and the head, and the sound production component 11 may be primarily for contacting a front side of the user's ear, thereby allowing the sound production component 11 and the hook portion to cooperate to clamp the ear. Exemplarily, the connecting portion may extend from the head toward an outside of the head and cooperate with the hook portion to provide a compression force on the front side of the ear for the sound production component 11. The sound production component 11 may specifically be pressed against an area where a part such as the cavum concha 102, the cymba concha 103, the triangular fossa 104, the antihelix 105, etc., is located under the compression force so that the external ear canal 101 of the ear is not obscured when the open earphone 10 is in the wearing state. In some embodiments, the suspension structure 12 may include, but is not limited to, the ear hook, an elastic band, etc., to enable the open earphone 10 to be better hung on the user's body, thereby preventing it from falling off during use.

In some embodiments, the sound production component 11 may be worn on the user's body and may include a housing 111. The housing 111 may be connected to the suspension structure 12 (e.g., the ear hook). Inside the housing 111, there may be a transducer to generate a sound to input into the user's ear 100. In some embodiments, the open earphone 10 may be combined with a product such as glasses, a head-worn earphone, a head-worn display device, an AR/VR helmet, etc. In this case, the sound production component 11 may be worn near the user's ear 100 using a suspension or a clamping manner. In some embodiments, the sound production component 11 may be circular, elliptical, polygonal (regular or irregular), U-shaped, V-shaped, semi-circular, etc., so that the sound production component 11 may be directly hung on the user's ear 100.

Referring to FIG. 1 and FIG. 2, in some embodiments, when the user wears the open earphone 10, at least a portion of the sound production component 11 may be located in a region J at a front side of the tragus of the user's ear 100 or in regions $M_1$ and $M_2$ at a front outer side of the auricle, as shown in FIG. 1. The following may provide illustrative explanations in the context of different wearing positions (11A, 11B, and 11C) of the sound production component 11. It should be noted that in the embodiments of the present disclosure, the front outer side of the auricle refers to a side of the auricle that deviates from the head along a direction of a coronal axis. Correspondingly, a rear inner side of the auricle refers to a side of the auricle that faces towards the head in a direction of the coronal axis. In some embodiments, the sound production component 11A is located at a side of the user's ear 100 towards the facial region of the human body in the sagittal axis direction, i.e., the sound production component 11A is located in the region J of the facial region of the human body on the front side of the ear 100. Further, the housing 111 of the sound production component 11A is internally equipped with a transducer, and the housing 111 of the sound production component 11A may be equipped with a sound outlet (not shown in FIG. 2). The sound outlet may be located on a side wall (e.g., an inner side surface IS as described later) of the housing of the sound production component 11 that faces or near the user's external ear canal 101, to export the sound generated by the transducer from the housing 111 to the external ear canal 101, thereby allowing the user to hear the sound. In some embodiments, the transducer may include a diaphragm, and an interior of the housing 111 of the sound production component 11 may be divided into a front cavity and a rear cavity by the diaphragm. The sound outlet is acoustically coupled to the front cavity. The vibration of the diaphragm drives air in the front cavity to vibrate and generate an air-conducted sound. The air-conducted sound generated in the front cavity propagates to an external environment through the sound outlet. In some embodiments, a portion of the sound exported through the sound outlet may propagate into the ear canal, thereby allowing the user to hear the sound, and another portion thereof may be transmitted with the sound reflected by the ear canal through a gap between the sound production component 11 and the ear (e.g., a portion of the cavum concha not covered by the sound production component 11) to the outside of the open earphone 10 and the ear, thereby creating a first leakage sound in the far-field. Meanwhile, the other side of the housing 111 (e.g., a side adjacent to or opposite the side wall where the sound outlet is located) generally has one or more pressure relief holes (not shown) which are acoustically coupled to the rear cavity. The vibration of the diaphragm simultaneously drives the air in the rear cavity to vibrate and generate an air-conducted sound. The air-conducted sound generated in the rear cavity may be propagated to the external environment through the one or more pressure relief holes. The one or more pressure relief holes are further away from the ear canal than the sound outlet, and the sound propagated through the one or more pressure relief holes generally forms a second leakage sound in the far-field. An intensity of the first leakage sound and an intensity of the second leakage sound are approximately equal, and the first leakage sound and the second leakage sound have a phase difference (e.g., opposite or substantially opposite in phase), so that the first leakage sound and the second leakage sound can cancel each other out in the far-field, which is conducive to reducing the leakage of the open earphone 10 in the far-field. As an illustrative example, in some embodiments, the sound outlet may be located on a side wall of the housing of the sound production component 11 facing the user's external ear canal 101, and the one or more pressure relief holes may be located on a side of the housing of the sound production component 11 away from the user's external ear canal 101. In this case, the housing may act as a baffle and increase a sound path difference from the sound outlet and the one or more pressure relief holes to the external ear canal 101, thus increasing the sound intensity at the external ear canal 101 and reducing a volume of the far-field leakage sound.

In some embodiments, the sound production component 11 may have a long-axis direction Y and a short-axis direction Z that are orthogonal to each other and perpendicular to a thickness direction X. The long-axis direction Y may be defined as a direction (e.g., when a projection shape is a rectangle or an approximate rectangle, the long-axis direction may be a direction of a length of the rectangle or the approximate rectangle) having a maximum extension dimension in a shape of a two-dimensional projection plane (e.g., a projection of the sound production component 11 on a plane where an outer side surface of the sound production component 11 is located, or a projection of the sound production component 11 on the sagittal plane) of the sound production component 11, and the short-axis direction Z may be defined as a direction (e.g., when a projection shape is a rectangle or an approximate rectangle, the short-axis direction is a direction of a width of the rectangle or approximate rectangle) that is perpendicular to the long-axis direction Y in the shape of the projection of the sound production component 11 on the sagittal plane. The thickness direction X may be defined as a direction perpendicular to the two-dimensional projection plane, for example, which is consistent with a direction of the coronal axis, both pointing to the left and right directions of the human body. In some embodiments, in the wearing state, when the sound production component 11 is in an inclined state, the long-axis direction Y and the short-axis direction Z are still parallel or approximately parallel to the sagittal plane. The long-axis direction Y may have a certain included angle with the sagittal axis, i.e., the long-axis direction Y is inclined accordingly. The short-axis direction Z may have a certain included angle with the vertical axis, i.e., the short-axis direction Z is inclined accordingly. This is exemplified by the wearing position of the sound production component 11B as shown in FIG. 2. In some embodiments, the entire or partial structure of the sound production component 11B may extend into the cavum concha, in other words, the projection of the sound production component 11B on the sagittal plane has an overlapped portion with the projection of the cavum concha on the sagittal plane. Specific details about the sound production component 11B may be found elsewhere in the present disclosure, such as FIG. 3A and the corresponding description. In some embodiments, in the wearing state, the sound production component 11 may also be in a horizontal state or an approximate horizontal state, as shown by the sound production component 11C in FIG. 2. The long-axis direction Y may be consistent with or approximately consistent with the sagittal axis, both pointing to the anterior-posterior direction of the human body, and the short-axis direction Z may be consistent with or approximately consistent with the vertical axis, both pointing to the up-down direction of the human body. It should be noted that in the wearing state, the sound production component 11C being in an approximate horizontal state may mean that the included angle between the long-axis direction Y of the sound production component 11C and the sagittal axis falls within a specific range (e.g., not greater than 20°). Furthermore, the wearing position of the sound production component 11 is not limited to the sound production component 11A, the sound production component 11B, and the sound production component 11C as shown in FIG. 2. The sound production component 11 may be located in any position as long as it is in the regions J, $M_1$, or $M_2$ as shown in FIG. 1. For example, the entire or partial structure of the sound production component 11 may be located within the region J enclosed by the dashed lines in FIG. 1. As another example, the entire or partial structure of sound production component 11 may be in contact with one or more positions of the ear 100, such as the helix foot 109, the cymba concha 103, the triangular fossa 104, the antihelix 105, the scapha 106, or the helix 107. As yet another example, the entire or partial structure of the sound production component 11 may be located within cavities (e.g., the region $M_1$ enclosed by the dashed line in FIG. 1 containing at least the cymba concha 103 and the triangular fossa 104 and the region $M_2$ containing at least the cavum concha 102) formed by one or more parts (e.g., the cavum concha 102, the cymba concha 103, the triangular fossa 104, etc.) of the ear 100.

In order to improve the stability of the open earphone 10 in the wearing state, the open earphone 10 may adopt any one or a combination of the following configurations. First, at least part of the suspension structure 12 may be configured as a profiling structure that fits at least one of the rear inner side of the auricle and the head, to increase a contact area between the suspension structure 12 and the ear and/or the head, thereby increasing the resistance of the acoustic device 10 falling off from the ear. Second, at least part of the suspension structure 12 may be configured as an elastic structure, so that the suspension structure 12 may have a certain amount of deformation in the wearing state, to increase the positive pressure of the suspension structure 12 on the ear and/or the head, thereby increasing the resistance of the open earphone 10 falling off from the ear. Third, at least part of the suspension structure 12 may be configured to abut against the ear and/or the head in the wearing state, to form a counteracting force that presses against the ear and make the sound production component 11 press against the front outer side (e.g., the regions $M_1$ and $M_2$ shown in FIG. 1) of the auricle, thereby increasing the resistance of the open earphone 10 falling off from the ear. Fourth, the sound production component 11 and the suspension structure 12 may be configured to clamp the antihelix region, the cavum concha region, etc., from the front outer side and the rear inner side of the auricle in the wearing state, thereby increasing the resistance of the open earphone 10 falling off from the ear. Fifth, the sound production component 11 or a structure connected thereto may be configured to at least partially extend into cavities such as the cavum concha 102, the cymba concha 103, the triangular fossa 104, and the scapha 106, thereby increasing the resistance of the open earphone 10 falling off from the ear.

Figure 3B:
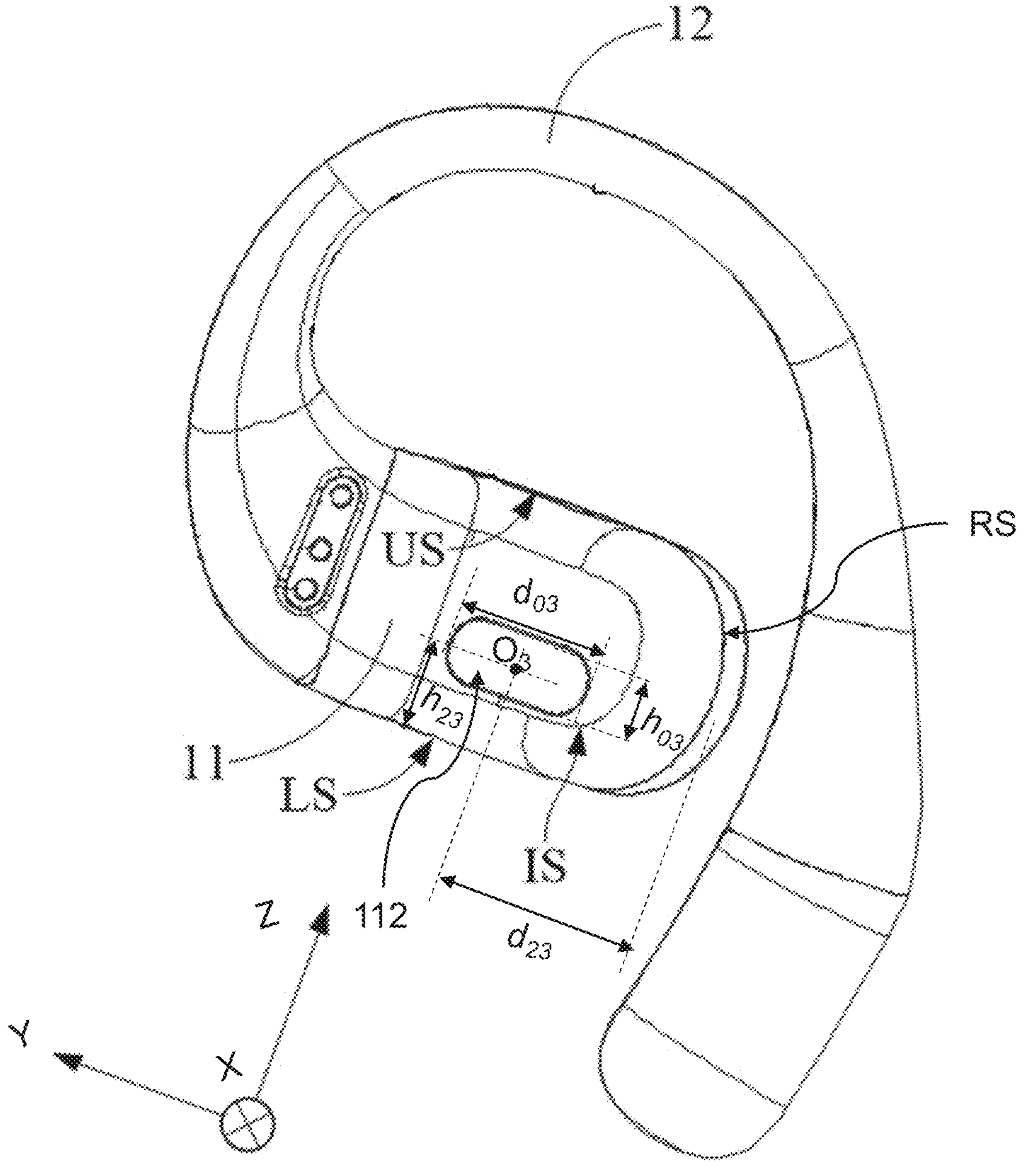
FIG. 3B is a schematic diagram illustrating a structure of the open earphone as shown in FIG. 3A facing towards the ear.
Figure 4:
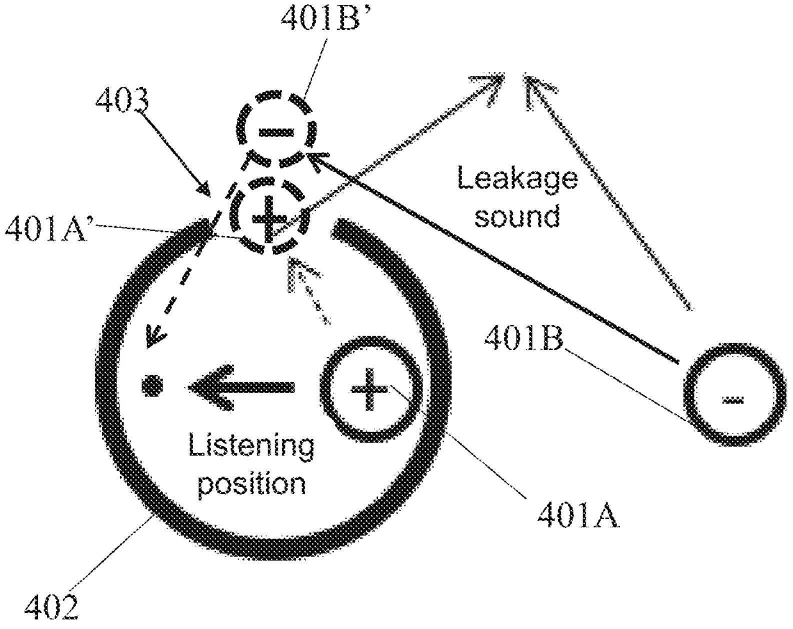
FIG. 4 is a schematic diagram illustrating an acoustic model of a cavity-like structure according to some embodiments of the present disclosure.

FIG. 3A is a schematic diagram illustrating an exemplary wearing manner of an open earphone where a sound production component extends into a cavum concha according to some embodiments of the present disclosure. FIG. 3B is a schematic diagram illustrating a structure of the open earphone as shown in FIG. 3A facing towards the ear. FIG. 4 is a schematic diagram illustrating an acoustic model of a cavity-like structure according to some embodiments of the present disclosure.

Exemplarily, as shown in FIG. 3A, the sound production component 11 (or the housing 111 of the sound production component 11) may have a connecting end CE connected to the suspension structure 12 and a free end FE not connected to the suspension structure 12. The suspension structure 12 is an ear hook. When the open earphone 10 is in the wearing state, a first portion 121 of the ear hook hangs between the user's auricle (e.g., the helix 107) and the head, and the free end FE of the sound production component 11 faces the first portion 121 of the ear hook. A second portion 122 of the ear hook extends toward a side of the auricle away from the head and connects to the connecting end CE of the sound production component 11 to place the sound production component 11 at a position near the ear canal without blocking it. In the wearing state, the free end FE of the sound production component 11 may extend into the cavum concha. Optionally, the sound production component 11 and the suspension structure 12 (e.g., the ear hook) may be configured to jointly clamp an ear region corresponding to the cavum concha from front and rear sides of the aforementioned ear region, thereby increasing the resistance of the open earphone 10 falling off from the ear, and further improving the stability of the open earphone 10 in the wearing state. For example, the free end FE of the sound production component 11 presses against the cavum concha in the thickness direction X. As another example, the free end FE may abut against the cavum concha in the long-axis direction Y and/or the short-axis direction Z (e.g., abutting against an inner wall of the cavum concha corresponding to the free end FE). It should be noted that the free end FE of the sound production component 11 refers to an end of the sound production component 11 opposite to the connecting end CE of the sound production component 11, which is also referred to as the free end. The sound production component 11 may be a regular or an irregular structure, and for illustrative purposes, the present disclosure provides some examples to further illustrate the end FE of the sound production component 11. For example, when the sound production component 11 is a cuboid structure, an end wall surface of the sound production component 11 is a plane, and in this case, the end FE of the sound production component 11 refers to an end side wall opposite to the connecting end CE of the sound production component 11 that is connected to the suspension structure 12. As another example, when the sound production component 11 is a sphere, an ellipsoid, or an irregular structure, the free end FE of the sound production component 11 may refer to a specific region away from the connecting end CE obtained by cutting the sound production component 11 along an X-Z plane (a plane formed by the short-axis direction Z and the thickness direction X). A ratio of a dimension of the specific region along the long-axis direction Y to a dimension of the sound production component along the long-axis direction Y may be in a range of 0.05-0.2.

Referring to FIG. 3A and FIG. 3B, the sound production component 11 may have an inner side surface IS (also referred to as an inner side surface of the housing 111) that faces the ear along the thickness direction X in the wearing state and an outer side surface OS (also referred to as an outer side surface of the housing 111) that faces away from the ear, and a connection surface connecting the inner side surface IS and outer side surface OS. It should be noted that in the wearing state, when viewed along a direction in which the coronal axis is located (i.e., in the thickness direction X), the sound production component 11 may be set in a shape of a circle, an ellipse, a rounded square, a rounded rectangle, or the like. When the sound production component 11 is set in the shape of the circle, the ellipse, etc., the above-mentioned connection surface may refer to an arc-shaped side surface of the sound production component 11; and when the sound production component 11 is set in the shape of the rounded square, the rounded rectangle, etc., the above-mentioned connection surface may include a lower side surface LS (also referred to as a lower side surface of the housing 111), an upper side surface US (also referred to as an upper side surface of the housing 111), and a rear side surface RS (also referred to as a rear side surface of the housing 111) as mentioned later. The upper side surface US and the lower side surface LS may refer to a side of the sound production component 11 that is facing away from the external ear canal 101 along the short-axis direction Z in the wearing state and a side of the sound production component 11 that is proximate to the external ear canal 101 along the short-axis direction Z in the wearing state, respectively; and the rear side surface RS may refer to a side of the sound production component 11 towards the back of the head along the length direction Y in the wearing state. For the sake of description, this embodiment is exemplarily illustrated with the sound production component 11 set in the rounded rectangle. The dimension (or referred to as a length of the sound production component or a length of the housing) of the sound production component 11 (or the housing 111) in the long-axis direction Y may be larger than a dimension (or referred to as a width of the sound production component or a width of the housing) of the sound production component 11 (or the housing 111) in the short-axis direction Z.

It should be noted that in the wearing state, the suspension structure 12 (e.g., the ear hook) has an upper vertex (e.g., an upper vertex T1 shown in FIG. 10B), i.e., a position with a highest distance relative to the horizontal plane. The upper vertex T1 is close to a joint of the first portion 121 and the second portion 122. The upper side surface US is a side wall (e.g., the upper side surface US as shown in FIG. 3B and FIG. 10B) of the sound production component 11 other than the connecting end CE and the free end FE and having a center point (e.g., a geometric center point) whose distance from the upper vertex of the ear hook in the direction of the vertical axis is the minimum. Correspondingly, the lower side surface LS is a side wall opposite the upper side surface US of the sound production component 11, i.e., a side wall (e.g., the lower side surface LS as shown in FIG. 3B and FIG. 10B) of the sound production component 11 other than the connecting end CE and the free end FE and having a center point (e.g., a geometric center point) whose distance from the upper vertex of the ear hook in the direction of the vertical axis is the maximum.

By extending at least part of the sound production component 11 into the cavum concha, a listening volume of sound at a listening position (e.g., at the ear canal opening, the ear canal, or the external ear canal) may be increased especially for mid-low frequency sounds, while still maintaining good effect of far-field sound leakage cancellation. Merely by way of example, when the entire or partial structure of the sound production component 11 extends into the cavum concha 102, the sound production component 11 and the cavum concha 102 forms a structure similar to a cavity (hereinafter referred to as a cavity-like structure). In the embodiments of the present disclosure, the cavity-like structure may be understood as a semi-enclosed structure enclosed by the side wall of the sound production component 11 and the cavum concha 102. The semi-closed structure allows for acoustic communication with an external environment at the listening position (e.g., at the ear canal opening) through a leaking structure (e.g., an opening, a gap, a channel, etc.), rather than completely isolating the listening position from the external environment. When the user wears the open earphone 10, a sound outlet 112 may be provided on a side of the housing of the sound production component 11 proximate to or toward the user's ear canal, and one or more pressure relief holes 113 may be provided on other side walls (e.g., side walls that are away from or back away from the user's ear canal) of the housing of the sound production component 11. The sound outlet 112 may be acoustically coupled to a front cavity of the open earphone 10, and the one or more pressure relief holes 113 may be acoustically coupled to a rear cavity of the open earphone 10. Taking the sound production component 11 including one sound outlet 112 and one pressure relief hole 113 as an example, a sound outputted from the sound outlet and a sound outputted from the pressure relief hole may be approximately regarded as two sound sources. Sound phases of the two sound sources are opposite or approximately opposite to form a dipole. The sound production component 11 (e.g., the inner side surface IS thereof) and a corresponding inner wall of the cavum concha 102 form the cavity-like structure, wherein leaking structures (e.g., a first leaking structure UC proximate to a top of the head formed between the inner side surface IS and the inner wall of the cavum concha, a second leaking structure LC proximate to the ear canal formed between the inner side surface IS and the ear) may be formed between the inner side surface IS of the sound production component 11 and the inner wall of the cavum concha. A sound source corresponding to the sound outlet 112 is located inside the cavity-like structure, while a sound source corresponding to the pressure relief hole 113 is located outside the cavity-like structure, forming an acoustic model as shown in FIG. 4.

As shown in FIG. 4, the cavity-like structure 402 may include a listening position and at least one sound source 401A. The "include" here may indicate that at least one of the listening position or the sound source 401A is located inside the cavity-like structure 402, or it may indicate that at least one of the listening position or the sound source 401A is located at an inner edge of the cavity-like structure 402. The listening position may be equivalent to the ear canal opening, an acoustic reference point in the ear such as an ear reference point (ERP) or an eardrum reference point (DRP), etc., or an entrance structure guiding to a listener, etc. The sound source 401B is located outside the cavity-like structure 402, and the sound sources 401A and 401B, with opposite phases, form a dipole. The dipole radiates sound into a surrounding space, and the sound may produce the phenomenon of interference and cancellation of sound waves, thereby achieving a leakage sound cancellation effect. Due to a relatively large sound path difference between the two sounds at the listening position, the leakage sound cancellation effect is not significant, allowing the listener to hear louder sound at the listening position compared to other positions. Specifically, since the sound source 401A is enclosed by the cavity-like structure 402, most of the sound radiated from the sound source 401A reaches the listening position through direct or reflected paths. In contrast, without the cavity-like structure 402, most of the sound radiated by sound source 401A does not reach the listening position. Therefore, the arrangement of the cavity-like structure 402 significantly increases a volume of the sound reaching the listening position. At the same time, only a small part of anti-phase sound radiated from the anti-phase sound source 401B outside the cavity-like structure 402 enters the cavity-like structure 402 through a leaking structure 403 of the cavity-like structure 402. This is equivalent to generating a secondary sound source 401B' at the leaking structure 403. An intensity of the secondary sound source 401B' is significantly lower than an intensity of the sound source 401B and also significantly lower than an intensity of the sound source 401A. The sound produced by the secondary sound source 401B' weakly interferes with the sound source 401A inside the cavity, significantly increasing the listening volume at the listening position. Regarding the leakage sounds, the sound source 401A radiates sound to the outside world through the leaking structure 403 of the cavity-like structure 402, which is equivalent to generating a secondary sound source 401A' at the leaking structure 403. Since nearly all sounds radiated by the sound source 401A exit through the leaking structure 403, and a scale of the cavity-like structure 402 is significantly smaller than a spatial scale for evaluating the leakage sounds (differing by at least one order of magnitude), it may be considered that an intensity of the secondary sound source 401A' is equivalent to the intensity of the sound source 401A. For the external space, the sound cancellation effect of sound emitted by the secondary sound source 401A' and the sound source 401B is equivalent to the sound cancellation effect of sound emitted by the sound source 401A and the sound source 401B. That is, a considerable sound leakage reduction effect may still be maintained under the cavity-like structure.

In specific application scenarios, an outer wall surface of the sound production component 11 is typically a planar or curved plane, while a contour of the user's cavum concha is an uneven structure. By partially or entirely extending the sound production component 11 into the cavum concha, the sound production component 11 and the contour of the cavum concha may form the cavity-like structure that communicates with the outside world. Furthermore, by placing the sound outlet 112 at a position on an edge of the sound production component facing the user's ear canal opening and close to the cavum concha, and placing the one or more pressure relief holes 113 at a position on the sound production component 11 back away from or further away from the ear canal opening, the acoustic model as shown in FIG. 4 is formed, so as to increase the listening volume at the ear canal opening when wearing the open earphone and reduce the far-field sound leakage effect.

Figure 5A:
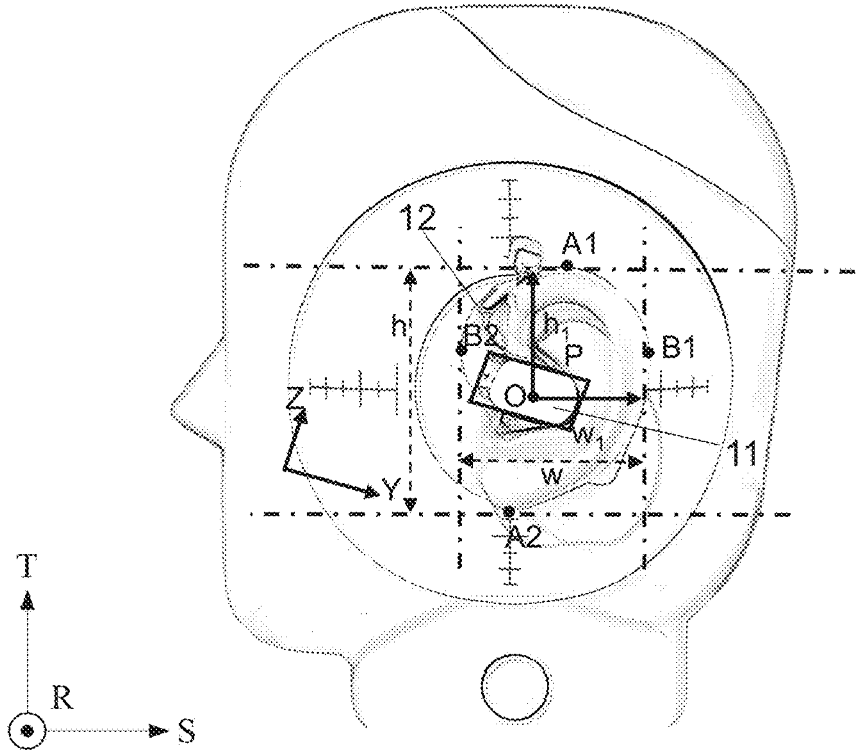
FIG. 5A is a schematic diagram illustrating an exemplary wearing manner of an open earphone according to some embodiments of the present disclosure.
Figure 5B:
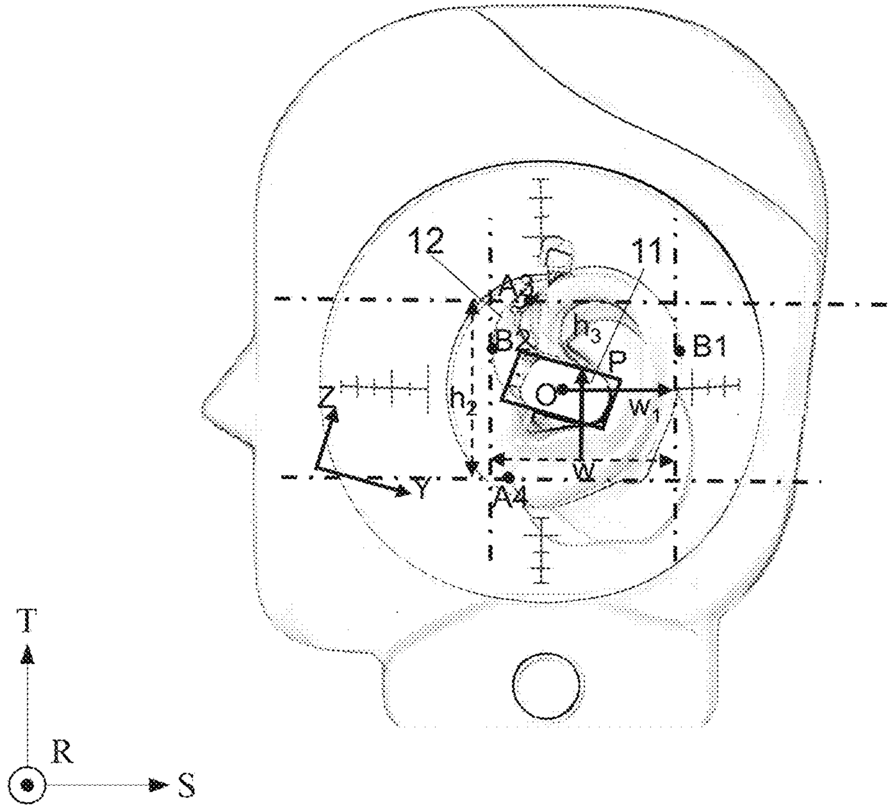
FIG. 5B is a schematic diagram illustrating an exemplary wearing manner of an open earphone according to some embodiments of the present disclosure.

FIG. 5A is schematic diagrams illustrating exemplary wearing manners of an open earphone according to some embodiments of the present disclosure. FIG. 5B is schematic diagrams illustrating exemplary wearing manners of an open earphone according to some embodiments of the present disclosure.

In some embodiments, the sound production component of the open earphone may include a transducer and a housing configured to accommodate the transducer. The transducer is an element capable of receiving an electrical signal and converting the electrical signal into a sound signal for output. In some embodiments, a type of the transducer may be distinguished by frequency and may include a low frequency (e.g., 30 Hz-150 Hz) speaker, a mid-low frequency (e.g., 150 Hz-500 Hz) speaker, a mid-high frequency (e.g., 500 Hz-5 kHz) speaker, a high frequency (e.g., 5 kHz-16 kHz) speaker, a full-range (e.g., 30 Hz-16 kHz) speaker, or any combination thereof. The terms low frequency, high frequency, etc., represent approximate frequency ranges, and different categorizations may apply in various application scenarios. For example, a frequency division point may be determined. The low frequency may represent a frequency range below the frequency division point, and the high frequency may represent a frequency range above the frequency division point. The frequency division point may be any value within an audible range of the human ear, e.g., 500 Hz, 600 Hz, 700 Hz, 800 Hz, 1000 Hz, or the like.

In some embodiments, referring to FIG. 3A, the transducer may include a diaphragm. When the diaphragm vibrates, sounds may be emitted from front and rear sides of the diaphragm. In some embodiments, a front cavity (not shown) for sound transmission is positioned at the front side of the diaphragm within the housing 120. The front cavity may be acoustically coupled with the sound outlet 112, and the sound from the front side of the diaphragm may be emitted from the sound outlet 112 through the front cavity. A rear cavity (not shown) for sound transmission may be disposed at the rear side of the diaphragm in the housing 120. The rear cavity may be acoustically coupled with a pressure relief hole, and the sound from the rear side of the diaphragm may be emitted from the pressure relief hole through the rear cavity.

Referring to FIG. 3A, an example of the suspension structure 12 is illustrated here with an ear hook. In some embodiments, the ear hook may include a first portion 121 and a second portion 122 connected in sequence, wherein the first portion may be hung between the rear outer side of the auricle of the user and the head of the user, the second portion may extend toward a front outer side (a side of the auricle away from the head along the coronal axis) of the auricle and connect the sound production component 11, and the sound production component may be located close to the ear canal but not block the opening of the ear canal. In some embodiments, the sound outlet 112 may be disposed on the sidewall of the housing of the sound production component 11 toward the auricle, and the sound produced by the transducer may be exported out of the housing and transmitted to the opening of the ear canal of the user.

Referring to FIG. 3A and FIG. 5A, in some embodiments, when the user wears the open earphone 10, the sound production component 11 may have a first projection on a sagittal plane (i.e., a plane formed by a T-axis and an S-axis in FIG. 5A) along a coronal axis direction R. A shape of the sound production component 11 may be a regular or irregular three-dimensional shape. Correspondingly, the first projection of the sound production component 11 on the sagittal plane may be a regular or irregular shape. For example, when the shape of the sound production component 11 is a cuboid, a quasi-cuboid shape, or a cylinder, the first projection of the sound production component 11 on the sagittal plane may be a rectangle or a quasi-rectangle shape (e.g., a racetrack shape). Considering that the first projection of the sound production component 11 on the sagittal plane may be the irregular shape, for the convenience of describing the first projection, a rectangular region shown in a solid line box P may be delineated around the projection (i.e., the first projection) of the sound production component 11 in FIG. 5A and FIG. 5B, and a centroid O of the rectangular region showed by the solid line box P may be approximately regarded as the centroid of the first projection. It should be noted that the above description about the first projection and the centroid thereof is only an example, and the shape of the first projection is related to the shape of the sound production component 11 or the wearing condition relative to the ear. The auricle may have a second projection on the sagittal plane along the coronal axis direction R. In order to make the open earphone 10 in the wearing state, at least part of the structure of the sound production component 11 may extend into the cavum concha or cover the antihelix region. In some embodiments, a ratio of a distance h1 (also referred to as a first distance) between the centroid O of the first projection and a highest point of the second projection in a vertical axis direction (e.g., the T-axis direction in FIG. 5A) to a high h of the second projection in the vertical axis direction may be within a range of 0.25-0.6. A ratio of a distance w1 (also referred to as a second distance) between the centroid O of the first projection and an end point of the second projection in the sagittal axis direction (e.g., the S-axis direction in FIG. 5A) to a width w of the second projection in the sagittal axis direction may be within a range of 0.4-0.7. In some embodiments, the sound production component 11 and the suspension structure 12 may be two independent structures or an integrated structure. In order to describe the first projection region of the sound production component more clearly, a thickness direction X, a long-axis direction Y, and a short-axis direction Z may be introduced according to a three-dimensional structure of the sound production component 11, wherein the long-axis direction Y and the short-axis direction Z are perpendicular, and the thickness direction X may be perpendicular to a plane formed by the long-axis direction Y and the short-axis direction Z. Merely by way of example, the confirmation process of the solid line box P may be as follows: two farthest points of the sound production component 1 in the long-axis direction Y may be determined, and a first line segment and a second line segment parallel to the short-axis direction Z through these two farthest points may be drawn, respectively; two farthest points of the sound production component 11 in the short-axis direction Z may be determined, a third line segment and a fourth line segment parallel to the long-axis direction Y through these two farthest points may be drawn, and the rectangular region of the solid line box P in FIG. 5A and FIG. 5B may be obtained by a region formed by the above line segments.

The highest point of the second projection may be understood as a point with a largest distance in the vertical axis direction relative to the projection of a certain point on the neck of the user on the sagittal plane among all the projection points, i.e., a projection of the highest point of the auricle (e.g., point A1 in FIG. 5A) on the sagittal plane may be the highest point of the second projection. A lowest point of the second projection may be understood as a point with a smallest distance in the vertical axis direction relative to the projection of a certain point of the neck of the user on the sagittal plane among all the projection points, i.e., a projection of the lowest point of the auricle (e.g., point A2 in FIG. 5A) on the sagittal plane may be the lowest point of the second projection. A height of the second projection in the vertical axis direction may be a difference (height h shown in FIG. 5A) between the point with the largest distance and the point with the smallest distance in the vertical axis direction and the smallest point of the projection relative to a projection of a certain point of the neck of the user on the sagittal plane among all the projection points in the second projection, i.e., the distance between point A1 and point A2 in the vertical axis direction T. The end point of the second projection may be understood as a point with the largest distance in the sagittal axis direction relative to the projection of the nose tip of the user on the sagittal plane among all the projection points, i.e., the projection of the end point of the auricle (e.g., point B1 in FIG. 5A) on the sagittal plane may be the end point of the second projection. The front end point of the second projection may be understood as a point with the smallest distance in the sagittal axis direction relative to the projection of the nose tip of the user on the sagittal plane among all projection points, i.e., the projection of the front end point of the auricle (e.g., point B2 shown in FIG. 5) on the sagittal plane may be the front end point of the second projection. The width of the second projection in the sagittal axis direction may be a difference (the width w shown in FIG. 5A) between the point with the largest distance and the point with the smallest distance along the sagittal axis direction relative to the projection of the nose tip on the sagittal plane among all projection points in the second projection, i.e., the distance between the point B1 and the point B2 in the sagittal axis direction S. It should be noted that the projections of structures such as the sound production component 11 or the auricle on the sagittal plane in the embodiments of the present disclosure refer to projections on the sagittal plane along the coronal axis direction R, which is not emphasized in the disclosure hereinafter.

In some embodiments, when the ratio of the distance h1 between the centroid O of the first projection and the highest point of the second projection in the vertical axis direction to the height h of the second projection in the vertical axis direction is within the range of 0.25-0.6, and the ratio of the distance w1 between the centroid O of the first projection and the end point of the second projection in the sagittal axis direction to the width w of the second projection in the sagittal axis direction is within the range of 0.4-0.7, the part or whole structure of the sound production component 11 may substantially cover the antihelix region of the user (e.g., the position in the triangular fossa, the superior crus of antihelix, the inferior crus of antihelix, or the position of the antihelix, the position of the sound production component 11C relative to the ear shown in FIG. 2), or part or whole structure of the sound production component 11 may extend into the cavum concha (e.g., the position of the sound production component 11B relative to the ear shown in FIG. 2). In some embodiments, in order to make the whole or part structure of the sound production component 11 cover the antihelix region of the user (e.g., the position in the triangular fossa, the superior crus of antihelix, the inferior crus of antihelix, or the position of the antihelix), as the position of the sound production component 11C relative to the ear shown in FIG. 2, the ratio of the distance h1 between the centroid O of the first projection and the highest point of the second projection in the vertical axis direction to the height h of the second projection in the vertical axis direction may be within a range of 0.25-0.4; and the ratio of the distance w1 between the centroid O of the first projection and the end point of the second projection in the sagittal axis direction to the width w of the second projection may be within a range of 0.4-0.6. When the whole or part structure of the sound production component 11 covers the antihelix region of the user, the housing of the sound production component 11 may act as a baffle to increase a sound path difference from the sound outlet 112 and the pressure relief hole 113 to the opening of the ear canal, thereby increasing the sound intensity at the opening of the ear canal. Furthermore, in the wearing state, the sidewall of the sound production component 11 may be close to the antihelix region, and a concave-convex structure of the antihelix region may also act as a baffle, to increase a sound path of the transmission of the sound from the pressure relief hole to the opening of the ear canal, thereby increasing the sound path difference between the sound outlet 112 and the pressure relief hole 113 to the opening of the ear canal. In addition, when the whole or part of the sound production component 11 covers the antihelix region of the user, the sound production component 11 may not extend into the opening of ear canal of the user, which may ensure that the opening of ear canal remains fully open, thereby obtaining sound information in the external environment for the user, and improving the wearing comfort for the user. The specific description regarding the whole or part structure of the sound production component 11 substantially covering the antihelix region of the user may be found elsewhere in in the present disclosure.

In some embodiments, in order to make the whole or part of the structure of the sound production component 11 extend into the cavum concha, as the position of the sound production component 11B relative to the ear shown in FIG.

2, the ratio of the distance h1 between the centroid O of the first projection and the highest point of the second projection in the vertical axis direction to the height h of the second projection in the vertical axis direction may be within a range of 0.35-0.6, and the ratio of the distance w1 between the centroid O of the first projection and the end point of the second projection in the sagittal axis direction to the width w of the second projection in the sagittal axis direction may be within a range of 0.4-0.65. For the open earphone provided in the embodiments of the present disclosure, when the user wears the open earphone, the ratio of the distance h1 between the centroid O of the first projection and the highest point of the second projection in the vertical axis direction to the height h of the second projection in the vertical axis direction may be controlled to be within the range of 0.35-0.6, and the ratio of the distance w1 between the centroid of the first projection and the end point of the second projection in the sagittal axis direction to the width w of the second projection in the sagittal axis direction may be controlled to be with the range of 0.4-0.65, so that at least part of the sound production component 11 may extend into the cavum concha, and form the acoustic model shown in FIG. 4 with the cavum concha of the user, thereby improving the listening volume of the open earphone at the listening position (e.g., at the opening of the ear canal), especially the listening volume at the medium and low frequency, while maintaining a good effect of far-field sound leakage cancellation. When part or the whole of the sound production component 11 extends into the cavum concha, the sound outlet 112 may be closer to the opening of the ear canal, which further increases the listening volume at the opening of the ear canal. In addition, the cavum concha may support and limit the sound production component 11 to a certain extent, thereby improving the stability of the open earphone in the wearing state.

It should also be noted that an area of the first projection of the sound production component 11 on the sagittal plane may be generally much smaller than an area of a projection of the auricle on the sagittal plane, to ensure that the opening of ear canal of the user may not be blocked when the user wears the open earphone 10, and the load on the user when wearing the open earphone may be reduced, which is convenient for the user to carry daily. On this premise, in the wearing state, when ratio of the distance h1 between the centroid O of the projection (the first projection) of the sound production component 11 on the sagittal plane and the projection (the highest point of the second projection) of the highest point A1 of the auricle on the sagittal plane in the vertical axis direction to the height h of the second projection in the vertical axis direction is too small or too large, part of the structure of the sound production component 11 may be located above the top of the auricle or at the earlobe of the user, which may be impossible to use the auricle to sufficiently support and limit the sound production component 11, and there may be a problem that the wearing is unstable and easy to fall off. On the other hand, it may also cause the sound outlet 112 set on the sound production component 11 to be away from the opening of the ear canal, affecting the listening volume at the opening of the ear canal of the user. In order to ensure that the open earphone does not block the opening of the ear canal of the user and ensure the stability and comfort of the user wearing the open earphone and a good listening effect, in some embodiments, the ratio of the distance h1 between the centroid O of the first projection and the highest point A1 of the second projection in the vertical axis direction to the height h of the second projection in the vertical axis direction may be controlled to be within a range of 0.35-0.6, so that when part or the whole structure of the sound production component extends into the cavum concha, the force exerted by the cavum concha on the sound production component 11 may support and limit the sound production component 11 to a certain extent, thereby improving the wearing stability and comfort of the open earphone. Meanwhile, the sound production component 11 may also form the acoustic model shown in FIG. 4 with the cavum concha, to ensure the listening volume of the user at the listening position (e.g., the opening of the ear canal) and reduce the far-field leakage volume. Preferably, the ratio of the distance h1 between the centroid O of the first projection and the highest point A1 of the second projection in the vertical axis direction to the height h of the second projection in the vertical axis direction may be controlled to be within a range of 0.35-0.55. More preferably, the ratio of the distance h1 between the centroid O of the first projection and the highest point of the second projection in the vertical axis direction to the height h of the second projection in the vertical axis direction may be controlled to be within a range of 0.4-0.5.

Similarly, when the ratio of the distance w1 between the centroid O of the first projection and the end point of the second projection in the sagittal axis direction to the width w of the second projection in the sagittal axis direction is too large or too small, the part of whole structure of the sound production component 11 may be located in a facial region on the front side of the ear, or extend out of the outer contour of the auricle, which may also cause the problem that the sound production component 11 cannot construct the acoustic model in FIG. 4 with the cavum concha, and also lead to unstable wearing of the open earphone 10. According to the open earphone provided in the embodiments of the present disclosure, the ratio of the distance w1 between the centroid O of the first projection and the end point of the second projection in the sagittal axis direction to the width w of the second projection in the sagittal axis direction may be controlled to be within a range of 0.4-0.7, thereby improving the wearing stability and comfort of the open earphone while ensuring the acoustic output effect of the sound production component. Preferably, the ratio of the distance w1 between the centroid O of the first projection and the end point of the second projection in the sagittal axis direction to the width w of the second projection in the sagittal axis direction may be controlled to be within a range of 0.45-0.68. More preferably, the ratio of the distance w1 between the centroid O of the first projection and the end point of the second projection in the sagittal axis direction to the width w of the second projection in the sagittal axis direction may be controlled to be within a range of 0.5-0.6.

As a specific example, the height h of the second projection in the vertical axis direction may be within a range of 55 mm-65 mm. In the wearing state, if the distance h1 between the centroid O of the first projection and the highest point of the second projection in the vertical axis direction is less than 15 mm or greater than 50 mm, the sound production component 11 may be located away from the cavum concha, which not only fails to construct the acoustic model in FIG. 4, but also has the problem of unstable wearing. Therefore, in order to ensure the acoustic output effect of the sound production component and the wearing stability of the open earphone, the distance h1 between the centroid O of the first projection and the highest point of the second projection in the vertical axis direction may be controlled to be within a range of 15 mm-50 mm. Similarly, in some embodiments, the width of the second projection in the sagittal axis direction may be within a range of 40 mm-55 mm. When the distance between the centroid O of the first projection and the end point of the second projection in the sagittal axis direction is greater than 45 mm or less than 15 mm, the sound production component 11 may be too forward or too backward relative to the ear of the user, causing that the sound production component 11 may not construct the acoustic model in FIG. 4 and the unstable wearing of the open earphone 10. Therefore, in order to ensure the acoustic output effect of the sound production component 11 and the wearing stability of the open earphone, the distance between the centroid O of the first projection and the end point of the second projection in the sagittal axis direction may be controlled to be within a range of 15 mm-45 mm.

In some embodiments, in order to further improve the acoustic output (especially low-frequency output) effect of the sound production component 11 and improve the ability of the diaphragm to push air, a projection area of the diaphragm along the thickness direction X is as large as possible. However, too large the area of the diaphragm may result in an oversized transducer, which in turn causes an oversized housing 111, thus easily causing the housing 111 to collide and rub against the auricle, thereby affecting the wearing comfort of the sound production component 11. Therefore, a dimension of the sound production component 11 or the housing 111 needs to be designed. Exemplarily, to allow the whole or part of the structure of the sound production component 11 to extend into the cavum concha, a short-axis dimension of the sound production component 11 in the short-axis direction Z (also referred to as the short-axis dimension of the housing 111) (e.g., 17 mm) may be determined based on a dimension of the cavum concha, and then an appropriate aspect ratio (i.e., a ratio of the long-axis dimension of the sound production component 11 in the long-axis direction Y (also referred to as a long-axis dimension of the housing 111) to the short-axis dimension of the sound production component 11) may be selected according to the wearing comfort, thereby determining the long-axis dimension (e.g., 21.49 mm) of the sound production component 11. It should be noted that the long-axis dimension of the sound production component 11 (or the housing 111) may refer to a maximum dimension of the sound production component 11 (or the housing 111) in the long-axis direction Y, and the short-axis dimension of the sound production component 11 (or the housing 111) may refer to a maximum dimension of the sound production component 11 (or the housing 111) in the short-axis direction Z.

In some embodiments, in order to enable most users to wear the open earphone 10 with the sound production component 11 at least partially inserted into the cavum concha to form a cavity-like structure with better acoustics, for example, such that the open earphone 10 forms the first leaking structure UC and the second leaking structure LC between the open earphone 10 and the user's ear when the open earphone 10 is worn to improve the acoustic performance of the earphone, the dimension of the housing 111 may take a value in a preset range. In some embodiments, according to the dimension limitation of the cavum concha, the short-axis dimension of the sound production component 11 (or the housing 111) may be in a range of 11 mm to 17 mm. In some embodiments, the short-axis dimension of the sound production component 11 (or the housing 111) may be in a range of 11 mm to 15 mm. In some embodiments, the short-axis dimension of the sound production component 11 (or the housing 111) may be in a range of 13 mm to 14 mm. In some embodiments, the aspect ratio of the sound production component 11 (or the housing 111) may be in a range of 1.2 to 5. In some embodiments, the aspect ratio of the sound production component 11 (or the housing 111) may be in a range of 1.4 to 4. In some embodiments, the aspect ratio of the sound production component 11 (or the housing 111) may be in a range of 1.5 to 2. In some embodiments, the long-axis dimension of the sound production component 11 (or the housing 111) may be in a range of 15 mm to 30 mm. In some embodiments, the long-axis dimension of the sound production component 11 (or the housing 111) may be in a range of 16 mm to 28 mm. In some embodiments, the long-axis dimension of the sound production component 11 (or the housing 111) may be in a range of 19 mm to 24 mm. In some embodiments, to avoid an excessive volume of the housing 111 affecting the wearing comfort of the open earphone 10, a dimension of the housing 111 along the thickness direction X (also referred to as a thickness of the sound production component 11) may be in a range of 5 mm to 20 mm. In some embodiments, the dimension of the housing 111 along the thickness direction X may be in a range of 5.1 mm to 18 mm. In some embodiments, the dimension of the housing 111 along the thickness direction X may be in a range of 6 mm to 15 mm. In some embodiments, the dimension of the housing 111 along the thickness direction X may be in a range of 7 mm to 10 mm.

In some embodiments, as shown in combination with FIG. 3B and FIG. 5A, in order to ensure that the projection of the sound outlet 112 on the sagittal plane may be partially or entirely located within the cavum concha region when wearing the open earphone 10, while enhancing the sound intensity of the sound outlet 112 in the ear canal (i.e., the listening position), the sound outlet 112 may be set as close to the ear canal as possible. In some embodiments, a distance $h_{23}$ from a center $O_3$ of the sound outlet 112 to a lower side surface LS of the sound production component 11 along the short-axis direction Z ranges from 4.05 mm to 6.05 mm. In some embodiments, the distance $h_{23}$ from the center $O_3$ of the sound outlet 112 to the lower side surface LS of the sound production component 11 along the short-axis direction Z ranges from 4.50 mm to 5.85 mm. In some embodiments, the distance $h_{23}$ from the center $O_3$ of the sound outlet 112 to the lower side surface LS of the sound production component 11 along the short-axis direction Z ranges from 4.80 mm to 5.50 mm. In some embodiments, the distance $h_{23}$ from the center $O_3$ of the sound outlet 112 to the lower side surface LS of the sound production component 11 along the short-axis direction Z ranges from 5.20 mm to 5.55 mm.

In some embodiments, in order to allow the sound production component to at least partially insert into the cavum concha and bring the sound outlet 112 closer to the ear canal, so as to significantly increase the listening volume at the listening position, a ratio of a distance from the center $O_3$ of the sound outlet 112 to the lower side surface LS of the housing 111 along the short-axis direction Z to the short-axis dimension of the sound production component 11 may be in a range of 0.25-0.50. Preferably, in some embodiments, to further increase the listening volume at the listening position, the ratio of the distance from the center $O_3$ of the sound outlet 112 to the lower side surface LS of the housing 111 along the short-axis direction Z to the short-axis dimension of the sound production component 11 may be in a range of 0.31-0.47. In some embodiments, the ratio of the distance from the center $O_3$ of the sound outlet 112 to the lower side surface LS of the housing 111 along the short-axis direction Z to the short-axis dimension of the sound production component 11 may be in a range of 0.33-0.43. In some embodiments, since the diaphragm of the sound production component 11 includes a folded ring portion and a fixed end, the folded ring portion with a relatively low stiffness deforms and drives the diaphragm to vibrate. To improve the vibration stability of the diaphragm of the sound production component 11, the projection of the sound outlet 112 and the folded ring portion in the thickness direction X may partially overlap or not overlap at all. In addition, to further increase the listening volume at the listening position, the ratio of the distance from the center $O_3$ of the sound outlet 112 along the short-axis direction Z to the lower side surface LS of the housing 111 to the short-axis dimension of the sound production component 11 may be in a range of 0.35-0.40.

In some embodiments, to ensure that the sound production component 11 is at least partially inserted into the cavum concha, the long-axis dimension of the sound production component 11 may not be too long. Under the premise of ensuring that the sound production component 11 is at least partially inserted into the cavum concha, a distance from the center $O_3$ of the sound outlet 112 to the rear side surface RS of the sound production component 11 along the direction Y may not be too short. Otherwise, it may result in an entire or partial area of the sound outlet being covered due to the abutment of the free end FE against a wall surface of the cavum concha, thereby reducing the effective area of the sound outlet. Therefore, in some embodiments, a distance $d_{23}$ from the center $O_3$ of the sound outlet 112 to the rear side surface RS of the sound production component 11 along the direction Y is in a range of 8.15 mm-12.25 mm. In some embodiments, the distance $d_{23}$ from the center $O_3$ of the sound outlet 112 to the rear side surface RS of the sound production component 11 along the direction Y is in a range of 8.50 mm-12.00 mm. In some embodiments, the distance $d_{23}$ from the center $O_3$ of the sound outlet 112 to the rear side surface RS of the sound production component 11 along the direction Y is in a range of 8.85 mm-11.65 mm. In some embodiments, the distance $d_{23}$ from the center $O_3$ of the sound outlet 112 to the rear side surface RS of the sound production component 11 along the direction Y is in a range of 9.25 mm-11.15 mm. In some embodiments, the distance $d_{23}$ from the center $O_3$ of the sound outlet 112 to the rear side surface RS of the sound production component 11 along the direction Y is in a range of 9.60 mm-10.80 mm.

In some embodiments, to ensure that the sound production component is at least partially inserted into the cavum concha and that the sound outlet 112 is close to the ear canal, so as to increase the listening volume at the listening position, a ratio of a distance from the center $O_3$ of the sound outlet 112 to the rear side surface RS of the housing 111 along the direction Y to the long-axis dimension (i.e., length) of the sound production component 11 is in a range of 0.35-0.60. In some embodiments, the ratio of the distance from the center $O_3$ of the sound outlet 112 to the rear side surface RS of the housing 111 along the direction Y to the long-axis dimension of the sound production component 11 is in a range of 0.4-0.55. In some embodiments, to further increase the listening volume at the listening position and to ensure that the sound outlet 112 is closer to the ear canal and not easily covered by an ear structure, the ratio of the distance from the center $O_3$ of the sound outlet 112 to the rear side surface RS of the housing 111 along the direction Y to the long-axis dimension of the sound production component 11 is in a range of 0.43-0.5.

It should be noted that since the sound outlet 112 and the pressure relief hole(s) 113 are provided on the housing 111 and each side wall of the housing 111 has a certain thickness, the sound outlet 112 and the pressure relief hole 113 are holes with a certain depth. At this time, the sound outlet 112 and the pressure relief hole 113 may both have an inner opening and an outer opening. For ease of description, in the present disclosure, the center $O_3$ of the sound outlet 112 described above and below may refer to a centroid of the outer opening of the sound outlet 112. In some embodiments, in order to improve the aesthetics and wearing comfort of the earphone, one or more side walls of the housing 111 (e.g., the lower side surface LS, the rear side surface RS, the inner side surface IS, the outer side surface OS, etc.) may be flat or curved. When a certain side wall of the housing 111 is flat or curved, a distance from a certain position (e.g., the center $O_3$ of the sound outlet 112) to that side wall (e.g., the rear side surface RS) may be determined by the following exemplary manner. For example, a tangent plane of the side wall that is parallel to the short-axis direction Z or the long-axis direction Y of the sound production component 11 may be determined, and a shortest distance from that position to the tangent plane may be determined as the distance from that position to that side wall. By way of example, when the rear side surface RS is curved, a tangent plane of the rear side surface RS that is parallel to the X-Z plane (a plane formed by the short-axis direction Z and the thickness direction X) may be determined. Then, a distance from the center $O_3$ of the sound outlet 112 to the rear side surface RS may be the shortest distance from the center $O_3$ of the sound outlet 112 to the tangent plane. As another example, when the lower side surface LS is curved, a tangent plane of the lower side surface LS that is parallel to the X-Y plane (a plane formed by the long-axis direction Y and the thickness direction X) may be determined. Then, a distance from the center $O_3$ of the sound outlet 112 to the lower side surface LS may be the shortest distance from the center $O_3$ of the sound outlet 112 to the tangent plane.

Figure 6:
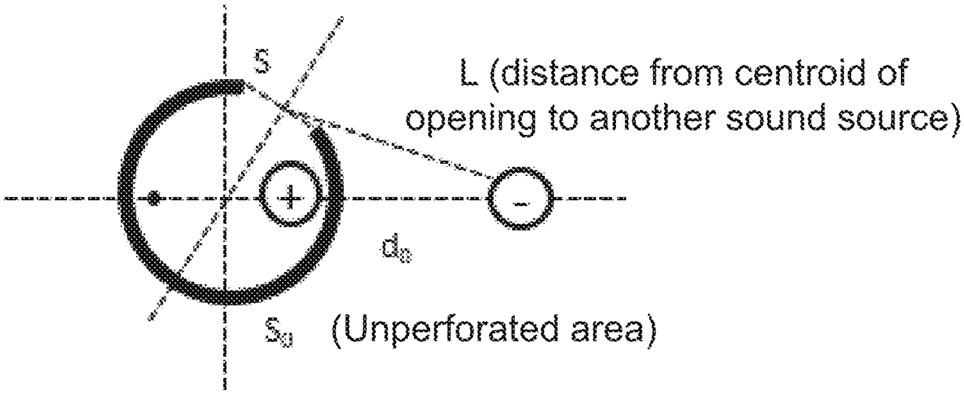
FIG. 6 is a schematic diagram illustrating a cavity-like structure according to some embodiments of the present disclosure.
Figure 7:
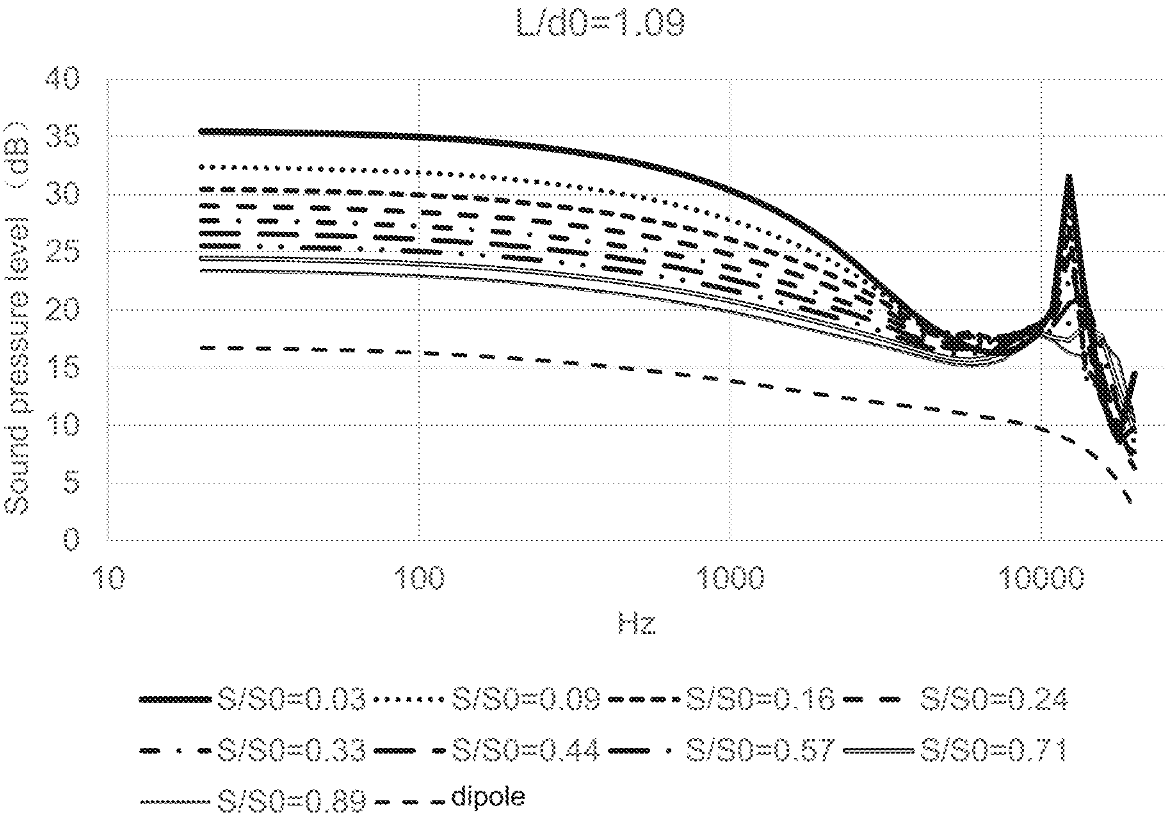
FIG. 7 is a graph illustrating listening indices of cavity-like structures with leaking structures of different dimensions according to some embodiments of the present disclosure.

As mentioned above, when the user wears the open earphone 10, at least part of the sound production component 11 may extend into the cavum concha of the user to form the acoustic model in FIG. 4. The outer wall surface of the housing of the sound production component 11 may usually be the plane or the curved surface, and the contour of the cavum concha of the user may be the uneven structure. When the part of whole structure of the sound production component 11 extends into the cavum concha, a gap may be formed as the sound production component 11 cannot be closely fit with the cavum concha. The gap may correspond to the leaking structure 403 in FIG. 4. FIG. 6 is a schematic diagram illustrating a cavity-like structure according to some embodiments of the present disclosure. FIG. 7 is a graph illustrating listening indices of cavity-like structures with leaking structures of different dimensions according to some embodiments of the present disclosure. As shown in FIG. 6, an opening area of the leaking structure on the cavity-like structure may be represented as $S_1$, and an area of the cavity-like structure directly affected by a contained sound source (e.g., "+" shown in FIG. 6) may be represented as $S_0$. The "directly affected" here means that the sound emitted by the contained sound source may directly acoustically act on a wall of the cavity-like structure without passing through the leaking structure. A distance between two sound sources is do, and a distance from a center of an opening shape of the leaking structure to another sound source (e.g., "–" in FIG. 6) is L. As shown in FIG. 7, keeping $L/d_0=1.09$ constant, the larger the relative opening size $S_1/S_0$, the smaller the listening index. This is because the larger the relative opening, the more sound components that the contained sound source radiates directly outward, and the less sound reaching the listening position, causing the listening volume to decrease with the increase of the relative opening, which in turn leads the decrease of the listening index. It may be inferred that the larger the opening, the lower the listening volume at the listening position.

In some embodiments, considering that the relative position of the sound production component 11 and the ear canal of the user (e.g., the cavum concha) may affect a dimension of the gap formed between the sound production component 11 and the cavum concha, e.g., when the end FE of the sound production component 11 abuts against the cavum concha, the dimension of the gap may be relatively small, and when the end FE of the sound production component 11 does not abut against the cavum concha, the dimension of the gap may be relatively large. The gap formed between the sound production component 11 and the cavum concha may be referred to as the leaking structure in the acoustic model in FIG. 4. The relative position of the sound production component 11 and the ear canal of the user (e.g., the cavum concha) may affect a count of the leaking structure of the cavity-like structure formed by the sound production component 11 and the cavum concha and the opening size of the leaking structure, and the opening size of the leaking structure may directly affect the listening quality. Specifically, the larger the opening of the leaking structure, the more sound components that the sound production component 11 radiate directly outward, and the less sound reaching the listening position. Accordingly, in order to consider the listening volume of the sound production component 11 and the sound leakage reduction effect to ensure the acoustic output quality of the sound production component 11, the sound production component 11 may be fit as closely as possible to the cavum concha of the user. Correspondingly, the ratio of the distance h1 between the centroid O of the first projection and the highest point of the second projection in the vertical axis direction to the height h of the second projection in the vertical axis direction may be controlled to be within a range of 0.35-0.6, while the ratio of the distance w1 between the centroid O of the first projection and the end point of the second projection in the sagittal axis direction to the width w of the second projection in the sagittal axis direction may be controlled to be within a range of 0.4-0.65. Preferably, in some embodiments, in order to improve the wearing comfort of the open earphone while ensuring the acoustic output quality of the sound production component 11, the ratio of the distance h1 between the centroid O of the first projection and the highest point of the second projection in the vertical axis direction to the height h of the second projection in the vertical axis direction may be within a range of 0.35-0.55, and the ratio of the distance w1 between the centroid O of the first projection and the end point of the second projection in the sagittal axis direction to the width w of the second projection in the sagittal axis direction may be within a range of 0.45-0.68. More preferably, the ratio of the distance h1 between the centroid O of the first projection and the highest point of the second projection in the vertical axis direction to the height h of the second projection in the vertical axis direction may be within a range of 0.35-0.5, and the ratio of the distance w1 between the centroid O of the first projection and the end point of the second projection in the sagittal axis direction to the width w of the second projection in the sagittal axis direction may be within a range of 0.48-0.6.

In some embodiments, considering that there may be certain differences in the shape and dimension of the ears of different users, the ratio range may fluctuate within a certain range. For example, when the earlobe of the user is long, the height h of the second projection in the vertical axis direction may be larger than that of the general situation. At this time, when the user wears the open earphone 100, the ratio of the distance h1 between the centroid O of the first projection and the highest point of the second projection in the vertical axis direction to the height h of the second projection in the vertical axis direction may be smaller, e.g., which may be within a range of 0.2-0.55. Similarly, in some embodiments, when the helix of the user is bent forward, the width w of the second projection in the sagittal axis direction be smaller than that of the general situation, and the distance w1 between the centroid O of the first projection and the end point of the second projection in the sagittal axis direction may also be relatively small. At this time, when the user wears the open earphone 100, the ratio of the distance w1 between the centroid O of the first projection and the end point of the second projection in the sagittal axis direction to the width w of the second projection in the sagittal axis direction may be larger, e.g., which may be within a range of 0.4-0.75.

The ears of different users are different. For example, some users have longer earlobes. At this time, it may have an effect if the open earphone 10 is defined using the ratio of the distance (the seventh distance) between the centroid O of the first projection and the highest point of the second projection to the height of the second projection on the vertical axis. As shown in FIG. 5B, a highest point A3 and a lowest point A4 of a connection region between the auricle of the user and the head of the user may be selected for illustration. The highest point of the connection part between the auricle and the head may be understood as a position where the projection of the connection region of the auricle and the head on the sagittal plane has a largest distance from a projection of a specific point on the neck on the sagittal plane. The lowest point of the connection part between the auricle and the head may be understood as a position where the projection of the connection region of the auricle and the head on the sagittal plane has a smallest distance from a projection of a specific point on the neck on the sagittal plane. In order to consider the listening volume of the sound production component 11 and the sound leakage reduction effect to ensure the acoustic output quality of the sound production component 11, the sound production component 11 may be fit as closely as possible to the cavum concha of the user. Correspondingly, a ratio of a distance h3 between the centroid O of the first projection and a highest point of a projection of the connection region of the auricle and the head on the sagittal plane in the vertical axis direction to a height h2 between a highest point and a lowest point of the projection of the connection region of the auricle and the head on the sagittal plane in the vertical axis direction may be controlled to be within a range of 0.4-0.65. Meanwhile, the ratio of the distance w1 between the centroid O of the first projection and the end point of the second projection in the sagittal axis direction to the width w of the second projection in the sagittal axis direction may be controlled to be within a range of 0.4-0.65. Preferably, in some embodiments, in order to improve the wearing comfort of the open earphone while ensuring the acoustic output quality of the sound production component 11, the ratio of the distance h3 between the centroid O of the first projection and the highest point of the projection of the connection region of the auricle and the head on the sagittal plane in the vertical axis direction to the height h2 between the highest point and the lowest point of the projection of the connection region of the auricle and the head on the sagittal plane in the vertical axis direction may be controlled to be within a range of 0.45-0.6, and the ratio of the distance w1 between the centroid O of the first projection and the end point of the second projection in the sagittal axis direction to the width w of the second projection in the sagittal axis direction may be within a range of 0.45-0.68. More preferably, the ratio of the distance h3 between the centroid O of the first projection and the highest point of the projection of the connection region of the auricle and the head on the sagittal plane in the vertical axis direction to the height h2 between the highest point and the lowest point of the projection of the connection region of the auricle and the head on the sagittal plane in the vertical axis direction may be within a range of 0.5-0.6, and the ratio of the distance w1 between the centroid O of the first projection and the end point of the second projection in the sagittal axis direction to the width w of the second projection in the sagittal axis direction may be within a range of 0.48-0.6.

Figure 8:
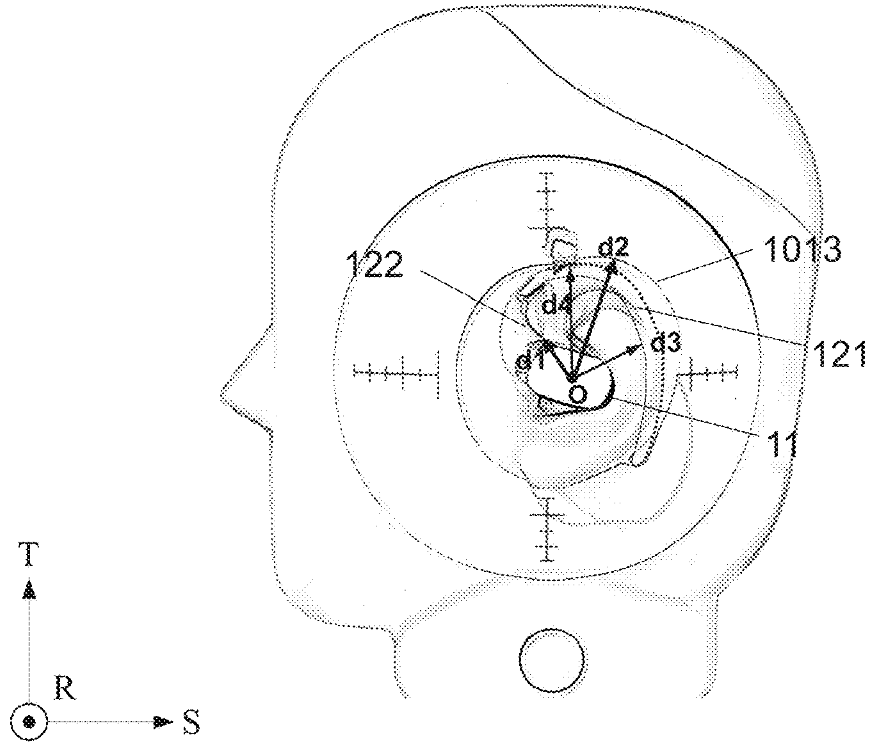
FIG. 8 is a schematic diagram illustrating exemplary wearing of an open earphone according to other embodiments of the present disclosure.

FIG. 8 is a schematic diagram illustrating exemplary wearing of an open earphone according to other embodiments of the present disclosure.

Referring to FIG. 3A and FIG. 8, when the user wears the open earphone 10 and the sound production component 11 extends into the cavum concha, the centroid O of the first projection may be located in a region enclosed by a contour of the second projection, wherein the contour of the second projection may be understood as a projection of an outer contour of the helix of the user, a contour of the earlobe, a contour of the tragus, an intertragic notch, an antitragic apex, an antihelix-antitragus notch, etc. on the sagittal plane. In some embodiments, the listening volume of the sound production component, the sound leakage reduction effect, and the wearing comfort and stability may be improved by adjusting a distance between the centroid O of the first projection and the contour of the second projection. For example, when the sound production component 11 is located at the top of the auricle, the earlobe, the facial region on the front side of the auricle, or between the inner contour 1014 of the auricle and the outer edge of the cavum concha, it may be specifically embodied as that a distance between the centroid O of the first projection and a point of a certain region of the contour of the second projection is too small, and a distance between the centroid O of the first projection and a point of another region of the contour of the second projection is too large, and the sound production component may not form a cavity-like structure (acoustic model in FIG. 4) with the cavum concha, affecting the acoustic output effect of the open earphone 10. In order to ensure the acoustic output quality when the user wears the open earphone 10, in some embodiments, the distance between the centroid O of the first projection and the contour of the second projection may be within a range of 10 mm-52 mm, i.e., the distance between the centroid O of the first projection and any point of the contour of the second projection may be within a range of 10 mm-52 mm. Preferably, in order to further improve the wearing comfort of the open earphone 10 and optimize the cavity-like structure formed by the sound production component 11 and the cavum concha, the distance between the centroid O of the first projection and the contour of the second projection may be within a range of 12 mm-50.5 mm. More preferably, the distance between the centroid O of the first projection and the contour of the second projection may also be within a range of 13.5 mm-50.5 mm. In some embodiments, by controlling the distance between the centroid O of the first projection and the contour of the second projection to be within a range of 10 mm-52 mm, most of the sound production component 11 may be located near the ear canal of the user, and at least part of the sound production component may extend into the cavum concha of the user to form the acoustic model in FIG. 4, thereby ensuring that the sound output by the sound production component 11 may be better transmitted to the user. For example, in some embodiments, a minimum distance d1 between the centroid O of the first projection and the contour of the second projection may be 20 mm, and a maximum distance d2 between the centroid O of the first projection and the contour of the second projection may be 48.5 mm.

In some embodiments, considering that when the user wears the open earphone 10, if a distance between the centroid O of the first projection and a projection of the first portion 121 of the ear hook on the sagittal plane is too large, it may cause unstable wearing (at this time, an effective clamping of the ear may not be formed between the sound production component 11 and the ear hook), and the problem that the sound production component 11 may not effectively extend into the cavum concha. If the distance is too small, it may affect the relative position of the sound production component to the cavum concha of the user and the opening of the ear canal, and may also cause the sound production component 11 or the ear hook to press the ear, resulting in poor wearing comfort. Accordingly, in order to avoid the problems, in some embodiments, the distance between the centroid O of the first projection and the projection of the first portion 121 of the ear hook on the sagittal plane may be within a range of 18 mm-43 mm. By controlling the distance to be within the range of 18 mm-43 mm, the ear hook may fit the ear of the user better, and the sound production component 11 may be ensured to be just located at the cavum concha of the user, and the acoustic model in FIG. 4 may be formed, thereby ensuring that the sound output by the sound production component 11 may be better transmitted to the user. Preferably, in order to further improve the wearing stability of the open earphone and ensure the listening effect of the sound production component 11 at the opening of the ear canal, in some embodiments, the distance between the centroid O of the first projection and the projection of the first portion 121 of the ear hook on the sagittal plane may be within a range of 20 mm-41 mm. More preferably, the distance between the centroid O of the first projection and the projection of the first portion 121 of the ear hook on the sagittal plane may be within a range of 22 mm-40.5 mm. For example, a minimum distance d3 between the centroid O of the first projection and the projection of the first portion 121 of the ear hook on the sagittal plane may be 21 mm, and a maximum distance d4 between the centroid O of the first projection on the sagittal plane of the user and the projection of the first portion 121 of the ear hook on the sagittal plane may be 41.2 mm.

In some embodiments, due to the elasticity of the ear hook, the distance between the sound production component 11 and the ear hook may vary (usually the distance in the non-wearing state may be smaller than that in the wearing state) in the wearing state and the non-wearing state. For example, in some embodiments, when the open earphone 10 is not worn, a distance between a centroid of a projection of the sound production component 11 on a specific reference plane and a centroid of a projection of the first portion 121 of the ear hook on the specific reference plane may be within a range of 15 mm-38 mm. Preferably, when the open earphone 100 is not worn, the distance between the centroid of the projection of the sound production component 11 on the specific reference plane and the centroid of the projection of the first portion 121 of the ear hook on the specific reference plane may be within a range of 16 mm-36 mm. In some embodiments, the distance between the centroid of the projection of the sound production component on the specific reference plane and the centroid of the projection of the first portion 121 of the ear hook on the specific reference plane may be slightly smaller in the non-wearing state than in the wearing state, so that when the open earphone 100 is in the wearing state, the ear hook may generate a certain clamping force on the ear of the user, thereby improving the wearing stability for the user without affecting the wearing experience of the user. In some embodiments, the specific reference plane may be the sagittal plane. At this time, in the non-wearing state, the centroid of the projection of the sound production component on the sagittal plane may be compared to the centroid of the projection of the sound production component on the specific reference plane. For example, the non-wearing state may be represented by removing the auricle structure from the human head model, and fixing the sound production component on the human head model in the same posture as the wearing state by using a fixing component or adhesive. In some embodiments, the specific reference plane may be an ear hook plane. An ear hook structure may be an arc structure. The ear hook plane may be a plane formed by three most protruding points on the ear hook, i.e., the plane that supports the ear hook when the ear hook is placed freely (i.e., not subject to external force). For example, when the ear hook is freely placed on a horizontal plane, the horizontal plane may support the ear hook, and the horizontal plane may be regarded as the ear hook plane. In other embodiments, the ear hook plane also refers to a plane formed by a bisector that bisects or roughly bisects the ear hook along a length extension direction of the ear hook. In the wearing state, although the ear hook plane has a certain angle relative to the sagittal plane, the ear hook may be approximately regarded as fitting the head at this time, and thus the angle is very small. For the convenience of calculation and description, it may also be possible to use the ear hook plane as the specific reference plane instead of the sagittal plane.

Figure 9:
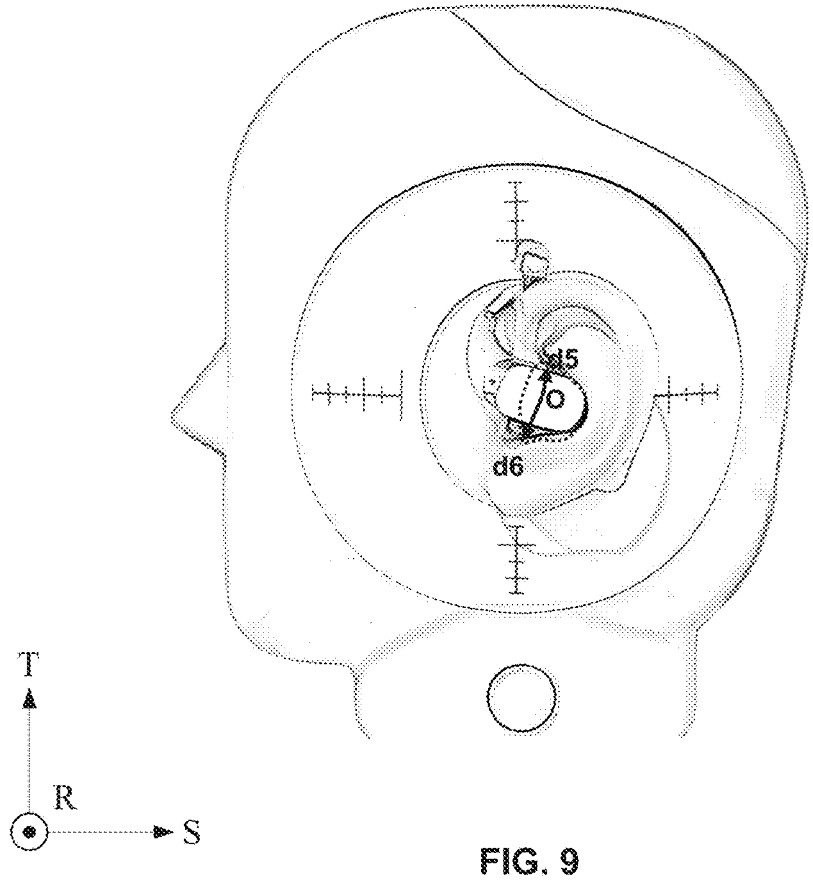
FIG. 9 is a schematic diagram illustrating exemplary wearing of an open earphone according to other embodiments of the present disclosure.

FIG. 9 is a schematic diagram illustrating exemplary wearing of an open earphone according to other embodiments of the present disclosure.

Figure 20:
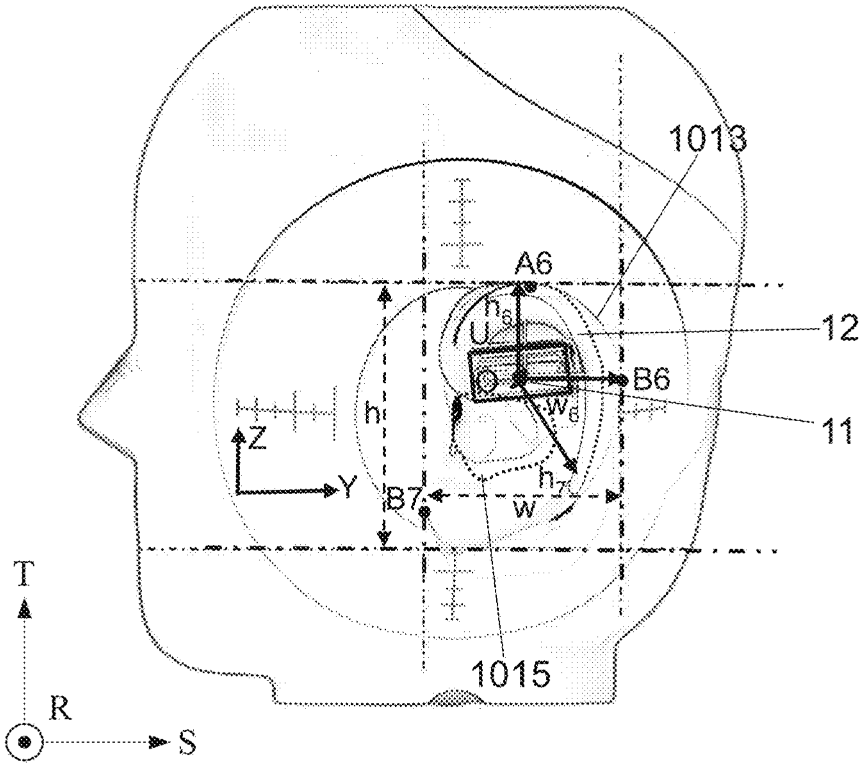
FIG. 20 is a schematic diagram illustrating an exemplary wearing state of an open earphone according to some other embodiments of the present disclosure.

Referring to FIG. 9, in some embodiments, the projection of the sound production component on the sagittal plane may overlap with the projection of the cavum concha of the user (e.g., the dotted line in FIG. 9) on the sagittal plane, i.e., when the user wears the open earphone, part or the whole of the sound production component may cover the cavum concha, and when the open earphone is in the wearing state, the centroid of the first projection (e.g., point O in FIG. 9) may be located in a projection region of the cavum concha of the user on the sagittal plane. The position of the centroid O of the first projection may be related to a dimension of the sound production component. For example, if the dimension of the sound production component 11 in long-axis direction Y or the short-axis direction Z is too small, a volume of the sound production component 11 may be relatively small, thus an area of the internally arranged diaphragm may also be relatively small, resulting in low efficiency of the diaphragm pushing the air inside the housing of the sound production component 11 to produce sound, which may affect the acoustic output effect of the open earphone. When the dimension of the sound production component 11 in long-axis direction Y or the short-axis direction Z is too large, the sound production component 11 may exceed the range of the cavum concha, and may not extend into the cavum concha or form the cavity-like structure, or a total dimension of the gap formed between the sound production component 11 and the cavum concha may be very large, affecting the listening volume at the opening of the ear canal when the user wears the open earphone 10 and the far-field sound leakage effect. In some embodiments, in order to enable the user to have better acoustic output quality when wearing the open earphone 10, a distance between the centroid O of the first projection and a projection of an edge of the cavum concha (e.g., a cavum concha edge 1015 as shown in FIG. 20) of the user on the sagittal plane may be within a range of 4 mm-25 mm. Preferably, the distance between the centroid of the first projection and the projection of the edge of the cavum concha of the user on the sagittal plane may be within a range of 6 mm-20 mm. More preferably, the distance between the centroid of the first projection and the projection of the edge of the cavum concha of the user on the sagittal plane may be within a range of 10 mm-18 mm. For example, in some embodiments, a minimum distance d5 between the centroid of the first projection and the projection of the edge of the cavum concha of the user on the sagittal plane may be 5 mm, and a maximum distance d6 between the centroid of the first projection and the projection of the edge of the cavum concha of the user on the sagittal plane may be 24.5 mm. In some embodiments, by controlling the distance between the centroid of the first projection and the projection of the edge of the cavum concha of the user on the sagittal plane to be within the range of 4 mm-25 mm, at least part of the structure of the sound production component 11 may cover the cavum concha to form a quasi-cavity acoustic model with the cavum concha. Therefore, the sound output by the sound production component may be better transmitted to the user, and the wearing stability of the open earphone 100 may be improved by the force exerted by the cavum concha on the sound production component 11.

It should be noted that the positional relationship between the sound production component 11 and the auricle or the cavum concha in the embodiments of the present may be determined by the following exemplary method. First, at a specific position, a picture of a human head model with ears may be taken in the direction facing the sagittal plane, the edge of the cavum concha and the contour of the auricle (e.g., inner and outer contours) may be marked, which may be viewed as the projection contours of various structures of the ear on the sagittal plane; then at the specific position, a picture of the open earphone worn on the human head model may be taken at the same angle, and the contour of the sound production component may be marked, which may be regarded as the projection of the sound production component on the sagittal plane, and the positional relationship between the sound production component (e.g., centroid, end, etc.) and the edge of the cavum concha and the auricle may be determined through comparative analysis.

Figure 10A:
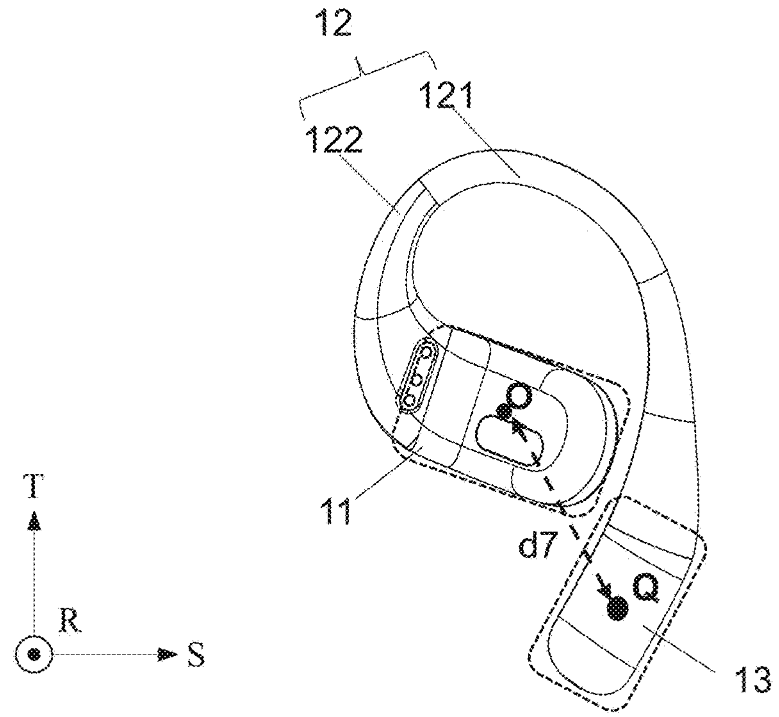
FIG. 10A is a schematic diagram illustrating an exemplary structure of an open earphone according to some embodiments of the present disclosure.
Figure 10B:
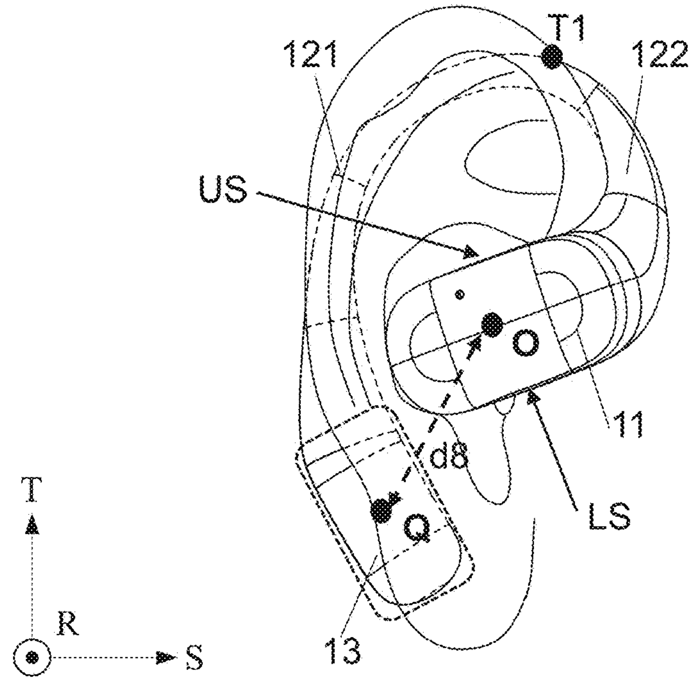
FIG. 10B is a schematic diagram illustrating a user wearing an open earphone according to some embodiments of the present disclosure.

FIG. 10A is a schematic diagram illustrating an exemplary structure of an open earphone according to some embodiments of the present disclosure. FIG. 10B is a schematic diagram illustrating a user wearing an open earphone according to some embodiments of the present disclosure. As shown in FIG. 10A and FIG. 10B, the open earphone 10 may include a suspension structure 12, a sound production component 11, and a battery compartment 13, wherein the sound production component 11 and the battery compartment 13 may be respectively located at two ends of the suspension structure 12. In some embodiments, the suspension structure 12 may be the ear hook in FIG. 10A or FIG. 10B. The ear hook may include a first portion 121 and a second portion 122 connected in sequence. The first portion 121 may be hung between a rear inner side of the auricle of the user and the head of the user, and extends toward the neck along the rear inner side of the auricle. The second portion 122 may extend to a front outer side of the auricle and connect the sound production component 11, and the sound production component 11 may be located close to the ear canal but not block the opening of the ear canal. An end of the first portion 121 away from the sound production component 11 may be connected to the battery compartment 13, and a battery electrically connected to the sound production component 11 may be arranged in the battery compartment 3. In some embodiments, the ear hook may be an arc structure adapted to a connection part between the auricle and the head. When the user wears the open earphone 10, the sound production component 11 and the battery compartment 13 may be respectively located on the front outer side and the rear inner side of the auricle. The sound production component 11 may extend toward the first portion 121 of the ear hook, and the whole or part of the structure of the sound production component 11 may extend into the cavum concha, and cooperate with the cavum concha to form a cavity-like structure. When a dimension (length) of the first portion 121 in an extension direction of the first portion 121 is too small, the battery compartment 13 may be near the top of the auricle of the user, then the first portion 121 and the second portion 122 may not provide sufficient contact area to the ear or the head for the open earphone 10, causing the open earphone 10 to fall off easily from the ear. Therefore, a length of the first portion 121 of the ear hook may be long enough to ensure that the ear hook may provide sufficient contact area to the ear or the head, thereby increasing the resistance of open earphone to falling off from the human ear or the head. In addition, when the distance between the end of the sound production component 11 and the first portion 121 of the ear hook is too large, the battery compartment 13 may be away from the auricle in the wearing state, which may not provide sufficient clamping force for the open earphone, and the open earphone may be liable to fall off. When the distance between the end of the sound production component 11 and the first portion 121 of the ear hook is too small, the battery compartment 13 or the sound production component 11 may squeeze the auricle, which may affect the wearing comfort when user wears the open earphone for a long time. Taking the user wearing the open earphone as an example, the length of the first portion 121 of the ear hook in the extension direction and a distance between the end of the sound production component 11 and the first portion 121 may be represented by a distance between the centroid O of the projection (i.e., the first projection) of the sound production component 11 on the sagittal plane and the centroid Q of the projection of the battery compartment 13 on the sagittal plane. In order to ensure that the ear hook may provide a large enough contact area to the ear or the head, the distance of the centroid Q of the projection of the battery compartment 13 on the sagittal plane relative to the horizontal plane (e.g., the ground plane) may be smaller than a distance of the centroid O of the projection of the sound production component 11 on the sagittal plane relative to the horizontal plane, i.e., in the wearing state, the centroid Q of the projection of the battery compartment 13 on the sagittal plane may be located below the centroid O of the projection of the sound production component 11 on the sagittal plane. In the wearing state, the part or whole position of the sound production component 11 may extend into the cavum concha, and the position of the sound production component 11 may be relatively fixed. If the distance between the centroid O of the projection of the sound production component 11 on the sagittal plane and the centroid Q of the projection of the battery compartment 13 on the sagittal plane is too small, the battery compartment 13 may be tightly attached to or even press against the rear inner side of the auricle, which may affect the wearing comfort of the user. If the distance between the centroid O of the projection of the sound production component 11 on the sagittal plane and the centroid Q of the projection of the battery compartment 13 on the sagittal plane is too large, the length of the first portion 121 of the ear hook may also be relatively long, causing the user to clearly feel that the part of earphone located on the rear inner side of the auricle is heavy or the position of the battery compartment 13 relative to the auricle is far away when wearing the open earphone, the earphone being prone to fall off during exercise of the user, thereby affecting the wearing comfort of the user and the wearing stability of the open earphone. In order to make the user have better stability and comfort when wearing the open earphone 10, in the wearing state, a fourth distance d8 between the centroid O of the projection of the sound production component 11 on the sagittal plane and the centroid Q of the projection of the battery compartment 13 on the sagittal plane may be within a range of 20 mm-30 mm. Preferably, the fourth distance d8 between the centroid O of the projection of the sound production component 11 on the sagittal plane and the centroid Q of the projection of the battery compartment 13 on the sagittal plane may be within a range of 22 mm-28 mm. More preferably, the fourth distance d8 between the centroid O of the projection of the sound production component 11 on the sagittal plane and the centroid Q of the projection of the battery compartment 13 on the sagittal plane may be within a range of 23 mm-26 mm. Due to the elasticity of the ear hook, the distance between the centroid O of the projection of the sound production component 11 on the sagittal plane and the centroid Q of the projection of the battery compartment 13 on the sagittal plane may vary in the wearing state and the non-wearing state of the open earphone. In some embodiments, in the non-wearing state, a third distance d7 between the centroid of the projection of the sound production component 11 on a specific reference plane and the centroid of the projection of the battery compartment 13 on the specific reference plane may be within a range of 16.7 mm-25 mm. Preferably, in the non-wearing state, the third distance d7 between the centroid of the projection of the sound production component 11 on the specific reference plane and the centroid of the projection of the battery compartment 13 on the specific reference plane may be within a range of 18 mm-23 mm. More preferably, in the non-wearing state, the third distance d7 between the centroid of the projection of the sound production component 11 on the specific reference plane and the centroid of the projection of the battery compartment 13 on the specific reference plane may be within a range of 19.6 mm-21.8 mm. In some embodiments, the specific reference plane may be the sagittal plane of the human body or the ear hook plane. In some embodiments, the specific reference plane may be the sagittal plane. At this time, in the non-wearing state, the centroid of the projection of the sound production component on the sagittal plane may be compared to the centroid of the projection of the sound production component on the specific reference plane, and the centroid of the projection of the battery compartment on the sagittal plane may be compared to the centroid of the projection of the battery compartment on the specific reference plane. For example, the non-wearing state may be represented by removing the auricle structure from the human head model, and fixing the sound production component on the human head model in the same posture as the wearing state using a fixing component or adhesive. In some embodiments, the specific reference plane may be the ear hook plane. The ear hook structure may be an arc structure. The ear hook plane may be a plane formed by three most protruding points on the ear hook, i.e., the plane that supports the ear hook when the ear hook is placed freely. For example, when the ear hook is placed on a horizontal plane, the horizontal plane may support the ear hook, and the horizontal plane may be regarded as the ear hook plane. In other embodiments, the ear hook plane also refers to a plane formed by a bisector that bisects or roughly bisects the ear hook along a length extension direction of the ear hook. In the wearing state, although the ear hook plane has a certain angle relative to the sagittal plane, the ear hook may be approximately regarded as fitting the head at this time, and thus the angle may be very small. For the convenience of calculation and description, it may also be possible to use the ear hook plane as the specific reference plane instead of the sagittal plane.

Taking the specific reference plane as the sagittal plane as an example, the distance between the centroid O of the projection of the sound production component 11 on the sagittal plane and the centroid Q of the projection of the battery compartment 13 on the sagittal plane may vary in the wearing state and the non-wearing state of the open earphone 10. A variation value may reflect a softness of the ear hook. When the softness of the ear hook is too large, the overall structure and shape of the open earphone 10 may be unstable, and may not provide strong support for the sound production component 11 and the battery compartment 13, the wearing stability may also poor, and the open earphone may be liable to fall off. Considering that the ear hook may be hung at the connection part between the auricle and the head, when the softness of the ear hook is too small, the open earphone 10 may not be liable to deform. When the user wears the open earphone, the ear hook may closely fit or even pressure against a region between the ears or the head, affecting wearing comfort. In order to make the user have better stability and comfort when wearing the open earphone 10, in some embodiments, a ratio of a variation value of the distance between the centroid O of the projection of the sound production component 11 on the sagittal plane and the centroid Q of the projection of the battery compartment 13 on the sagittal plane in the wearing state and the non-wearing state of the open earphone 10 to the distance between the centroid O of the projection of the sound production component 11 on the sagittal plane and the centroid Q of the projection of the battery compartment 13 on the sagittal plane in the non-wearing state of the open earphone may be within a range of 0.3-0.8. Preferably, the ratio of the variation value of the distance between the centroid O of the projection of the sound production component 11 on the sagittal plane and the centroid Q of the projection of the battery compartment 13 on the sagittal plane in the wearing state and the non-wearing state of the open earphone 10 to the distance between the centroid O of the projection of the sound production component 11 on the sagittal plane and the centroid Q of the projection of the battery compartment 13 on the sagittal plane in the non-wearing state of the open earphone may be within a range of 0.45-0.68.

It should be noted that, the shape and the centroid Q of the projection of the battery compartment 13 on the sagittal plane may be found in the relevant descriptions on the shape and the centroid O of the projection of the sound production component 11 on the sagittal plane in the present disclosure. In addition, the battery compartment 13 and the first portion 121 of the ear hook may be mutually independent structures. The battery compartment 13 and the first portion 121 of the ear hook may be connected in an inserting mode, a clamping mode, etc. The projection of the battery compartment 13 on the sagittal plane may be obtained more accurately by using a splicing point or a splicing line between the battery compartment 13 and the first portion 121 when the projection of the battery compartment 13 is determined.

Figure 11:
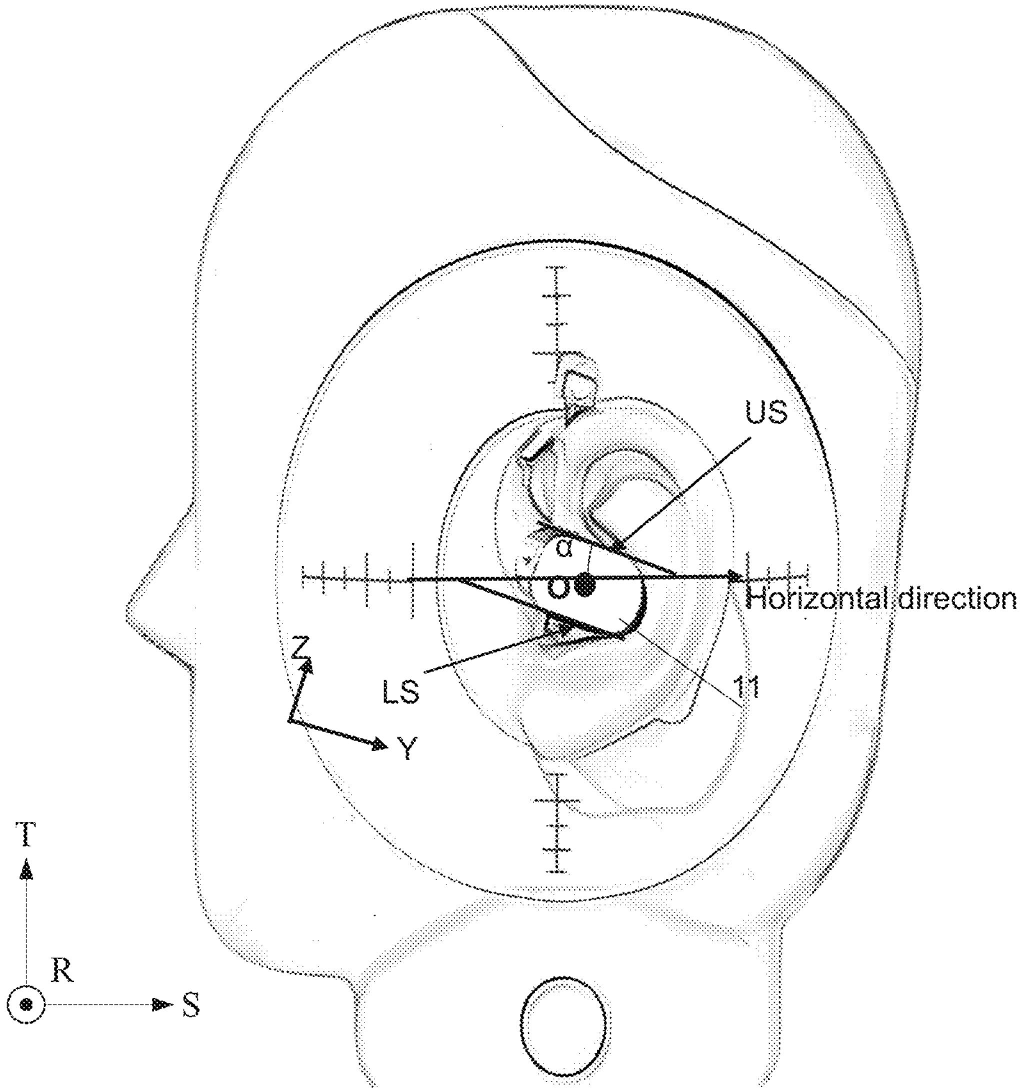
FIG. 11 is a schematic diagram illustrating an exemplary wearing state of an open earphone according to some other embodiments of the present disclosure.
Figure 12:
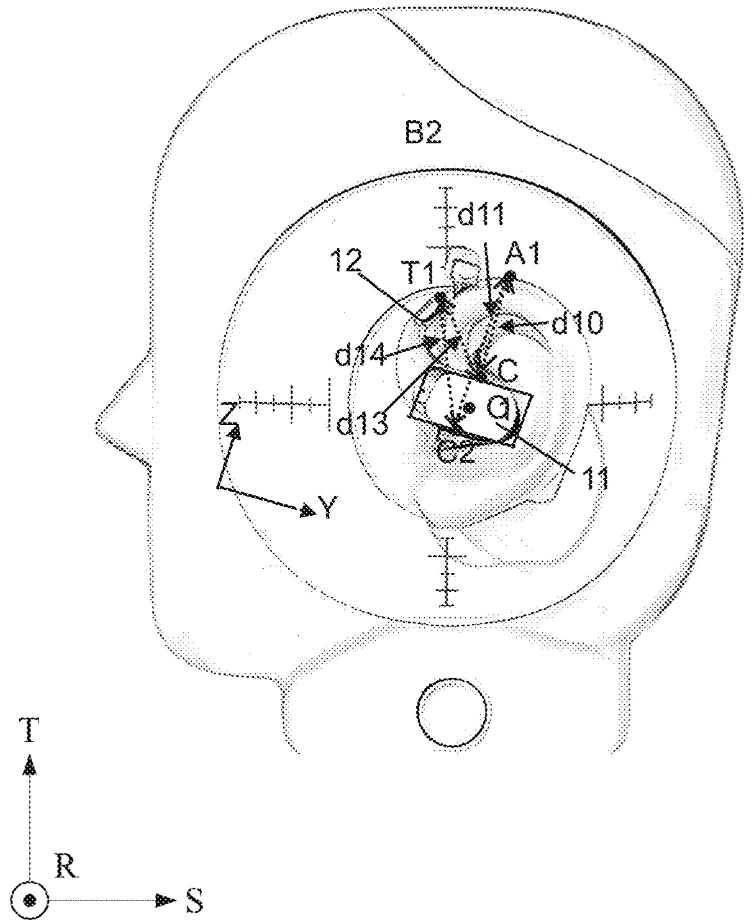
FIG. 12 is a schematic diagram illustrating an exemplary wearing state of an open earphone according to some other embodiments of the present disclosure.

FIG. 11 is a schematic diagram illustrating an exemplary wearing state of an open earphone according to some other embodiments of the present disclosure. FIG. 12 is a schematic diagram illustrating an exemplary wearing state of an open earphone according to some other embodiments of the present disclosure. In some embodiments, the sound production component 11 may be a cuboid, quasi-cuboid, cylinder, ellipsoid, or other regular or irregular three-dimensional structures. When the sound production component 11 extends into the cavum concha, as the overall contour of the cavum concha is an irregular structure similar to an arc, the sound production component 11 may not completely cover or fit the contour of the cavity, thus several gaps may be formed. An overall dimension of the gaps may be approximately regarded as the opening $S_1$ of the leaking structure in the cavity-like model in FIG. 6. A dimension of the sound production component 11 fitting or covering the contour of the cavum concha may be approximately regarded as an unperforated area S0 of the cavity-like structure in FIG. 6. As shown in FIG. 7, the larger the relative opening size $S_1$/S0, the smaller the listening index. As the larger the relative opening, the more sound components that the contained sound source radiates directly outward, and the less sound reaching the listening position, causing the listening volume to decrease with the increase of the relative opening, which in turn leads to the decrease in the listening index. In some embodiments, while ensuring that the ear canal is not blocked, it may also be necessary to consider that the dimension of the gaps formed between the sound production component 11 and the cavum concha may be as small as possible, and the overall volume of the sound production component 11 may not be too large or too small. On the premise that the overall volume or shape of the sound production component 11 is specific, the wearing angle of the sound production component 11 relative to the auricle and the cavum concha may be considered. For example, when the sound production component 11 is a quasi-cuboid structure and the user wears the open earphone 10, and an upper side surface US or a lower side surface LS of the sound production component 11 is parallel or approximately parallel and vertically or approximately vertical (also be understood that a projection of the upper side surface US or the lower side surface LS of the sound production component 11 on the sagittal plane is parallel or approximately parallel and vertically or approximately vertical to the sagittal axis) relative to the horizontal plane, a large gap may be formed when the sound production component 11 fits or covers part of the cavum concha of the ear, which may affect the listening volume of the user. In order to make the whole or part of the sound production component 11 extend into the cavum concha, increase an area of the region of the cavum concha covered by the sound production component 11, reduce the dimension of the gap formed between the sound production component 11 and the edge of the cavum concha, and improve the listening volume at the opening of the ear canal, an inclination angle α (as shown in FIG. 11) between the projection of the upper side surface US or the lower side surface LS of the sound production component 11 on the sagittal plane and the horizontal direction may not be too large or too small. If the inclination angle α mentioned above is too small, it is likely to cause the end FE to compress the tragus while entering the cavum concha, making the user feel uncomfortable. In addition, it may result in the sound outlet 112 on the sound production component 11 being too far away from the ear canal. If the inclination angle α mentioned above is too large, it is also easy to cause the sound production component 11 to fail to extend into the cavum concha, and make the ear canal be blocked by the sound production component 11. In other words, such setting not only allows the sound production component 11 to extend into the cavum concha, but also allows the sound outlet 112 on the sound production component 11 to have a suitable distance from the ear canal, so that the user can hear more sounds produced by the sound production component 11 under the condition that the ear canal is not blocked. In some embodiments, when the open earphone 10 is in the wearing state, the inclination angle α between a projection of the upper side surface US or the lower side surface LS of the sound production component 11 on the sagittal plane and the horizontal direction may be within a range of 15°-60°. Preferably, when the open earphone 10 is in the wearing state, the inclination angle α between the projection of the upper side surface US or the lower side surface LS of the sound production component 11 on the sagittal plane and the horizontal direction may be within a range of 10°-28°. Preferably, when the open earphone 10 is in the wearing state, the inclination angle α between the projection of the upper side surface US or the lower side surface LS of the sound production component 11 on the sagittal plane and the horizontal direction may be within a range of 13°-21°. More preferably, when the open earphone 10 is in the wearing state, the inclination angle α between the projection of the upper side surface US or the lower side surface LS of the sound production component 11 on the sagittal plane and the horizontal direction may be within a range of 15°-19°. It should be noted that the inclination angle between the projection of the upper side surface US of the sound production component 11 on the sagittal plane and the horizontal direction and the inclination angle between the projection of the lower side surface LS of the sound production component 11 on the sagittal plane and the horizontal direction may be the same or different. For example, when the upper side surface US is parallel to the lower side surface LS of the sound production component 11, the inclination angle between the projection of the upper side surface US on the sagittal plane and the horizontal direction and the inclination angle between the projection of the lower side surface LS on the sagittal plane and the horizontal direction may be the same. As another example, when the upper side surface US is not parallel to the lower side surface LS of the sound production component 11, or one of the upper side surface US or the lower side surface LS is a planar wall, and the other of the upper side surface US or the lower side surface LS is a non-planar wall (e.g., a curved wall), the inclination angle between the projection of the upper side surface US on the sagittal plane and the horizontal direction and the inclination angle between the projection of the lower side surface LS on the sagittal plane and the horizontal direction may be different. In addition, when the upper side surface US or the lower side surface LS is a curved surface, the projection of the upper side surface US or the lower side surface LS on the sagittal plane may be a curved line or a broken line. At this time, the inclination angle between the projection of the upper side surface US on the sagittal plane and the horizontal direction may be an included angle between a tangent line to a point at which the curved line or the broken line has a largest distance from the ground plane and the horizontal direction, and the inclination angle between the projection of the lower side surface LS on the sagittal plane and the horizontal direction may be an included angle between a tangent line to a point at which the curved line or the broken line has a smallest distance from the ground plane and the horizontal direction. In some embodiments, when the upper side surface US or the lower side surface LS is the curved surface, a tangent line parallel to the long-axis direction Y on the projection may also be selected, and an included angle between the tangent line and the horizontal direction may be used to represent the inclination angle between the projection of the upper side surface US or the lower side surface LS on the sagittal plane and the horizontal direction.

The whole or part structure of the sound production component 11 may extend into the cavum concha to form the cavity-like structure as shown in FIG. 4. The listening volume when the user wears the open earphone 10 may be related to the dimension of the gap formed between the sound production component 11 and the edge of the cavum concha. The smaller the dimension of the gap, the greater the listening volume at the opening of the ear canal of the user. The dimension of the gap formed between the sound production component 11 and the edge of the cavum concha may not only be related to the inclination angle between the projection of the upper side surface US or the lower side surface LS of the sound production component 11 on the sagittal plane and the horizontal plane, but also be related to the dimension of the sound production component 11. For example, if the dimension of the sound production component 11 (especially the dimension along the short-axis direction Z in FIG. 12) is too small, the gap formed between the sound production component 11 and the edge of the cavum concha may be too large, affecting the listening volume at the opening of the ear canal of the user. When the dimension of the sound production component 11 (especially the dimension along the short-axis direction Z in FIG. 12) is too large, the sound production component 11 may have few parts extending into the cavum concha, or the sound production component 11 may completely cover the cavum concha. At this time, the opening of the ear canal may be equivalent to being blocked, the connection between the opening of the ear canal and the external environment may not be realized, and the original design intention of the open earphone may not be achieved. In addition, the excessively large dimension of the sound production component 11 may affect the wearing comfort of the user and the convenience of carrying around. As shown in FIG. 12, in some embodiments, the distance between a midpoint of the projection of the upper side surface US and the lower side surface LS of the sound production component 11 on the sagittal plane and the highest point of the second projection may reflect the dimension of the sound production component 11 along the short-axis direction Z (the direction indicated by the arrow Z in FIG. 12) and the position of the sound production component 11 relative to the cavum concha. In order to improve the listening effect of the open earphone 10 while ensuring that the open earphone 10 does not block the opening of the ear canal of the user, in some embodiments, the distance d10 between midpoint C1 of the projection of the upper side surface US of the sound production component 11 on the sagittal plane and the highest point A1 of the second projection may be within a range of 20 mm-38 mm, and a distance d11 between the midpoint C2 of the projection of the lower side surface LS of the sound production component 11 on the sagittal plane and the highest point A1 of the second projection may be within a range of 32 mm-57 mm. Preferably, the distance d10 between the midpoint C1 of the projection of the upper side surface US of the sound production component 11 on the sagittal plane and the highest point A1 of the second projection may be within a range of 24 mm-36 mm, and the distance d11 between the midpoint C2 of the projection of the lower side surface LS of the sound production component 11 on the sagittal plane and the highest point A1 of the second projection may be within a range of 36 mm-54 mm. More preferably, the distance between the midpoint C1 of the projection of the upper side surface US of the sound production component 11 on the sagittal plane and the highest point A1 of the second projection may be within a range of 27 mm-34 mm, and the distance between the midpoint C2 of the projection of the lower side surface LS of the sound production component 11 on the sagittal plane and the highest point A1 of the second projection may be within a range of 38 mm-50 mm. It should be noted that, when the projection of the upper side surface US of the sound production component 11 on the sagittal plane is the curved line or the broken line, the midpoint C1 of the projection of the upper side surface US of the sound production component 11 on the sagittal plane may be selected by the following example. A line segment may be drawn by selecting two farthest points on the projection of the upper side surface US on the sagittal plane along the major axis direction, a mid-perpendicular line may be drawn by selecting a midpoint on the line segment, and an interaction point of the mid-perpendicular line and the projection may be the midpoint of the projection of the upper side surface US of the sound production component 11 on the sagittal plane. In some alternative embodiments, a point of the projection of the upper side surface US on the sagittal plane with a smallest distance from the highest point of the second projection may be selected as the midpoint C1 of the projection of the upper side surface US of the sound production component 11 on the sagittal plane. The midpoint of the projection of the lower side surface LS of the sound production component 11 on the sagittal plane may be selected in the same manner as above. For example, a point of the projection of the lower side surface LS on the sagittal plane with a largest distance from the highest point of the second projection may be selected as the midpoint C2 of the projection of the lower side surface LS of the sound production component 11 on the sagittal plane.

In some embodiments, the distance between the midpoint of the projection of the upper side surface US and the lower side surface LS of the sound production component 11 on the sagittal plane and the projection of the vertex of the ear hook on the sagittal plane may reflect the dimension of the sound production component 11 along the short-axis direction Z (the direction indicated by the arrow Z in FIG. 3A). The upper vertex of the ear hook may be a position on the ear hook that has the largest distance relative to a specific point on the neck of the user in the vertical axis direction when the user wears the open earphone, e.g., the vertex T1 in FIG. 10B. In order to improve the listening effect of the open earphone 10 while ensuring that the open earphone 10 does not block the opening of the ear canal of the user, in some embodiments, a distance d13 between the midpoint C1 of the projection of the upper side surface US of the sound production component 11 on the sagittal plane and the projection of the upper vertex T1 of the ear hook on the sagittal plane may be within a range of 17 mm-36 mm, and a distance d14 between the midpoint C2 of the projection of the lower side surface LS of the sound production component 11 on the sagittal plane and the projection of the upper vertex of the ear hook on the sagittal plane may be within a range of 28 mm-52 mm. Preferably, the distance d13 between the midpoint C1 of the projection of the upper side surface US of the sound production component 11 on the sagittal plane and the projection of the upper vertex T1 of the ear hook on the sagittal plane may be within a range of 21 mm-32 mm, and the distance d14 between the midpoint C2 of the projection of the lower side surface LS of the sound production component 11 on the sagittal plane and the projection of the upper vertex T1 of the ear hook on the sagittal plane may be within a range of 32 mm-48 mm. More preferably, the distance d13 between the midpoint C1 of the projection of the upper side surface US of the sound production component 11 on the sagittal plane and the projection of the upper vertex T1 of the ear hook on the sagittal plane may be within a range of 24 mm-30 mm, and the distance d14 between the midpoint C2 of the projection of the lower side surface LS of the sound production component 11 on the sagittal plane and the projection of the upper vertex T1 of the ear hook on the sagittal plane may be within a range of 35 mm-45 mm.

Furthermore, referring to FIG. 3A, in some embodiments, while ensuring that the sound production component 11 is at least partially inserted into the cavum concha, in order to allow the projection of the sound outlet 112 on the sagittal plane to be partially or fully located within the region of the cavum concha, when the user wears the open earphone 10, a distance from the center $O_3$ of the sound outlet 112 to the upper vertex T1 of the ear hook is in a range of 22.5 mm-34.5 mm. In some embodiments, when the user wears the open earphones 10, the distance from the center $O_3$ of the sound outlet 112 to the upper vertex T1 of the ear hook is in a range of 25 mm-32 mm. In some embodiments, when the user wears the open earphone 10, the distance from the center $O_3$ of the sound outlet 112 to the upper vertex T1 of the ear hook is in a range of 27.5 mm-29.5 mm. In some embodiments, when the user wears the open earphone 10, the distance from the center $O_3$ of the sound outlet 112 to the upper vertex T1 of the ear hook is in a range of 28 mm-29 mm. In some embodiments, when the user wears the open earphone 10, a distance between a projection of the center $O_3$ of the sound outlet 112 on the sagittal plane and a projection of the upper vertex T1 of the ear hook on the sagittal plane is in a range of 18 mm-30 mm. In some embodiments, when the user wears the open earphone 10, the distance between the projection of the center $O_3$ of the sound outlet 112 on the sagittal plane and the projection of the upper vertex T1 of the ear hook on the sagittal plane is in a range of 20 mm-25 mm. It should be noted that in the present disclosure, a distance between the center $O_3$ of the sound outlet 112 and a specific location point (e.g., the upper vertex T1 of the ear hook) in the wearing state may be determined in the following exemplary manner: in the wearing state, a plurality of components (e.g., the sound production component 11, the first portion 121 and the second portion 122 of the ear hook) of the open earphone 10 may be secured to a stabilizing component using a fixing component or adhesive. A human head model and an auricle structure are then removed, at which point the open earphone 10 secured on the stabilizing component is shown with the side facing the ear and in the same posture as the posture in the wearing state. At this point, the distance between the center $O_3$ of the sound outlet 112 and the specific location point (e.g., the upper vertex T1 of the ear hook) may be directly measured.

In some embodiments, a ratio of a distance between the center $O_3$ of the sound outlet 112 and the upper vertex T1 of the ear hook to the short-axis dimension of the sound production component 11 may not be too large or too small. Under the condition that a distance between the center $O_3$ of the sound outlet 112 and the upper vertex T1 of the ear hook is a constant, if the above-mentioned ratio is too small, the short-axis dimension of the sound production component 11 may be too large, which may result in a larger overall weight of the sound production component and a small distance between the housing and the ear hook, thereby causing uncomfortable for the user to wear. If the above-mentioned ratio is too large, the short-axis dimension of the sound production component 11 may be too small, which may result in a small area for the transducer of the sound production component 11 to push the air, thereby causing the low sound generation efficiency of the sound production component. Therefore, in order to ensure that the sound generation efficiency of the sound production component is sufficiently high and to improve the user's wearing comfort, and cause the projection of the sound outlet 112 on the sagittal plane can be located at least partially within the cavum concha region, and cause the sound outlet 112 as close as possible to the ear canal, when the user wears the open earphone 10, the ratio of the distance between the center $O_3$ of the sound outlet 112 and the upper vertex T1 of the ear hook to the short-axis dimension of the sound production component 11 is in a range of 1.2-2.2. In some embodiments, when the user wears the open earphone 10, the ratio of the distance between the center $O_3$ of the sound outlet 112 and the upper vertex T1 of the ear hook to the short-axis dimension of the sound production component 11 is in a range of 1.4-2.0. In some embodiments, in the case of ensuring that the sound production component is at least partially inserted into the cavum concha, in order to enable the sound outlet 112 to be close to the ear canal and to make the sound production component 11 smaller in overall dimension for ease of portability, when the user wears the open earphone 10, the ratio of the distance between the center $O_3$ of the sound outlet 112 and the upper vertex T1 of the ear hook to the short-axis dimension of the sound production component 11 is in a range of 1.5-1.8. In some embodiments, when the user wears the open earphone 10, the ratio of the distance between the center $O_3$ of the sound outlet 112 and the upper vertex T1 of the ear hook to the short-axis dimension of the sound production component 11 is in a range of 1.6-1.7. In some embodiments, a positional relationship between the center $O_3$ of the sound outlet 112 and the upper vertex T1 of the ear hook may also be represented by a distance from a projection point O' of the center $O_3$ of the sound outlet 112 on the sagittal plane to a projection point T1' of the upper vertex T1 of the ear hook on the sagittal plane. For example, in some embodiments, a ratio of the distance from the projection point O' of the center $O_3$ of the sound outlet 112 on the sagittal plane to the projection point T1' of the upper vertex T1 of the ear hook on the sagittal plane to a short-axis dimension of the projection (i.e., the first projection) of the sound production component 11 on the sagittal plane is in a range of 1.7-2.6. In some embodiments, the ratio of the distance from the projection point O' of the center $O_3$ of the sound outlet 112 on the sagittal plane to the projection point T1' of the upper vertex T1 of the ear hook on the sagittal plane to the short-axis dimension of the first projection of the sound production component 11 on the sagittal plane is in a range of 1.9-2.5.

In the wearing manner where the sound production component is at least partially inserted into the cavum concha, as the sound outlet 112 is placed at a position on the inner side surface IS closer to the ear canal, a ratio of the distance between the center $O_3$ of the sound outlet 112 and the upper vertex T1 of the ear hook to a distance from the center $O_3$ of the sound outlet 112 to the upper side surface US of the sound production component 11 may not be too large. Additionally, in order to ensure a sufficient distance between the sound production component 11 and the upper vertex T1 of the ear hook for the sound production component 11 to extend into the cavum concha, the ratio of the distance between the center $O_3$ of the sound outlet 112 and the upper vertex T1 of the ear hook to the distance from the center $O_3$ of the sound outlet 112 to the upper side surface US of the sound production component 11 may not be too small. In some embodiments, when the user wears the open earphone 10, the ratio of the distance between the center $O_3$ of the sound outlet 112 and the upper vertex T1 of the ear hook to the distance from the center $O_3$ of the sound outlet 112 to the upper side surface US of the sound production component 11 is in a range of 1.90-2.95. Preferably, while ensuring that the sound production component is at least partially inserted into the cavum concha, in order to place the sound outlet 112 near the ear canal and ensure that a smaller overall dimension of the sound production component 11 for portability, when the use wears the open earphone 10, the ratio of the distance between the center $O_3$ of the sound outlet 112 and the upper vertex T1 of the ear hook to the distance from the center $O_3$ of the sound outlet 112 to the upper side surface US of the sound production component 11 is in a range of 2.2-2.6. In some embodiments, a ratio of the distance between the projection point O' of the center $O_3$ of the sound outlet 112 on the sagittal plane and the projection point T1' of the upper vertex T1 of the ear hook on the sagittal plane to a distance from the projection point O' of the center $O_3$ of the sound outlet 112 on the sagittal plane to a projection of the upper side face US of the sound production component 11 on the sagittal plane is in a range of 2.8-4.3. In some embodiments, the ratio of the distance between the projection point O' of the center $O_3$ of the sound outlet 112 on the sagittal plane and the projection point T1' of the upper vertex T1 of the ear hook on the sagittal plane to the distance from the projection point O' of the center $O_3$ of the sound outlet 112 on the sagittal plane to the projection of the upper side face US of the sound production component 11 on the sagittal plane is in a range of 3.2-3.8.

In the wearing manner where the sound production component is at least partially inserted into the cavum concha, as the sound outlet 112 is placed at a position on the inner side surface IS closer to the ear canal, a ratio of the distance between the center $O_3$ of the sound outlet 112 and the upper vertex T1 of the ear hook to the distance from the center $O_3$ of the sound outlet 112 to the lower side surface LS of the sound production component 11 may not be too small. In addition, in order to ensure that the sound outlet has a sufficient area (to prevent the sound outlet from being too small in area to cause excessive acoustic impedance), a width of the sound outlet 112 may not be too small, and the ratio of the distance between the center $O_3$ of the sound outlet 112 and the upper vertex T1 of the ear hook to the distance from the center $O_3$ of the sound outlet 112 to the lower side surface LS of the sound production component 11 may not be too large either. In some embodiments, when the user wears the open earphone 10, ratio of the distance between the center $O_3$ of the sound outlet 112 and the upper vertex T1 of the ear hook to the distance from the center $O_3$ of the sound outlet 112 to the lower side surface LS of the sound production component 11 is in a range of 4.50-6.76.

Figure 13A:
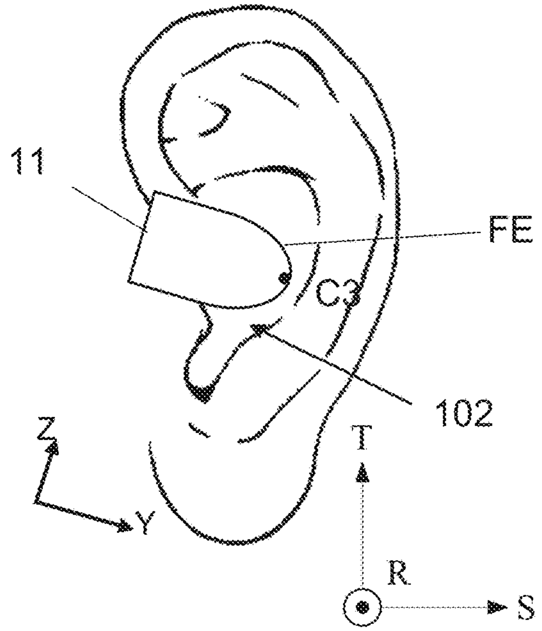
FIG. 13A is a schematic diagram illustrating an exemplary matching position of an open earphone and an ear canal of a user according to some embodiments of the present disclosure.
Figure 13B:
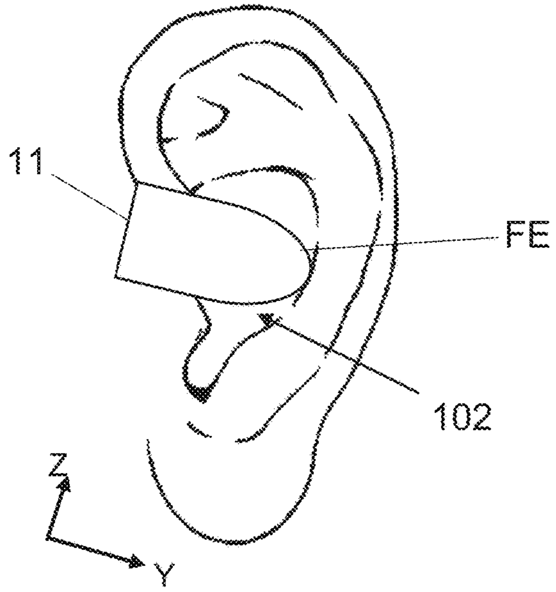
FIG. 13B is a schematic diagram illustrating an exemplary matching position of an open earphone and an ear canal of a user according to some embodiments of the present disclosure.
Figure 13C:
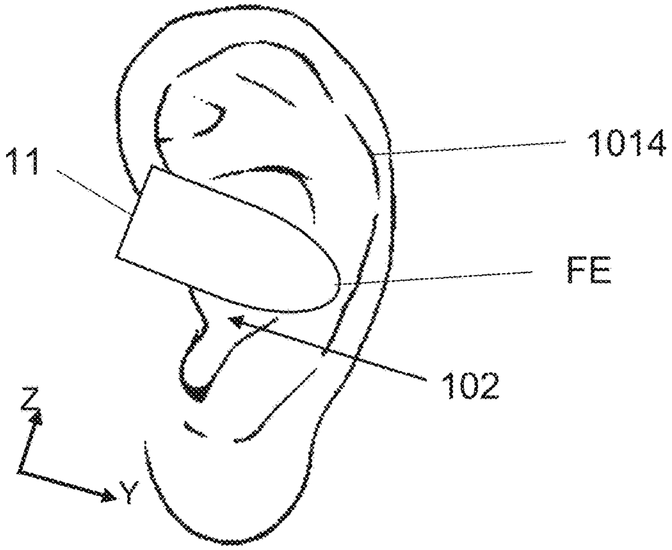
FIG. 13C is a schematic diagram illustrating an exemplary matching position of an open earphone and an ear canal of a user according to some embodiments of the present disclosure.

FIGS. 13A-13C are schematic diagrams illustrating different exemplary matching positions of an open earphone and an ear canal of a user according to some embodiments of the present disclosure.

The dimension of the gap formed between the sound production component 11 and the edge of the cavum concha may be related to the inclination angle between the projection of the upper side surface US or the lower side surface LS of the sound production component 11 on the sagittal plane and the horizontal plane, the dimension of the sound production component 11 (e.g., the dimension in the short-axis direction Z in FIG. 3A), and the distance between the end FE of the sound production component 11 and the edge of the cavum concha. It should be noted that the end FE of the sound production component 11 refers to an end of the sound production component 11 opposite to the connecting end CE connected to the suspension structure 12, and is also referred to as a free end. The sound production component 11 may be a regular or irregular structure. An exemplary description is given to further illustrate the end FE of the sound production component 11. For example, when the sound production component 11 is a cuboid structure, an end wall of the sound production component 11 may be a plane, and the end FE of the sound production component 11 may be an end sidewall opposite to the connecting end CE connected to the suspension structure 12 in the sound production component 11. As another example, when the sound production component 11 is a sphere, an ellipsoid or an irregular structure, the end FE of the sound production component 11 refers to a specific region away from the connecting end CE obtained by cutting the sound production component 11 along the X-Z plane (a plane formed by the short-axis direction Z and the thickness direction X). A ratio of a dimension of the specific region along the long-axis direction Y to a dimension of the sound production component along the long-axis direction Y may be within a range of 0.05-0.2.

Specifically, one end of the sound production component 11 may be connected to the suspension structure 12 (the second portion 122 of the ear hook). When the user wears the open earphone, its position may be relatively forward, and a distance between the end FE (free end) of the sound production component 11 and the connecting end CE may reflect the dimension of the sound production component 11 in the major axis direction (the direction indicated by the arrow Y in FIG. 3A). Therefore, the position of the end FE of the sound production component 11 relative to the cavum concha may affect an area of the cavum concha covered by the sound production component 11, and the dimension of the gap formed between the sound production component 11 and the contour of the cavum concha may be affected, thereby affecting the listening volume at the opening of the ear canal of the user. A distance between the midpoint of the projection of the end FE of the sound production component 11 on the sagittal plane and the projection of the edge of the cavum concha on the sagittal plane may reflect the position of the end FE of the sound production component 11 relative to the cavum concha and an extent to which the sound production component 11 covers the cavum concha of the user. The cavum concha refers to a concave region below the crus of helix, i.e., the edge of the cavum concha may be at least defined by the sidewall below the crus of helix, the contour of the tragus, an intertragic notch, an antitragic apex, an antihelix-antitragus notch, and the contour of the antihelix corresponding to the cavum concha. It should be noted that when the projection of the end FE of the sound production component 11 on the sagittal plane is a curved line or a broken line, the midpoint of the projection of the end FE of the sound production component 11 on the sagittal plane may be selected by the following exemplary method. A line segment may be drawn by selecting two farthest points on the projection of the end FE on the sagittal plane along the minor axis direction, a mid-perpendicular line may be drawn by selecting a midpoint on the line segment, and an interaction point of the mid-perpendicular line and the projection may be the midpoint of the projection of the end of the sound production component 11 on the sagittal plane. In some embodiments, when the end FE of the sound production component 11 is a curved surface, a tangent point where a tangent line parallel to the short-axis direction Z on the projection may also be selected as the midpoint of the projection of the end FE of the sound production component 11 on the sagittal plane.

As shown in FIG. 13A, when the sound production component 11 does not abut against the edge of the cavum concha 102, the end FE of the sound production component 11 may be located in the cavum concha 102, i.e., the midpoint of the projection of the end FE of the sound production component 11 on the sagittal plane may not overlap with the projection of the edge of the cavum concha 102 on the sagittal plane. As shown in FIG. 13B, the sound production component 11 of the open earphone 10 may extend into the cavum concha 102, and the end FE of the sound production component 11 may abut against the edge of the cavum concha 102. It should be noted that, in some embodiments, when the end FE of the sound production component 11 abuts against the edge of the cavum concha 102, the midpoint of the projection of the end FE of the sound production component 11 on the sagittal plane may overlap with the projection of the edge of the cavum concha 102 on the sagittal plane. In some embodiments, when the end FE of the sound production component 11 abuts against the edge of the cavum concha 102, the midpoint of the projection of the end FE of the sound production component 11 on the sagittal plane may not overlap with the projection of the edge of the cavum concha 102 on the sagittal plane. For example, the cavum concha 102 may be the concave structure, the sidewall corresponding to the cavum concha 102 may not a flat wall surface, and the projection of the edge of the cavum concha on the sagittal plane may be an irregular two-dimensional shape. The projection of the sidewall corresponding to the cavum concha 102 on the sagittal plane may be on or outside the contour of the shape. Therefore, the midpoint of the projection of the end FE of the sound production component 11 on the sagittal plane may not overlap with the projection of the edge of the cavum concha 102 on the sagittal plane. For example, the midpoint of the projection of the end FE of the sound production component 11 on the sagittal plane may be located on an inner side or an outer side of the projection of the edge of the cavum concha 102 on the sagittal plane. In the embodiments of the present disclosure, when the end FE of the sound production component 11 is located in the cavum concha 102, the distance between the midpoint of the projection of the end FE of the sound production component 11 on the sagittal plane and the projection of the edge of the cavum concha 102 on the sagittal plane may be within a specific range (e.g., not greater than 6 mm), which may be considered that the end FE of the sound production component 11 may abut against the edge of the cavum concha 102. As shown in FIG. 13C, the sound production component 11 of the open earphone 10 may cover the cavum concha, and the end FE of the sound production component 11 may be located between the edge of the cavum concha 102 and an inner contour 1014 of the auricle.

Referring to FIGS. 13A-13C, when the end FE of the sound production component 11 is located in the edge of the cavum concha 102, if the distance between the midpoint C3 of the projection of the end FE of the sound production component 11 on the sagittal plane and the projection of the edge of the cavum concha 102 on the sagittal plane is too small, the area of the cavum concha 102 covered by the sound production component 11 may be too small, and the dimension of the gap formed between the sound production component 11 and the edge of the cavum concha may be relatively large, which may affect the listening volume at the opening of the ear canal of the user. When the midpoint C3 of the projection of the end FE of the sound production component on the sagittal plane is located at a position between the projection of the edge of the cavum concha 102 on the sagittal plane and a projection of the inner contour 1014 of the auricle on the sagittal plane, if the distance between the midpoint C3 of the projection of the end FE of the sound production component on the sagittal plane and the projection of the edge of the cavum concha 102 on the sagittal plane is too large, the end FE of the sound production component 11 may interfere with the auricle, and the area of the cavum concha 102 covered by the sound production component 11 may not be increased. In addition, when the user wears the open earphone, if the end FE of the sound production component 11 is not located in the cavum concha 102, the edge of the cavum concha 102 may not limit the sound production component 11, and the open earphone may be liable to fall off. In addition, an increase in the dimension of the sound production component 11 in a certain direction may increase weight of the sound production component 11, which may affect the wearing comfort and portability of the user. Accordingly, in order to ensure that the open earphone 10 has a better listening effect and the wearing comfort and stability of the user, in some embodiments, the distance between the midpoint C3 of the projection of the end FE of the sound production component 11 on the sagittal plane and the projection of the edge of the cavum concha on the sagittal plane may not be greater than 16 mm. Preferably, the distance between the midpoint C3 of the projection of the end FE of the sound production component 11 on the sagittal plane and the projection of the edge of the cavum concha on the sagittal plane may not be greater than 13 mm. More preferably, the distance between the midpoint C3 of the projection of the end FE of the sound production component 11 on the sagittal plane and the projection of the edge of the cavum concha on the sagittal plane may not be greater than 8 mm. It should be noted that, in some embodiments, the distance between the midpoint C3 of the projection of the end FE of the sound production component 11 on the sagittal plane and the projection of the edge of the cavum concha 102 on the sagittal plane may be a minimum distance between the midpoint C3 of the projection of the end FE of the sound production component 11 on the sagittal plane and the projection of the edge of the cavum concha 102 on the sagittal plane. In some embodiments, the distance between the midpoint C3 of the projection of the end FE of the sound production component 11 on the sagittal plane and the projection of the edge of the cavum concha 102 on the sagittal plane also refers to a distance along the sagittal axis. In addition, in a specific wearing scenario, it may also be that the points, other than the midpoint C3, of the projection the end FE of the sound production component 11 on the sagittal plane may abut against the edge of the cavum concha. At this time, the distance between the midpoint C3 of the projection of the end FE of the sound production component 11 on the sagittal plane and the projection of the edge of the cavum concha on the sagittal plane may be greater than 0 mm. In some embodiments, the distance between the midpoint C3 of the projection of the end FE of the sound production component 11 on the sagittal plane and the projection of the edge of the cavum concha on the sagittal plane may be within a range of 2 mm-16 mm. Preferably, the distance between the midpoint C3 of the projection of the end FE of the sound production component 11 on the sagittal plane and the projection of the edge of the cavum concha on the sagittal plane may be within a range of 4 mm-10.48 mm.

Figure 14A:
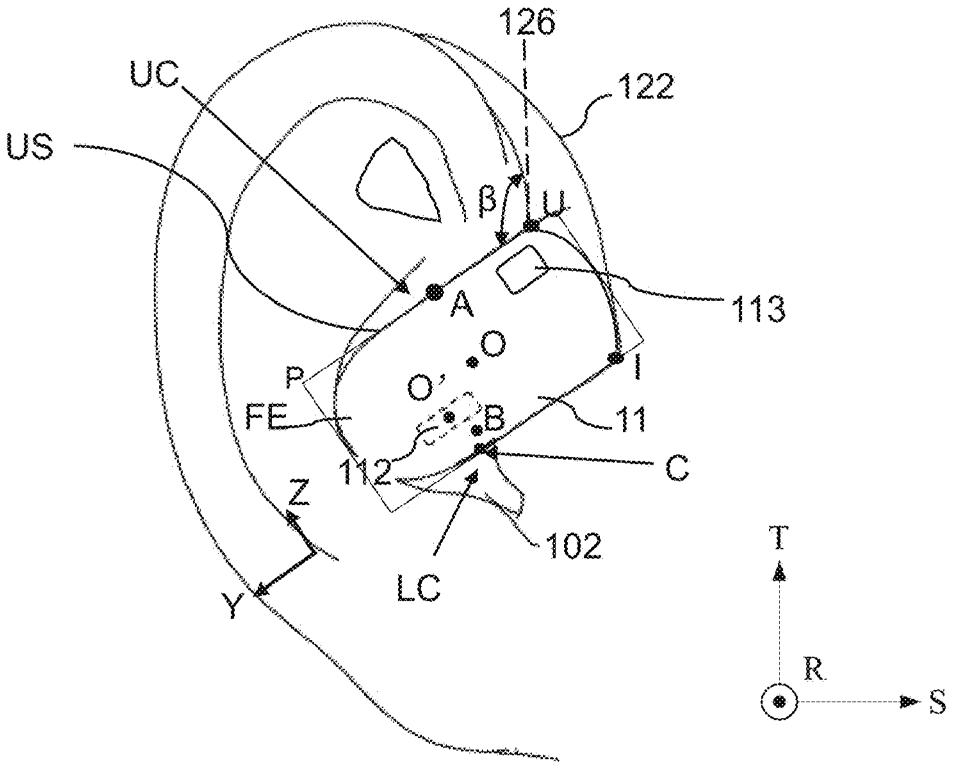
FIG. 14A is a schematic diagram illustrating an exemplary wearing state of an open earphone according to some embodiments of the present disclosure.
Figure 14B:
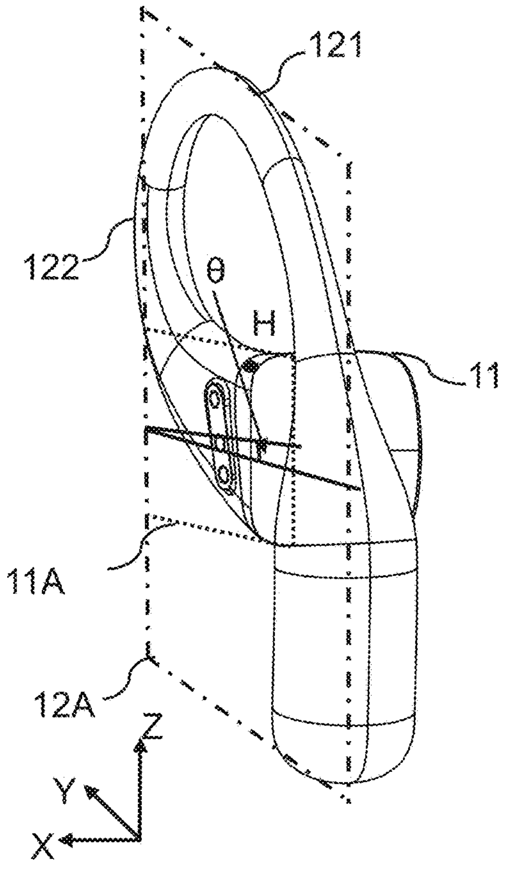
FIG. 14B is a schematic structural diagram illustrating an open earphone in a non-wearing state according to some embodiments of the present disclosure.

FIG. 14A is a schematic diagram illustrating an exemplary wearing state of an open earphone according to some embodiments of the present disclosure. FIG. 14B is a schematic structural diagram illustrating an open earphone in a non-wearing state according to some embodiments of the present disclosure.

In some embodiments, when the user wears the open earphone, part or the whole structure of the sound production component may extend into the cavum concha, and a certain included angle may be formed between the upper side surface US of the sound production component 11 and the second portion 122 of the ear hook. Referring to FIG. 14A, the included angle may be expressed by an included angle β between a tangent line 126 of the projection of the upper side surface US of the sound production component 11 on the sagittal plane and a tangent line 126 of a projection of a connection part between the second portion 122 of the ear hook and the upper side surface US of the sound production component 11 on the sagittal plane. Specifically, the upper side surface US of the sound production component 11 and the second portion 122 of the ear hook may have the connection part. The projection of the connection part on the sagittal plane may be a point U. The tangent line 126 of the projection of the second portion 122 of the ear hook may be drawn through the point U. When the upper side surface US is the curved surface, the projection of the upper side surface US on the sagittal plane may be the curved line or the broken line. At this time, the included angle between the projection of the upper side surface US on the sagittal plane and the tangent line 126 may be an included angle between a tangent line to a point at which the curved line or the broken line has a largest distance from the ground plane and the tangent line 126. In some embodiments, when the upper side surface US is the curved surface, a tangent line parallel to the long-axis direction Y on the projection may also be selected. An included angle between the tangent line and the horizontal direction may represent an inclination angle between the projection of the upper side surface US on the sagittal plane and the tangent line 126. In some embodiments, the included angle β may be within a range of 100°-150°. Preferably, the included angle β may be within a range of 110°-140°. More preferably, the included angle β may be within a range of 120°-135°.

In some embodiments, referring to FIG. 3A and FIG. 14A, in order to stably wear the sound production component 11 on a user's ear, and to facilitate the formation of a cavity-like structure, and to make the cavity-like structure have at least two leaking structures, the end FE may abut inside the cavum concha in the long-axis direction Y and the short-axis direction Z, at which time the inner side surface IS of the sound production component 11 is inclined relative to the sagittal plane, and at this time at least a first leaking structure UC close to the top of the head (i.e., a gap between the cavum concha and the upper boundary of the inner side surface IS) and a second leaking structure LC close to the ear canal (i.e., a gap between the cavum concha and the lower boundary of the inner side surface IS) exist between the inner side surface IS of the sound production component and the cavum concha. As a result, the listening volume, especially in the low and middle frequencies, can be increased, while still retaining the far-field sound leakage cancellation effect, thus enhancing the acoustic output performance of the open earphone 10.

In some embodiments, when the open earphone 10 is worn in the manner shown in FIG. 3A, a first leaking structure UC and a second leaking structure LC formed between the inner side surface IS of the sound production component and the cavum concha have a certain scale in the long-axis direction Y and in the short-axis direction Z. In some embodiments, in order to facilitate understanding of the positions of the first leaking structure UC and the second leaking structure LC, when the open earphone 10 is in the wearing state, a midpoint of two points formed by intersecting the upper/lower boundary of the inner side surface IS with the ear (e.g., a side wall of the cavum concha, the helix foot), respectively, may be taken as a position reference point of the first leaking structure UC/the second leaking structure LC. In some embodiments, in order to facilitate understanding of the positions of the first leaking structure UC and the second leaking structure LC, when the open earphone 10 is in the wearing state, a midpoint of the upper boundary of the inner side surface IS may be taken as a position reference point of the first leaking structure UC, and a trisection point of the lower boundary of the inner side surface IS close to the free end FE (hereinafter referred to as a ⅓ point of the lower boundary of the inner side surface IS) as a position reference point of the second leaking structure LC.

It should be noted that the midpoint of the upper boundary of the inner side surface IS of the sound production component 11 may be selected by the following exemplary manner. A projection profile of the sound production component 11 along the thickness direction X may be determined; two first locating points on the sound production component 11 that have a largest perpendicular distance along the long-axis direction Y from a short-axis center plane of a magnetic circuit assembly (e.g., a magnetic circuit assembly 1144 described below) of a transducer and are closest to the upper side surface US may be determined; a projection profile of the sound production component 11 between the two first locating points may be determined to be a projection line of the upper boundary of the inner side surface IS; and a line segment of the sound production component 11 that is closest to the inner side surface IS and whose projection coincides with the projection line of the upper boundary of the inner side surface IS may be determined as the upper boundary of the inner side surface IS. In some alternative embodiments, when one or more side surfaces of the sound production component 11 (e.g., the inner side surface IS, the upper side surface US, and/or the lower side surface LS) are curved surfaces, an intersection line between a tangent plane of the inner side surface IS which is parallel to the Y-Z plane (a plane formed by the short-axis direction Z and the long-axis direction Y) and a tangent plane of the upper side surface US which is parallel to the X-Y plane (a plane formed by the thickness direction X and the long-axis direction Y) is the upper boundary of the inner side surface IS. A midpoint of the upper boundary of the inner side surface IS may be an intersection point between the upper boundary of the inner side surface IS and the short-axis center plane of the magnetic circuit assembly. The short-axis center plane of the magnetic circuit assembly refers to a plane parallel to the short-axis direction Z and the thickness direction X of the sound production component 11 and passing through a center axis of the magnetic circuit assembly.

Similarly, the ⅓ point of the lower boundary of the inner side surface IS of the sound production component 11 may be selected by the following exemplary manner. The projection profile of the sound production component 11 along the thickness direction X may be determined; two second locating points on the sound production component 11 that have a largest perpendicular distance along the long-axis direction Y from the short-axis center plane of the magnetic circuit assembly and are closest to the lower side surface LS may be determined; a projection profile of the sound production component 11 between the two second locating points may be determined as a projection line of the lower boundary of the inner side surface IS; a line segment on the sound production component 11 that is closest to the inner side surface IS and whose projection coincides with the projection line of the lower boundary of the inner side surface IS may be determined as the lower boundary of the inner side surface IS. In some alternative embodiments, when one or more of the side surfaces of the sound production component 11 (e.g., the inner side surface IS, the upper side surface US, and/or the lower side surface LS) are curved surfaces, an intersection line between a tangent plane of the inner side surface IS which is parallel to the Y-X plane (a plane formed by the short-axis direction Z and the long-axis direction Y) and a tangent plane of the lower side surface LS which is parallel to the Z-X plane (the plane formed by the thickness direction X and the long-axis direction Y) is the lower boundary of the inner side surface IS. The ⅓ point of the lower boundary of the inner side surface IS may be an intersection point between the lower boundary of the inner side surface IS and a trisection plane of the magnetic circuit assembly proximate to the end FE. The trisection plane of the magnetic circuit assembly proximate to the end FE refers to a plane parallel to the short-axis direction Z and the thickness direction X of the sound production component 11 and passing through the ⅓ point of a long-axis of the magnetic circuit assembly which is proximate to the end FE.

Merely by way of example, the present disclosure uses the midpoint of the upper boundary of the inner side surface IS and the ⅓ point of the lower boundary of the inner side surface IS as position reference points of the first leaking structure UC and the second leaking structure LC, respectively. It should be known that the selected midpoint of the upper boundary of the inner side surface IS and the ⅓ point of the lower boundary of the inner side surface IS are only used as exemplary reference points to describe the positions of the first leaking structure UC and the second leaking structure LC. In some embodiments, other reference points may also be selected to describe the positions of the first leaking structure UC and the second leaking structure LC. For example, due to the variability of different users' ears, the first leaking structure UC/the second leaking structure LC formed when the open earphone 10 is worn is a gap with a gradually changing width, in this case, the reference position of the first leaking structure UC/the second leaking structure LC may be a position on the upper boundary/the lower boundary of the inner side surface IS near a region with the largest gap width. For example, the ⅓ point of the upper boundary of the inner side surface IS near the end FE may be used as the position of the first leaking structure UC, and the midpoint of the lower boundary of the inner side surface IS may be used as the position of the second leaking structure LC.

In some embodiments, as shown in FIG. 14A, the projection of the upper boundary of the inner side surface IS on the sagittal plane may coincide with the projection of the upper side surface US on the sagittal plane, and the projection of the lower boundary of the inner side surface IS on the sagittal plane may coincide with the projection of the lower side surface LS on the sagittal plane. The projection of the position reference point of the first leaking structure UC (e.g., the midpoint of the upper boundary of the inner side surface IS) on the sagittal plane is point A. The projection of the position reference point of the second leaking structure LC (e.g., the ⅓ point of the lower boundary of the inner side surface IS) on the sagittal plane is point C. It should be noted that, in the present disclosure, relative position relationships among the center $O_3$ of the sound outlet 112, the upper vertex T1 of the ear hook, the reference position point of the first leaking structure UC (e.g., the midpoint of the upper boundary of the inner side surface IS), the reference position point of the second leaking structure LC (e.g., the ⅓ point of the lower boundary of the inner side surface IS), the center of the ear canal opening, or the like, may also be characterized by position relationships among a projection point of the center $O_3$ of the sound outlet 112, a projection point of the upper vertex T1 of the ear hook, a projection point of the reference position point of the first leaking structure UC (e.g., the midpoint of the upper boundary of the inner side surface IS), a projection point of the reference position point of the second leaking structure LC (e.g., the ⅓ point of the lower boundary of the inner side surface IS), a projection point of the center of the ear canal opening, etc., on the sagittal plane.

As shown in FIG. 14A, in some embodiments, in the wearing state, the projection of the sound production component 11 of the open earphone 10 on the sagittal plane may at least partially cover the ear canal of the user, but the ear canal can communicate with the outside world through the cavum concha to achieve the liberation of both ears of the user. In some embodiments, since the sound from the pressure relief hole 113 can be transmitted into the cavity-like structure through the leaking structure (e.g., the first leaking structure UC or the second leaking structure LC) and cancel each other out with the sound from the sound outlet 112, the pressure relief hole 113 cannot be too close to the leaking structure. Under the premise that the sound production component 11 is at least partially inserted in the cavum concha, a distance between the pressure relief hole 113 and the sound outlet 112 is limited by a dimension of the sound production component 11, thus, in order to make the open earphone 10 have a high listening index in the whole frequency range, the pressure relief hole 113 should be located as far away as possible from the sound outlet 112, for example, the pressure relief hole 113 is set on the upper side surface US or the outer side surface OS of the sound production component 11. In this case, a ratio of a distance between the projection point O' of the center $O_3$ of the sound outlet 112 on the sagittal plane and the projection point A of the midpoint of the upper boundary of the inner side surface IS on the sagittal plane to a distance between the projection point O' of the center $O_3$ of the sound outlet 112 on the sagittal plane and a projection point of the center of the pressure relief hole 113 on the sagittal plane is in a range of 0.7 to 1.3.

When the relative positions of the sound outlet 112 and the pressure relief hole 113 remain constant (i.e., a distance between the sound outlet 112 and the pressure relief hole 113 remains constant), the larger the volume V of the cavity-like structure is, the smaller the overall (full frequency range) listening index of the open earphone 10 is. This is because of the influence of the air-acoustic resonance in the cavity-like structure, at the resonance frequency of the cavity-like structure, the air-acoustic resonance can occur within the cavity-like structure and radiate outward the sound that is much larger than the sound of the pressure relief hole 113, resulting in a great increase in the sound leakage, and further making the listening index significantly smaller near the resonance frequency.

The greater the distance between the projection point O' of the center $O_3$ of the sound outlet 112 on the sagittal plane and the projection point A of the midpoint of the upper boundary of the inner side surface IS on the sagittal plane is, the greater the volume V of the cavity-like structure is. Thus, in some embodiments, under the premise that the sound production component 11 is at least partially inserted into the cavum concha, in order to enable the sound outlet 112 to be set close to the ear canal, and to make the cavity-like structure have a suitable volume V, so that the sound collection effect in the ear canal is relatively good, the distance between the projection point O' of the center $O_3$ of the sound outlet 112 on the sagittal plane and the projection point A of the midpoint of the upper boundary of the inner side surface IS on the sagittal plane is in a range of 10.0 mm to 15.2 mm. In some embodiments, the distance between the projection point O' of the center $O_3$ of the sound outlet 112 on the sagittal plane and the projection point A of the midpoint of the upper boundary of the inner side surface IS on the sagittal plane is in a range of 11.0 mm to 14.2 mm. In some embodiments, the distance between the projection point O' of the center $O_3$ of the sound outlet 112 on the sagittal plane and the projection point A of the midpoint of the upper boundary of the inner side surface IS on the sagittal plane is in a range of 12.0 mm to 14.7 mm. In some embodiments, the distance between the projection point O' of the center $O_3$ of the sound outlet 112 on the sagittal plane and the projection point A of the midpoint of the upper boundary of the inner side surface IS on the sagittal plane is in a range of 12.5 mm to 14.2 mm. In some embodiments, the distance between the projection point O' of the center $O_3$ of the sound outlet 112 on the sagittal plane and the projection point A of the midpoint of the upper boundary of the inner side surface IS on the sagittal plane is in a range of 13.0 mm to 13.7 mm. It should be noted that in the present disclosure, in the wearing state, a distance from the projection point O' of the center $O_3$ of the sound outlet 112 on the sagittal plane to a particular point (for example, a projection point A of the midpoint of the upper boundary of the inner side surface IS on the sagittal plane) may be determined by the following exemplary manner. A plurality of components (e.g., the sound production component 11, the first portion 121 of the ear hook, and the second portion 122 of the ear hook) of the open earphone 10 in the wearing state may be secured to a stabilizing member by employing a fixing member or glue. Then the human head model and an ear structure are removed, at which point the open earphone 10 stabilized on the stabilizing member is shown with the side facing the ear and in the same posture as the posture in the wearing state. At this point, a position of the projection point O' of the center $O_3$ of the sound outlet 112 on the sagittal plane may be determined. Further, a distance from the projection point O' of the center $O_3$ of the sound outlet 112 on the sagittal plane to the particular point may be determined.

In some embodiments, in order to ensure that the sound production component is at least partially insert into the cavum concha and bring the sound outlet 112 close to the ear canal, so as to significantly increase the listening volume at the listening position, a ratio of the distance between the projection point O' of the center $O_3$ of the sound outlet 112 on the sagittal plane and the projection point A of the midpoint of the upper boundary of the inner side surface IS on the sagittal plane to a distance between the projection point A of the midpoint of the upper boundary of the inner side surface IS on the sagittal plane and the projection point T1' of the upper vertex T1 of the ear hook on the sagittal plane is in a range of 0.35-0.60. In some embodiments, the ratio of the distance between the projection point O' of the center $O_3$ of the sound outlet 112 on the sagittal plane and the projection point A of the midpoint of the upper boundary of the inner side surface IS on the sagittal plane to the distance between the projection point A of the midpoint of the upper boundary of the inner side surface IS on the sagittal plane and the projection point T1' of the upper vertex T1 of the ear hook on the sagittal plane is in a range of 0.4-0.55. In some embodiments, the ratio of the distance between the projection point O' of the center $O_3$ of the sound outlet 112 on the sagittal plane and the projection point A of the midpoint of the upper boundary of the inner side surface IS on the sagittal plane to the distance between the projection point A of the midpoint of the upper boundary of the inner side surface IS on the sagittal plane and the projection point T1' of the upper vertex T1 of the ear hook on the sagittal plane is in a range of 0.43-0.5. In some embodiments, in a scenario where the listening volume at the listening position is high, to ensure that the sound production component is at least partially insert into the cavum concha, as well as stable wearing of the open earphone 10, the ratio of the distance between the projection point O' of the center $O_3$ of the sound outlet 112 on the sagittal plane and the projection point A of the midpoint of the upper boundary of the inner side surface IS on the sagittal plane to the distance between the projection point A of the midpoint of the upper boundary of the inner side surface IS on the sagittal plane and the projection point T1' of the upper vertex T1 of the ear hook on the sagittal plane is in a range of 0.45-0.49.

In some embodiments, in order to ensure that the sound production component is at least partially insert into the cavum concha and bring the sound outlet 112 close to the ear canal, so as to significantly increase the listening volume at the listening position, a ratio of a distance between the projection point O' of the center $O_3$ of the sound outlet 112 on the sagittal plane and a projection point of the midpoint of the lower boundary of the inner side surface IS on the sagittal plane to a distance between the projection point of the midpoint of the lower boundary of the inner side surface IS on the sagittal plane and the projection point of the upper vertex T1 of the ear hook on the sagittal plane is in a range of 6.1-9.6. In some embodiments, the ratio of the distance between the projection point O' of the center $O_3$ of the sound outlet 112 on the sagittal plane and the projection point of the midpoint of the lower boundary of the inner side surface IS on the sagittal plane to the distance between the projection point of the midpoint of the lower boundary of the inner side surface IS on the sagittal plane and the projection point of the upper vertex T1 of the ear hook on the sagittal plane is in a range of 6.5-9. In some embodiments, the ratio of the distance between the projection point O' of the center $O_3$ of the sound outlet 112 on the sagittal plane and the projection point of the midpoint of the lower boundary of the inner side surface IS on the sagittal plane to the distance between the projection point of the midpoint of the lower boundary of the inner side surface IS on the sagittal plane and the projection point of the upper vertex T1 of the ear hook on the sagittal plane is in a range of 7-8.5. In some embodiments, in order to ensure a higher listening volume at the listening position, the sound production component is at least partially inserted into the cavum concha and the open earphone 10 is stably worn on the ear, the ratio of the distance between the projection point O' of the center $O_3$ of the sound outlet 112 on the sagittal plane and the projection point of the midpoint of the lower boundary of the inner side surface IS on the sagittal plane to the distance between the projection point of the midpoint of the lower boundary of the inner side surface IS on the sagittal plane and the projection point of the upper vertex T1 of the ear hook on the sagittal plane is in a range of 7.5-8.2.

In some embodiments, in order to ensure that the sound production component is at least partially insert into the cavum concha and bring the sound outlet 112 close to the ear canal, so as to significantly increase the listening volume at the listening position, in the wearing state, a ratio of a distance between the center $O_3$ of the sound outlet 112 and the upper vertex T1 of the ear hook to a distance between the center $O_3$ of the sound outlet 112 and the midpoint of the upper boundary of the inner side surface IS is in a range of 1.8-2.8. In some embodiments, in the wearing state, the ratio of the distance between the center $O_3$ of the sound outlet 112 and the upper vertex T1 of the ear hook to the distance between the center $O_3$ of the sound outlet 112 and the midpoint of the upper boundary of the inner side surface IS is in a range of 1.9-2.7. In some embodiments, in the wearing state, the ratio of the distance between the center $O_3$ of the sound outlet 112 and the upper vertex T1 of the ear hook to the distance between the center $O_3$ of the sound outlet 112 and the midpoint of the upper boundary of the inner side surface IS is in a range of 2-2.6. In some embodiments, in order to keep the sound outlet 112 close to the ear canal and ensure stable wearing of the open earphone 10 on the ear, the ratio of the distance between the center $O_3$ of the sound outlet 112 and the upper vertex T1 of the ear hook to the distance between the center $O_3$ of the sound outlet 112 and the midpoint of the upper boundary of the inner side surface IS is in a range of 2.1 and 2.4. In some embodiments, relative positional relationships among the center $O_3$ of the sound outlet 112, the upper vertex T1 of the ear hook, and the midpoint of the upper boundary of the inner side surface IS may also be represented by a ratio of the distance between the projection point O' of the center $O_3$ of the sound outlet 112 on the sagittal plane and the projection point T1' of the upper vertex T1 of the ear hook on the sagittal plane to the distance between the projection point O' of the center $O_3$ of the sound outlet 112 on the sagittal plane and the projection point A of the midpoint of the upper boundary of the inner side surface IS on the sagittal plane. For example, in some embodiments, the ratio of the distance between the projection point O' of the center $O_3$ of the sound outlet 112 on the sagittal plane and the projection point T1' of the upper vertex T1 of the ear hook on the sagittal plane to the distance between the projection point O' of the center $O_3$ of the sound outlet 112 on the sagittal plane and the projection point A of the midpoint of the upper boundary of the inner side surface IS on the sagittal plane is in a range of 1.75-2.70. In some embodiments, the ratio of the distance between the projection point O' of the center $O_3$ of the sound outlet 112 on the sagittal plane and the projection point T1' of the upper vertex T1 of the ear hook on the sagittal plane to the distance between the projection point O' of the center $O_3$ of the sound outlet 112 on the sagittal plane and the projection point A of the midpoint of the upper boundary of the inner side surface IS on the sagittal plane is in a range of 2-2.5.

In some embodiments, due to the presence of the tragus in the vicinity of the ear canal opening, the sound outlet 112 is easily obscured by the tragus. In this case, in order to keep the sound outlet 112 as close to the ear canal as possible and not be obscured, a distance from the projection point O' of the center $O_3$ of the sound outlet 112 on the sagittal plane to a centroid B of the projection of the ear canal opening on the sagittal plane is a range of 2.2 mm to 3.8 mm. In some embodiments, the distance from the projection point O' of the center $O_3$ of the sound outlet 112 on the sagittal plane to the centroid B of the projection of the ear canal opening on the sagittal plane is a range of 2.4 mm to 3.6 mm. In some embodiments, the distance from the projection point O' of the center $O_3$ of the sound outlet 112 on the sagittal plane to the centroid B of the projection of the ear canal opening on the sagittal plane is a range of 2.6 mm to 3.4 mm. In some embodiments, the distance from the projection point O' of the center $O_3$ of the sound outlet 112 on the sagittal plane to the centroid B of the projection of the ear canal opening on the sagittal plane is a range of 2.8 mm to 3.2 mm. It should be noted that the projection of the ear canal opening on the sagittal plane may be approximately considered as an ellipse in shape, and correspondingly, the centroid of the projection of the ear canal opening on the sagittal plane may be a geometric center of the ellipse.

In some embodiments, in order to ensure that the sound production component 11 extends into the cavum concha and that there is a suitable gap (forming a leaking structure of the cavity-like structure) between the upper boundary of the inner side surface IS and the cavum concha, a distance from the projection point A of the midpoint of the upper boundary of the inner side surface IS on the sagittal plane to the centroid B of the projection of the ear canal opening on the sagittal plane ranges from 12 mm to 18 mm. In some embodiments, the distance from the projection point A of the midpoint of the upper boundary of the inner side surface IS on the sagittal plane to the centroid B of the projection of the ear canal opening on the sagittal plane ranges from 13 mm to 17 mm. In some embodiments, the distance from the projection point A of the midpoint of the upper boundary of the inner side surface IS on the sagittal plane to the centroid B of the projection of the ear canal opening on the sagittal plane ranges from 14 mm to 16 mm. In some embodiments, the distance from the projection point A of the midpoint of the upper boundary of the inner side surface IS on the sagittal plane to the centroid B of the projection of the ear canal opening on the sagittal plane ranges from 14.5 mm to 15.5 mm.

In some embodiments, in order to ensure that the sound production component 11 extends into the cavum concha and that there is a suitable gap (forming a leaking structure of the cavity-like structure) between the lower boundary of the inner side surface IS and the cavum concha, a distance from a projection point C of the ⅓ point of the lower boundary of the inner side surface IS on the sagittal plane to the centroid B of the projection of the ear canal opening on the sagittal plane is in a range of 1.7 mm-2.7 mm. In some embodiments, the distance from the projection point C of the ⅓ point of the lower boundary of the inner side surface IS on the sagittal plane to the centroid B of the projection of the ear canal opening on the sagittal plane is in a range of 1.8 mm-2.6 mm. In some embodiments, the distance from the projection point C of the ⅓ point of the lower boundary of the inner side surface IS on the sagittal plane to the centroid B of the projection of the ear canal opening on the sagittal plane is in a range of 1.9 mm-2.5 mm. In some embodiments, the distance from the projection point C of the ⅓ point of the lower boundary of the inner side surface IS on the sagittal plane to the centroid B of the projection of the ear canal opening on the sagittal plane is in a range of 2.0 mm-2.4 mm. In some embodiments, the distance from the projection point C of the ⅓ point of the lower boundary of the inner side surface IS on the sagittal plane to the centroid B of the projection of the ear canal opening on the sagittal plane is in a range of 2.1 mm to 2.3 mm.

In some embodiments, in order to ensure that the sound production component is at least partially insert into the cavum concha and bring the sound outlet 112 close to the ear canal, so as to significantly increase the listening volume at the listening position, in the wearing state, a distance between the centroid O of the first projection and the centroid B of the projection of the user's ear canal opening on the sagittal plane may be in a range of 10 mm-16 mm. In some embodiments, the distance between the centroid O of the first projection and the centroid B of the projection of the user's ear canal opening on the sagittal plane may be in a range of 12 mm-15 mm.

In some embodiments, in order to ensure that the sound production component is at least partially insert into the cavum concha and bring the sound outlet 112 close to the ear canal, so as to significantly increase the listening volume at the listening position, in the wearing state, a ratio of the distance between the center $O_3$ of the sound outlet 112 and the upper vertex T1 of the ear hook to a distance between the center $O_3$ of the sound outlet 112 and the ⅓ point of the lower boundary of the inner side face IS is in a range of 4.9-7.5. In some embodiments, in the wearing state, the ratio of the distance between the center $O_3$ of the sound outlet 112 and the upper vertex T1 of the ear hook to the distance between the center $O_3$ of the sound outlet 112 and the ⅓ point of the lower boundary of the inner side face IS is in a range of 5.5-7. In some embodiments, in the wearing state, the ratio of the distance between the center $O_3$ of the sound outlet 112 and the upper vertex T1 of the ear hook to the distance between the center $O_3$ of the sound outlet 112 and the ⅓ point of the lower boundary of the inner side face IS is in a range of 6-6.5. In some embodiments, to further bring the sound outlet 112 close to the ear canal and ensure stable wearing of the open earphone 10, in the wearing state, the ratio of the distance between the center $O_3$ of the sound outlet 112 and the upper vertex T1 of the ear hook to the distance between the center $O_3$ of the sound outlet 112 and the ⅓ point of the lower boundary of the inner side face IS is in a range of 6.1-6.3. In some embodiments, a relative positional relationship among the center $O_3$ of the sound outlet 112, the upper vertex T1 of the ear hook, and the ⅓ point of the lower boundary of the inner side face IS may also be represented by a ratio of the distance between the projection point O' of the center $O_3$ of the sound outlet 112 on the sagittal plane and the projection point T1' of the upper vertex T1 of the ear hook on the sagittal plane to a distance between the projection point O' of the center $O_3$ of the sound outlet 112 on the sagittal plane and the projection point C of the ⅓ point of the lower boundary of the inner side face IS on the sagittal plane. For example, in some embodiments, the ratio of the distance between the projection point O' of the center $O_3$ of the sound outlet 112 on the sagittal plane and the projection point T1' of the upper vertex T1 of the ear hook on the sagittal plane to the distance between the projection point O' of the center $O_3$ of the sound outlet 112 on the sagittal plane and the projection point C of the ⅓ point of the lower boundary of the inner side face IS on the sagittal plane is in a range of 4.8-7.4. In some embodiments, the ratio of the distance between the projection point O' of the center $O_3$ of the sound outlet 112 on the sagittal plane and the projection point T1' of the upper vertex T1 of the ear hook on the sagittal plane to the distance between the projection point O' of the center $O_3$ of the sound outlet 112 on the sagittal plane and the projection point C of the ⅓ point of the lower boundary of the inner side face IS on the sagittal plane is in a range of 5.5-6.5.

In some embodiments, the larger the distance between the projection point O' of the center $O_3$ of the sound outlet 112 and the projection point C of the ⅓ point of the lower boundary of the inner side face IS on the sagittal plane, the larger the volume V of the cavity-like structure. Thus, under the premise that the sound production component 11 is at least partially inserted into the cavum concha, in order to place the sound outlet 112 close to the ear canal and ensure the cavity-like structure has an appropriate volume V for better sound reception in the ear canal, in some embodiments, the distance between the projection point O' of the center $O_3$ of the sound outlet 112 and the projection point C of the ⅓ point of the lower boundary of the inner side face IS on the sagittal plane is in a range of 3.5 mm-5.6 mm. In some embodiments, the distance between the projection point O' of the center $O_3$ of the sound outlet 112 and the projection point C of the ⅓ point of the lower boundary of the inner side face IS on the sagittal plane is in a range of 3.9 mm-5.2 mm. In some embodiments, the distance between the projection point O' of the center $O_3$ of the sound outlet 112 and the projection point C of the ⅓ point of the lower boundary of the inner side face IS on the sagittal plane is in a range of 4.3 mm-4.8 mm. In some embodiments, the distance between the projection point O' of the center $O_3$ of the sound outlet 112 and the projection point C of the ⅓ point of the lower boundary of the inner side face IS on the sagittal plane is in a range of 4.5 mm-4.6 mm.

The human head is approximately regarded as a quasi-sphere structure, and the auricle is a structure that protrudes relative to the head. When the user wears the open earphone, part of the ear hook 12 may be attached to the head of the user. In order to make the sound production component 11 extend into the cavum concha 102, a certain inclination angle may be formed between the sound production component 11 and the ear hook plane. The inclination angle may be represented by an included angle between a plane corresponding to the sound production component 11 and the ear hook plane. In some embodiments in the present disclosure, the ear hook plane refers to a plane (e.g., a plane where the dotted line 12A in FIG. 14B is located) formed by a bisector that bisects or roughly bisects the ear hook 12 along a length extension direction of the ear hook 12. In some embodiments, the ear hook plane may also be a plane formed by three most protruding points on the ear hook, i.e., a plane that supports the ear hook when the ear hook is placed freely (without external force). For example, when the ear hook is placed on a horizontal plane, the horizontal plane may support the ear hook, and the horizontal plane may be regarded as the ear hook plane. In some embodiments, the plane 11A corresponding to the sound production component 11 may include a sidewall (also referred to as an inner side surface IS) of the sound production component 11 facing the front outer side of the auricle of the user, or a sidewall (also referred to as an outer side surface OS) away from the front outer side of the auricle of the user. When the sidewall of the sound production component 11 facing the front outer side of the auricle of the user or the sidewall of the sound production component 11 away from the front outer side of the auricle of the user is a curved surface, the plane corresponding to the sound production component 11 refers to a tangent plane corresponding to the curved surface at a center position, or a plane approximately coinciding with a curve enclosed by the contour of the edge of the curved surface. Taking the sound production component 11 facing the plane 11A where the sidewall of the front outer side of the auricle of the user is located as an example, the included angle θ formed between the plane 11A and the ear hook plane 12A may be the inclination angle θ of the sound production component 11 relative to the ear hook plane. In some embodiments, the included angle θ may be measured by the following exemplary method. The projection of the sidewall (hereinafter referred to as the inner side surface) of the sound production component 11 close to the ear hook 12 on an X-Y plane and the projection of the ear hook 12 on the X-Y plane may be obtained along the short-axis direction Z, respectively. A first straight line may be drawn by selecting two most protruding points of a side of the projection of the ear hook 12 on the X-Y plane close to (or away from) the projection of the inner side surface of the sound production component 11 on the X-Y plane. When the projection of the inner side surface of the sound production component 11 on the XY plane is a straight line, an included angle between the first straight line and the projection of the inner side on the X-Y plane may be the included angle θ. When the inner side surface of the sound production component 11 is the curved line, the included angle between the first straight line and the long-axis direction Y may be approximately regarded as the included angle θ. It should be noted that the inclination angle θ of the sound production component 11 relative to the ear hook plane in both the wearing state and the non-wearing state of the open-type earphone may be measured using the method. The difference lies in that in the non-wearing state, the inclination angle θ may be directly measured using the method; in the wearing state, the inclination angle θ may be measured using the method when the open earphone is worn on the human head model or an ear model. Considering that if the angle is too large, the contact area between the sound production component 11 and the front outer side of the auricle of the user may be small, which may not provide sufficient contact resistance, and the open earphone may be prone to fall off when the user wears the open earphone. In addition, the dimensions of the gap formed in the cavity-like structure between the sound production component 11 and the cavum concha 102 of the user may be too large, which may affect the listening volume at the opening of the ear canal of the user. If the angle is too small, the sound production component 11 may not effectively extend into the cavum concha when the user wears the open earphone. In order to ensure that the user has a better listening effect when wearing the open earphone 10 and ensure the wearing stability, in some embodiments, when the open earphone is in the wearing state, the inclination angle θ of the sound production component 11 relative to the ear hook plane may be within a range of 15°-28°. Preferably, the inclination angle θ of the sound production component 11 relative to the ear hook plane may be within a range of 16°-25°. More preferably, the inclination angle θ of the sound production component 11 relative to the ear hook plane may be within a range of 18°-23°.

Due to the elasticity of the ear hook, the inclination angle of the sound production component 11 relative to the ear hook plane 12A may vary to a certain extent in the wearing state and the non-wearing state. For example, the inclination angle in the non-wearing state may be smaller than that in the wearing state. In some embodiments, when the open earphone is in the non-wearing state, the inclination angle of the sound production component 11 relative to the ear hook plane may be within a range of 15°-23°, and the ear hook of the open earphone 100 may produce a certain clamping force on the ear of the user when the open earphone 100 is in the wearing state, thereby improving the wearing stability for the user without affecting the wearing experience of the user. Preferably, in the non-wearing state, the inclination angle of the sound production component 11 relative to the ear hook plane 12A may be within a range of 16.5°-21°. More preferably, in the non-wearing state, the inclination angle of the sound production component 11 relative to the ear hook plane 12A may be within a range of 18°-20°.

In some embodiments, due to a physiological structure of the ear 100 having a certain thickness, in the wearing state, there may be a certain distance between the sound outlet 112 and the ear hook plane 12A in the coronal axis direction, so as to exert appropriate pressure on the ear 100 by the sound production component 11. In some embodiments, in order to enhance the wearing comfort of the open earphone 10, and to hold the sound production component 11 against the ear by cooperating with the ear hook 12, in the non-wearing state, a distance between the center $O_3$ of the sound outlet 112 and the ear hook plane 12A is in a range of 3 mm-6 mm. In some embodiments, in the non-wearing state, the distance between the center $O_3$ of the sound outlet 112 and the ear hook plane 12A is in a range of 3.5 mm-5.5 mm. In some embodiments, in the non-wearing state, the distance between the center $O_3$ of the sound outlet 112 and the ear hook plane 12A is in a range of 4.0 mm-5.0 mm. In some embodiments, in the non-wearing state, the distance between the center $O_3$ of the sound outlet 112 and the ear hook plane 12A is in a range of 4.3 mm-4.7 mm.

In some embodiments, when the dimension of the sound production component 11 in the thickness direction X is too small, a volume of the front cavity and the rear cavity formed by the diaphragm and the housing of the sound production component 11 may be too small, a vibration amplitude of the vibration may be limited, and a large sound volume may not be provided. When the dimension of the sound production component 11 in the thickness direction X is too large, the end FE of the sound production component 11 may not completely abut against the edge of the cavum concha 102 in the wearing state, causing the open earphone to easily fall off. The sidewall of the sound production component 11 facing the ear of the user in the coronal axis direction may have an inclination angle relative to the ear hook plane. A distance between a point on the sound production component 11 farthest from the ear hook plane and the ear hook plane may be the dimension of the sound production component 11 in the thickness direction X. As the sound production component 11 is arranged obliquely relative to the ear hook plane, the point on the sound production component 11 farthest from the ear hook plane refers to an intersection point I of the connecting end CE connected to the ear hook, the lower side surface LS, and the outer side surface OS of the sound production component 11. Further, the extent to which the sound production component 11 extends into the cavum concha 11 may be determined by the distance between a point on the sound production component 11 closest to the ear hook plane and the ear hook plane. It may ensure that the dimension of the gap formed between the sound production component 11 and the cavum concha is small and the wearing comfort for the user by setting the distance between the point on the sound production component 11 closest to the ear hook plane and the ear hook plane to be within an appropriate range. The point on the sound production component 11 closest to the ear hook plane refers to an intersection point H of the end FE, the upper sidewall, and the inner side surface of the sound production component 11. In some embodiments, in order to ensure that the sound production component 11 has a better acoustic output effect and the wearing stability and comfort, when the open earphone is in the wearing state, the distance between a point I on the sound production component 11 farthest from the ear hook plane 12A and the ear hook plane 12A may be within a range of 11.2 mm-16.8 mm, and the distance between a point H on the sound production component 11 closest to the ear hook plane 12A and the ear hook plane 12A may be within a range of 3 mm-5.5 mm. Preferably, the distance between the point I on the sound production component 11 farthest from the ear hook plane 12A and the ear hook plane 12A may be within a range of 12 mm-15.6 mm, and the distance between the point H on the sound production component 11 closest to the ear hook plane 12A and the ear hook plane 12A may be within a range of 3.8 mm-5 mm. More preferably, the distance between the point I on the sound production component 11 farthest from the ear hook plane 12A and the ear hook plane 12A may be within a range of 13 mm-15 mm, and the distance between the point H on the sound production component 11 closest to the ear hook plane 12A and the ear hook plane 12A may be within a range of 4 mm-5 mm.

Figure 15:
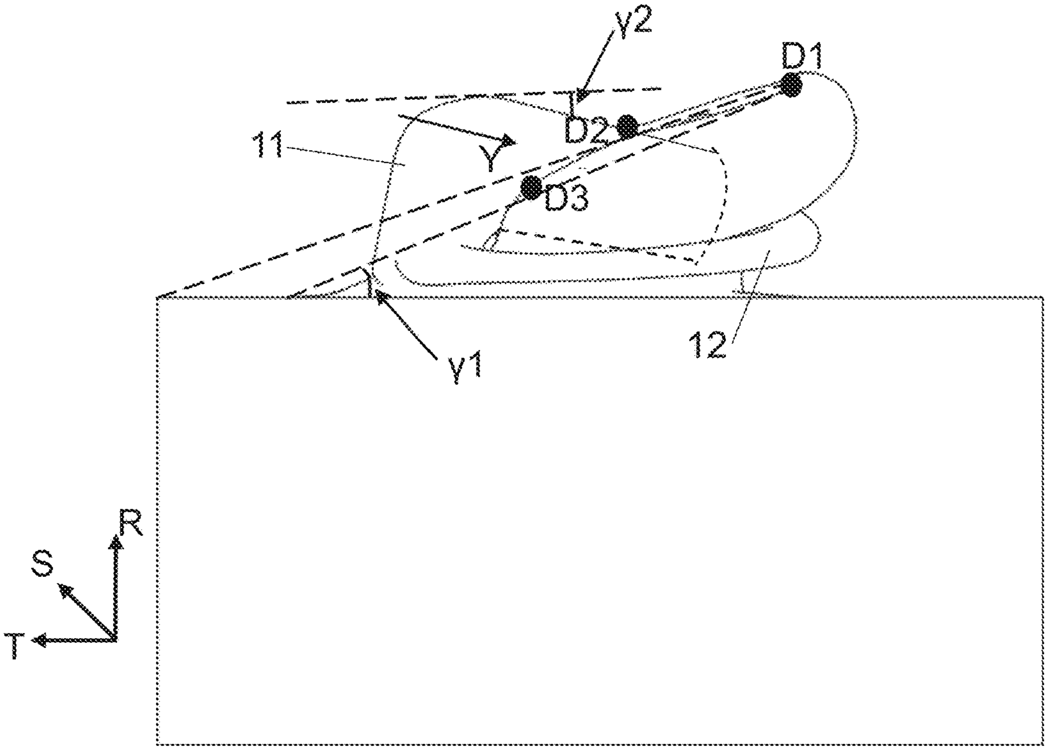
FIG. 15 is a schematic diagram illustrating exemplary wearing of an open earphone according to other embodiments of the present disclosure.

FIG. 15 is a schematic diagram illustrating exemplary wearing of an open earphone according to other embodiments of the present disclosure.

Referring to FIG. 15, in some embodiments, when the open earphone is in the wearing state, at least part of the sound production component 11 of the open earphone may extend into the cavum concha of the user to ensure the acoustic output effect of the sound production component 11 while improving the wearing stability of the open earphone through the force exerted by the cavum concha on the sound production component 11. At this time, the sidewall (e.g., the inner side surface IS or the outer side surface OS) of the sound production component 11 away from the head of the user or facing the opening of the ear canal of the user may have a certain inclination angle relative to an auricle surface of the user. It should be noted that the sidewall of the sound production component 11 away from the head of the user or facing the opening of the ear canal of the user may be a plane or a curved surface. When the sidewall is the curved surface, the inclination angle of the sidewall of the sound production component 11 away from the head of the user or facing the opening of the ear canal of the user relative to the auricle surface of the user may be represented by an inclination angle of a tangent plane (or a plane roughly coincides with a curve formed by the edge contour of the curved surface) corresponding to the curved surface at a center position relative to the auricle surface of the user. It should be noted that in some embodiments of the present disclosure, the auricle surface of the user refers to a plane (e.g., a plane on which points D1, D2, and D3 are located in FIG. 15) on which three points farthest from the sagittal plane of the user are located in different regions (e.g., the top region of the auricle, the tragus region, and the antihelix) on the auricle of the user.

As the projection of the sound production component 11 on the sagittal plane is much smaller than the projection of the auricle on the sagittal plane, and the cavum concha is a concave cavity in the structure of the auricle, when the inclination angle of the sound production component 11 relative to the auricle surface is small, e.g., when the sidewall of the sound production component 11 away from the head of the user or facing the opening of the ear canal of the user is approximately parallel to the auricle surface, the sound production component 11 may not extend into the cavum concha, or the dimension of the gap of the cavity-like structure formed between the sound production component 11 and the cavum concha may be very large, and the user may not obtain a good listening effect when wearing the open earphone. Meanwhile, the sound production component 11 may not abut against the edge of the cavum concha, and the open earphone may be liable to fall off when the user wears the open earphone. When the inclination angle of the sound production component 11 relative to the auricle surface is large, the sound production component 11 may excessively extend into the cavum concha and squeeze the ear of the user, and the user may feel a strong sense of discomfort after wearing the open earphone for a long time. In order to make the user experience a better acoustic output effect when wearing the open earphone and ensure the wearing stability and comfort, the inclination angle of the sidewall (e.g., the outer side surface OS or the inner side surface IS) of the sound production component 11 away from the head of the user or facing the opening of the ear canal of the user relative to the auricle surface of the user may be within a range of 40°-60°. Part or the whole structure of the sound production component 11 may extend into the cavum concha of the user. At this time, the sound production component 11 may have relatively good acoustic output quality, and the contact force between the sound production component 11 and ear canal of the user may be relatively moderate, thereby achieving more stable wearing relative to the ear of the user, and making the user have a more comfortable wearing experience. Preferably, in some embodiments, in order to further optimize the acoustic output quality and the wearing experience of the open earphone in the wearing state, the inclination angle of the sound production component 11 relative to the auricle surface may be controlled to be within a range of 42°-55°. More preferably, in some embodiments, in order to further optimize the acoustic output quality and the wearing experience of the open earphone in the wearing state, the inclination angle of the sound production component 11 relative to the auricle surface may be controlled to be within a range of 44°-52°.

It should be noted that, referring to FIG. 15, the auricle surface may be inclined upward relative to the sagittal plane, and the inclination angle between the auricle surface and the sagittal plane may be $\gamma 1$. In order to make the end of the sound production component 11 extend into the cavum concha concave relative to the auricle, the outer side surface or the inner side surface of the sound production component 11 may be inclined downward relative to the sagittal plane. The inclination angle of the outer side surface or the inner side surface of the sound production component 11 and the sagittal plane may be $\gamma 2$. An included angle between the sound production component 11 and the auricle surface may be a sum of the inclination angle $\gamma 1$ between the auricle surface and the sagittal plane and the inclination angle $\gamma 2$ between the long-axis direction Y of the sound production component 11 and the sagittal plane. That is to say, the inclination angle of the outer side surface or the inner side surface of the sound production component 11 relative to the auricle surface of the user may be determined by calculating the inclination angle $\gamma 1$ between the auricle surface and the sagittal plane, and the included angle $\gamma 1$ between the outer side surface or the inner side surface of the sound production component 11 and the sagittal plane. The inclination angle between the outer side surface or the inner side surface of the sound production component 11 and the sagittal plane may be approximately regarded as the inclination angle between the long-axis direction Y of the sound production component 11 and the sagittal plane. In some embodiments, the inclination angle may also be calculated by an included angle between a projection of the auricle surface on a plane formed by a T-axis and an R-axis (hereinafter referred to as a T-R plane) and a projection of the outer side surface or the inner side surface of the sound production component 11 on the T-R plane. When the outer side surface or the inner side surface of the sound production component 11 is a plane, the projection of the outer side surface or the inner side surface of the sound production component 11 on the T-R plane may be a straight line. An included angle between the straight line and the projection of the auricle surface on the T-R plane may be the inclination angle of the sound production component 11 relative to the auricle surface. When the outer side surface or the inner side surface of the sound production component 11 is a curved surface, the inclination angle of the sound production component 11 relative to the auricle surface may be approximately regarded as the included angle between the long-axis direction Y of the sound production component 11 and the projection of the auricle surface on the T-R plane.

Figure 16A:
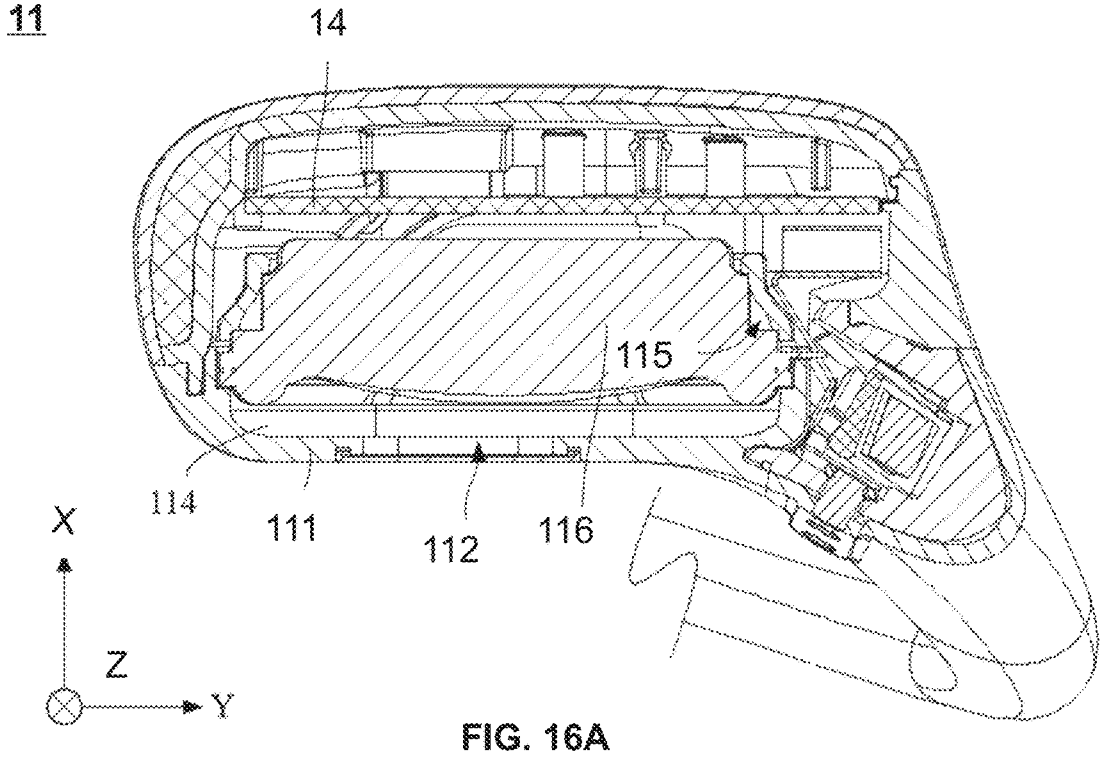
FIG. 16A is a schematic diagram illustrating an exemplary internal structure of a sound production component according to some embodiments of the present disclosure.

FIG. 16A is a schematic diagram illustrating an exemplary internal structure of a sound production component according to some embodiments of the present disclosure.

As shown in FIG. 16A, the sound production component 11 may include a main control circuit board 14 provided within the housing 111 and a battery (not shown) provided at an end of the ear hook 12 away from the sound production component 11. The battery and the transducer 116 are electrically connected to the main control circuit board 14, respectively, to allow the battery to power the transducer 116 under the control of the main control circuit board 14. Of course, both the battery and the transducer 116 may also be provided within the sound production component 11, and the battery may be closer to the connecting end CE while the transducer 116 may be closer to the end FE.

In some embodiments, the open earphone 10 may include an adjustment mechanism connecting the sound production component 11 and the ear hook 12. Different users are able to adjust the relative position of the sound production component 11 on the ear through the adjustment mechanism in the wearing state so that the sound production component 11 is located at a suitable position, thus making the sound production component 11 form a cavity structure with the cavum concha. In addition, due to the presence of the adjustment mechanism, the user is also able to adjust the earphone 10 to wear to a more stable and comfortable position.

Since the cavum concha has a certain volume and depth, after the end FE is inserted into the cavum concha, there may be a certain distance between the inner side surface IS and the cavum concha of the sound production component 11. In other words, the sound production component 11 and the cavum concha may cooperate to form a cavity-like structure communicated with the external ear canal in the wearing state, and the sound outlet 112 may be at least partially located in the aforementioned cavity-like structure. In this way, in the wearing state, the sound waves transmitted by the sound outlet 112 are limited by the aforementioned cavity-like structure, i.e., the aforementioned cavity-like structure can gather sound waves, so that the sound waves can be better transmitted to the external ear canal, thus improving the volume and sound quality of the sound heard by the user in the near-field, which is beneficial to improve the acoustic effect of the earphone 10. Further, since the sound production component 11 may be set so as not to block the external ear canal in the wearing state, the aforementioned cavity-like structure may be in a semi-open setting. In this way, a portion of the sound waves transmitted by the sound outlet 112 may be transmitted to the ear canal thereby allowing the user to hear the sound, and another portion thereof may be transmitted with the sound reflected by the ear canal through a gap between the sound production component 11 and the ear (e.g., a portion of the cavum concha not covered by the sound production component 11) to the outside of the open earphone 10 and the ear, thereby creating a first leakage in the far-field. At the same time, the sound waves transmitted through the pressure relief hole 113 opened on the sound production component 11 generally forms a second leakage sound in the far-field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other, so that the aforementioned first leakage sound and the aforementioned second leakage sound can cancel each other out in the far-field, which is conducive to reducing the leakage of the open earphone 10 in the far-field.

In some embodiments, the sound production component 11 mainly includes a housing 111 connected to the ear hook 12 and a transducer 116 inside the housing 111, wherein the inner side surface IS of the housing 111 facing the ear in the wearing state is provided with the sound outlet 112, through which the sound waves generated by the transducer 116 are transmitted for transmission into the external ear canal 101. It should be noted that: the sound outlet 112 may also be provided on the lower side surface LS of the housing 111 and may also be provided at a corner between the aforementioned inner side surface IS and the lower side surface LS.

In some embodiments, a front cavity 114 may be formed between the transducer 116 and the housing 111, with the sound outlet 112 being provided in a region of the housing 111 that surrounds the front cavity 114. The front cavity 114 may be communicated to the outside world through the sound outlet 112.

In some embodiments, the front cavity 114 is provided between the diaphragm of the transducer 116 and the housing 111. In order to ensure that the diaphragm has a sufficient vibration space, the front cavity 114 may have a large depth dimension (i.e., a distance dimension between the diaphragm of the transducer 116 and the housing 111 directly opposite to it). In some embodiments, as shown in FIG. 16A, the sound outlet 112 is set on the inner side surface IS in the thickness direction X. At this point, the depth of the front cavity 114 may refer to a dimension of the front cavity 114 in the X-direction. However, too large the depth of the front cavity 114 may lead to an increase in the dimension of the sound production component 11 and affect the wearing comfort of the open earphone 10. In some embodiments, the depth of the front cavity 114 may be in a range of 0.55 mm-1.00 mm. In some embodiments, the depth of the front cavity 114 may be in a range of 0.66 mm-0.99 mm. In some embodiments, the depth of the front cavity 114 may be in a range of 0.76 mm-0.99 mm. In some embodiments, the depth of the front cavity 114 may be in a range of 0.96 mm-0.99 mm. In some embodiments, the depth of the front cavity 114 may be 0.97 mm.

In order to improve the sound output effect of the open earphone 10, a resonance frequency of a structure similar to a Helmholtz resonator formed by the front cavity 114 and the sound outlet 112 may be as high as possible, so that an overall frequency response curve of the sound production component has a wide flat region. In some embodiments, a resonance frequency f1 of the front cavity 114 may be no less than 3 kHz. In some embodiments, the resonance frequency f1 of the front cavity 114 may be no less than 4 kHz. In some embodiments, the resonance frequency f1 of the front cavity 114 may be no less than 6 kHz. In some embodiments, the resonance frequency f1 of the front cavity 114 may be no less than 7 kHz. In some embodiments, the resonance frequency f1 of the front cavity 114 may be no less than 8 kHz.

In some embodiments, the front cavity 114 and the sound outlet 112 may be approximately regarded as a Helmholtz resonator model, where the front cavity 114 serves as a cavity body of the Helmholtz resonator model, and the sound outlet 112 serves as a neck of the Helmholtz resonator model. In this case, a resonance frequency of the Helmholtz resonator model corresponds to the resonance frequency f1 of the front cavity 114. In the Helmholtz resonator model, a dimension of the neck (e.g., the sound outlet 112) may affect the resonant frequency f of the cavity body, a specific relationship is shown in Equation (1):

$$f = \frac{c}{2\pi}\sqrt{\frac{S}{VL}}, \tag{1}$$

where c represents the speed of sound, S represents a cross-sectional area of the neck (e.g., the sound outlet 112), V represents a volume of the cavity body (e.g., the front cavity 114), and L represents a depth of the neck (e.g., the sound outlet 112).

From Equation (1), it may be observed that increasing the cross-sectional area S of the sound outlet 112 and decreasing the depth L of the sound outlet 112 causes the resonance frequency f1 of the front cavity 114 to increase and shift towards a higher frequency.

In some embodiments, a total air volume of the sound outlet 112 forms an acoustic mass that may resonate with a system (e.g., the Helmholtz resonator) to produce a low-frequency output. Thus, a relatively small acoustic mass may affect the low-frequency output of the Helmholtz resonator model. In turn, the dimension of the sound outlet 112 may also affect the acoustic mass Ma of the sound outlet 112, as shown in Equation (2):

$$M_a = \frac{\rho L}{S}, \tag{2}$$

where ρ represents an air density, S represents the cross-sectional area of the sound outlet 112, and L represents the depth of the sound outlet 112.

From Equation (2), it may be seen that when the cross-sectional area S of the sound outlet 112 increases and the depth L decreases, the acoustic mass Ma of the sound outlet 112 decreases.

Combining Equation (1) and Equation (2), it may be seen that the larger the value of a ratio S/L of the cross-sectional area S to the depth L of the sound outlet 112, the larger the resonance frequency f1 of the front cavity 114, and the smaller the acoustic mass Ma of the sound outlet 112. Therefore, the ratio S/L of the cross-sectional area S to the depth L of the sound outlet 112 needs to be in a suitable range, specific descriptions may be seen, for example, in FIG. 17A, FIG. 17B, and FIG. 18B.

Figure 16B:
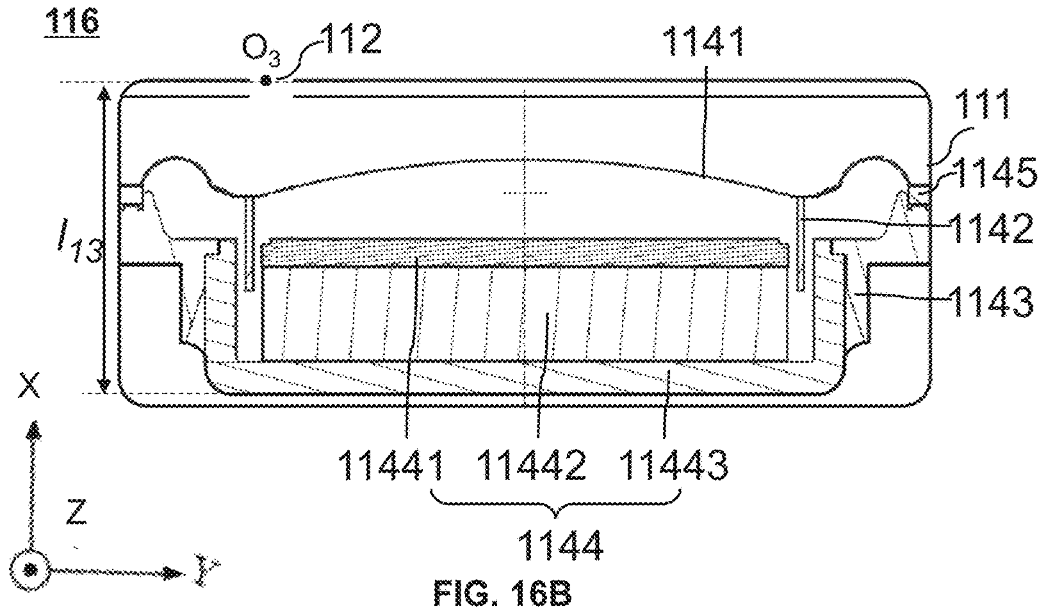
FIG. 16B is a schematic diagram illustrating an exemplary internal structure of a transducer according to some embodiments of the present disclosure.

FIG. 16B is a schematic diagram illustrating an exemplary internal structure of a transducer according to some embodiments of the present disclosure.

As shown in FIG. 16B, the housing 111 accommodates the transducer 116. The transducer 116 includes a diaphragm 1141, a voice coil 1142, a cone holder 1143, and a magnetic circuit assembly 1144. The cone holder 1143 is provided to enclose the diaphragm 1141, the voice coil 1142, and the magnetic circuit assembly 1144, and to provide a mounting and fixing platform. The transducer 116 may be connected to the housing 111 via the cone holder 1143. The diaphragm 1141 covers the voice coil 1142 and the magnetic circuit assembly 1144 in the Z direction. The voice coil 1142 extends into the magnetic circuit assembly 1144 and is connected to the diaphragm 1141. A magnetic field generated by the energized voice coil 1142 interacts with the magnetic field formed by the magnetic circuit assembly 1144, thereby driving the diaphragm 1141 to generate mechanical vibration. This vibration propagates through the air or other media to generate sound, which is then output through the sound outlet 112.

In some embodiments, the magnetic circuit assembly 1144 includes a magnetic conductive plate 11441, a magnet 11442, and an accommodating member 11443. The magnetic conductive plate 11441 and the magnet 11442 are interconnected. The magnet 11442 is mounted on a bottom wall of the accommodating member 11443 on a side away from the magnetic conductive plate 11441. There is a gap between a peripheral side of the magnet 11442 and a peripheral inner side wall of the accommodating member 11443. In some embodiments, a peripheral outer side wall of the accommodating member 11443 is securely connected to the cone holder 1143. In some embodiments, both the accommodating member 11443 and the magnetic conductive plate 11441 may be made of a magnetically conductive material (e.g., iron).

In some embodiments, a peripheral side of the diaphragm 1141 may be attached to the cone holder 1143 through a fixing ring 1145. In some embodiments, a material of the fixing ring 1145 may include stainless steel or other metal materials to adapt to the manufacturing process of the diaphragm 1141.

Referring to FIG. 16A and FIG. 16B, in some embodiments, a distance from the center $O_3$ of the sound outlet 112 to a bottom surface of the magnetic circuit assembly 1144 along the X direction may be related to a vibration range of the diaphragm 1141 and a thickness of the magnetic circuit assembly 1144. The vibration range of the diaphragm 1141 may affect an amount of air driven by the transducer of the sound production component 11. The greater the vibration range of the diaphragm 1141, the greater the amount of air driven by the transducer of the sound production component 11, and the higher the sound generation efficiency of the sound production component. The greater the thickness of the magnetic circuit assembly 1144, the greater a total weight of the sound production component 11, thereby affecting the user's wearing comfort. In addition, when the thickness of the sound production component 11 in the X direction is constant, the smaller the distance from the center $O_3$ of the sound outlet 112 to the bottom surface of the magnetic circuit assembly 1144 along the X direction is, the larger the volume of the rear cavity may be. At this point, according to the aforementioned Equation (1), it is known that when the smaller the resonant frequency of the rear cavity is, a resonance peak of the rear cavity shifts to a lower frequency, and a smaller range of the flat region of the frequency response curve is. To ensure that the sound production component 11 has sufficiently high sound generation efficiency, that the resonance frequency of the rear cavity is within a suitable frequency range (e.g., 1,000 Hz-5,000 Hz), and that the user experiences comfortable wearing, taking into consideration factors such as structural strength, manufacturing complexity, and the overall thickness of the housing 111, a distance $l_{13}$ from the center $O_3$ of the sound outlet 112 to the bottom surface (i.e., a side surface of the accommodating member 11443 away from the sound outlet 112 in the X direction) of the magnetic circuit assembly 1144 along the X direction is in a range of 5.65 mm-8.35 mm. In some embodiments, the distance $l_{13}$ from the center $O_3$ of the sound outlet 112 to the bottom surface of the magnetic circuit assembly 1144 along the X direction is in a range of 6.00 mm-8.00 mm. In some embodiments, the distance $l_{13}$ from the center $O_3$ of the sound outlet 112 to the bottom surface of the magnetic circuit assembly 1144 along the X direction is in a range of 6.35 mm-7.65 mm. In some embodiments, the distance $l_{13}$ from the center $O_3$ of the sound outlet 112 to the bottom surface of the magnetic circuit assembly 1144 along the X direction is in a range of 6.70 mm-7.30 mm. In some embodiments, the distance $l_{13}$ from the center $O_3$ of the sound outlet 112 to the bottom surface of the magnetic circuit assembly 1144 along the X direction is in a range of 6.95 mm-7.05 mm.

In some embodiments, a distance from the center $O_3$ of the sound outlet 112 to a long-axis center plane (e.g., the plane NN' oriented perpendicular to the paper and inward as shown in FIG. 3A) of the magnetic circuit assembly 1144 is in a range of 1.45 mm-2.15 mm. In the present disclosure, the long-axis center plane of the magnetic circuit assembly 1144 refers to a plane that is parallel to the lower side surface LS of the sound production component 11 and passes through a geometric center of the magnetic circuit assembly 1144. That is to say, the long-axis center plane of the magnetic circuit assembly 1144 may divide the magnetic circuit assembly 1144 into two identical portions along the Y direction. The distance from the center $O_3$ of the sound outlet 112 to the long-axis center plane of the magnetic circuit assembly 1144 is also the distance from the center $O_3$ of the sound outlet 112 to the long-axis center plane along the Y direction. In some embodiments, the distance from the center $O_3$ of the sound outlet 112 to the long-axis center plane is in a range of 1.55 mm-2.05 mm. In some embodiments, the distance from the center $O_3$ of the sound outlet 112 to the long-axis center plane is in a range of 1.65 mm-1.95 mm. In some embodiments, the distance from the center $O_3$ of the sound outlet 112 to the long-axis center plane is in a range of 1.75 mm-1.85 mm. It should be noted that the distance from the center $O_3$ of the sound outlet 112 to the long-axis center plane of the magnetic circuit assembly 1144 may be a shortest distance (i.e., a vertical distance) from the center $O_3$ of the sound outlet 112 to the long-axis center plane of the magnetic circuit assembly 1144.

Figure 17A:
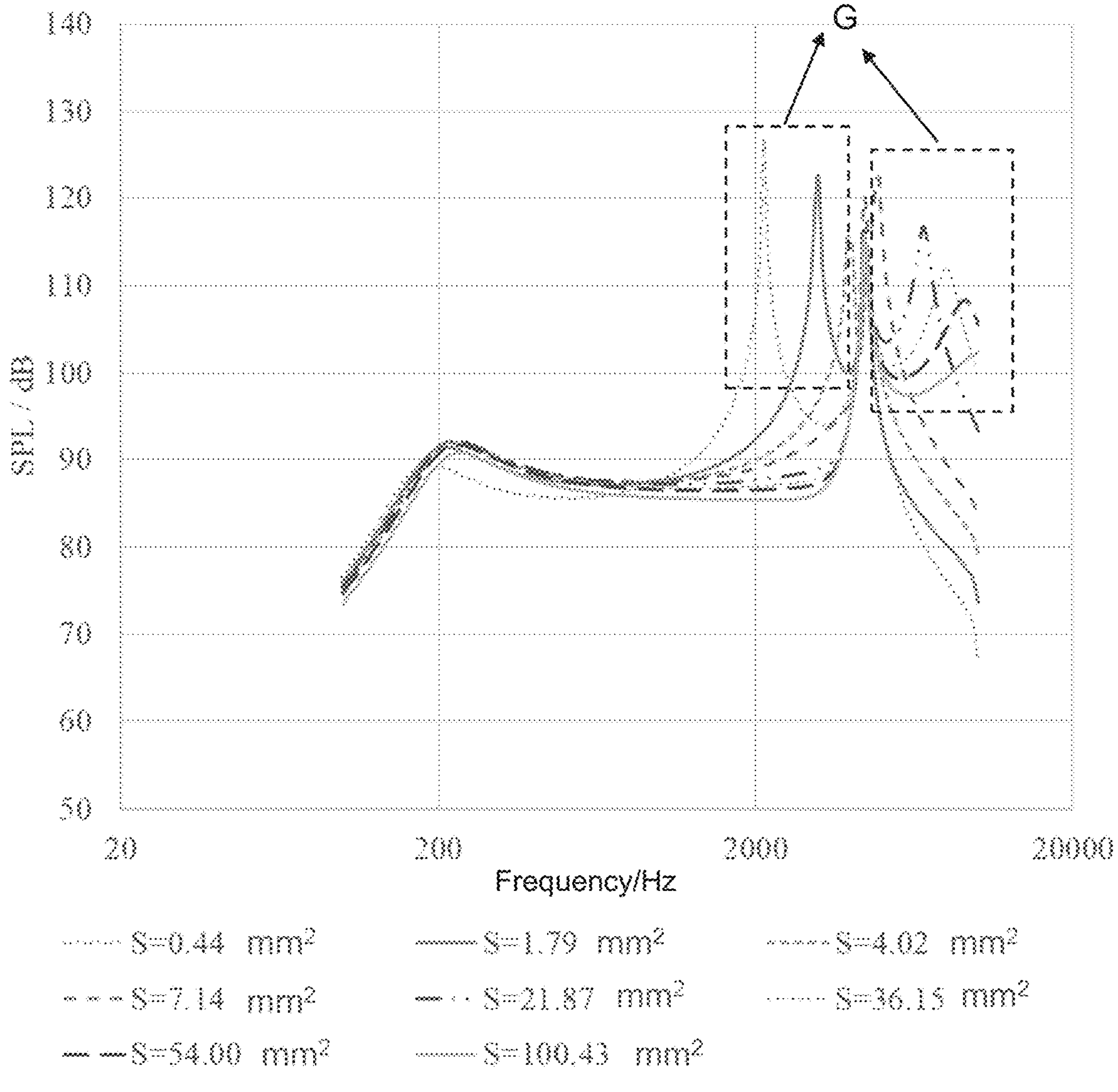
FIG. 17A is a frequency response curve diagram of an open earphone corresponding to sound outlets of different cross-sectional areas at a certain aspect ratio according to some embodiments of the present disclosure.

FIG. 17A is a frequency response curve diagram of an open earphone corresponding to sound outlets of different cross-sectional areas at a certain aspect ratio according to some embodiments of the present disclosure. FIG. 17A illustrates frequency response curves corresponding to the open earphone 10 when the other structures (e.g., the pressure relief hole 113, the volume of the rear cavity, etc.) are fixed and when the aspect ratio of the sound outlet is fixed, and when the cross-sectional area of the sound outlet is in a range of 0.44 $mm^2$ to 100.43 $mm^2$. As can be seen from FIG. 17A, under the above conditions, as the cross-sectional area S of the sound outlet 112 gradually increases, the resonance frequency f1 (i.e., a frequency corresponding to the resonance peak in the dotted circle G) corresponding to the front cavity in the frequency response curve of the open earphone 10 gradually shifts to high frequency, and then the resonance frequency corresponding to the rear cavity remains at about 4.5 kHz. Specifically, as the cross-sectional area S of the sound outlet 112 increases, the resonance peak of the front cavity gradually moves to high frequency. When the resonance peak of the front cavity moves to about 4.5 kHz, the resonance frequencies of the front cavity and the rear cavity may be basically equal, and during this process, the peak value of the resonance peak remains basically unchanged. After the resonance peak of the front cavity moves to 4.5 kHz, if the cross-sectional area S of the sound outlet 112 continues to be increased, the peak value of the resonance peak of the front cavity shows a clear tendency to gradually decrease. Therefore, in some embodiments, in order to make the frequency response curve of the open earphone 10 have a wide flat region, the cross-sectional area S of the sound outlet 112 may be larger than 2.87 $mm^2$. Preferably, in order to make the frequency response curve of the open earphone 10 flat in a range of 100 Hz to 2.3 kHz, the cross-sectional area S of the sound outlet 112 may be larger than 4.0 $mm^2$. Preferably, in order to make the frequency response curve of the open earphone 10 flat in a range from 100 Hz to 3.3 kHz, the cross-sectional area S of the sound outlet 112 may be larger than 7.0 $mm^2$.

Further, within a certain cross-sectional area S of the sound outlet 112, as the cross-sectional area S of the sound outlet 112 increases, the resonance peak of the front cavity gradually decreases while moving to high frequency. Therefore, in some embodiments, in order to improve the sound quality of the open earphone 10 as well as to facilitate the adjustment of EQ, the frequency response of the open earphone 10 in a high frequency range (e.g., 4.5 kHz to 9 kHz) needs to be sufficient, thus the cross-sectional area S of the sound outlet 112 may be less than 54 $mm^2$. Preferably, in order to make the frequency response curve of the open earphone 10 sufficient in a range of 4.5 kHz-8 kHz, the cross-sectional area S of the sound outlet 112 may be smaller than 36.15 $mm^2$. More preferably, in order to make the frequency response curve of the open earphone 10 sufficient in a range from 4.5 kHz to 6.5 kHz, the cross-sectional area S of the sound outlet 112 may be less than 21.87 $mm^2$. In the present disclosure, for ease of description, the cross-sectional area S of the sound outlet 112 may refer to an area of an outer opening of the sound outlet 112 (i.e., an opening area of the sound outlet 112 on the inner side surface). It should be known that in some other embodiments, the cross-sectional area S of the sound outlet 112 may also refer to an area of an inner opening of the sound outlet 112, or an average of the area of the inner opening and the area of the outer opening of the sound outlet 112.

Figure 17B:
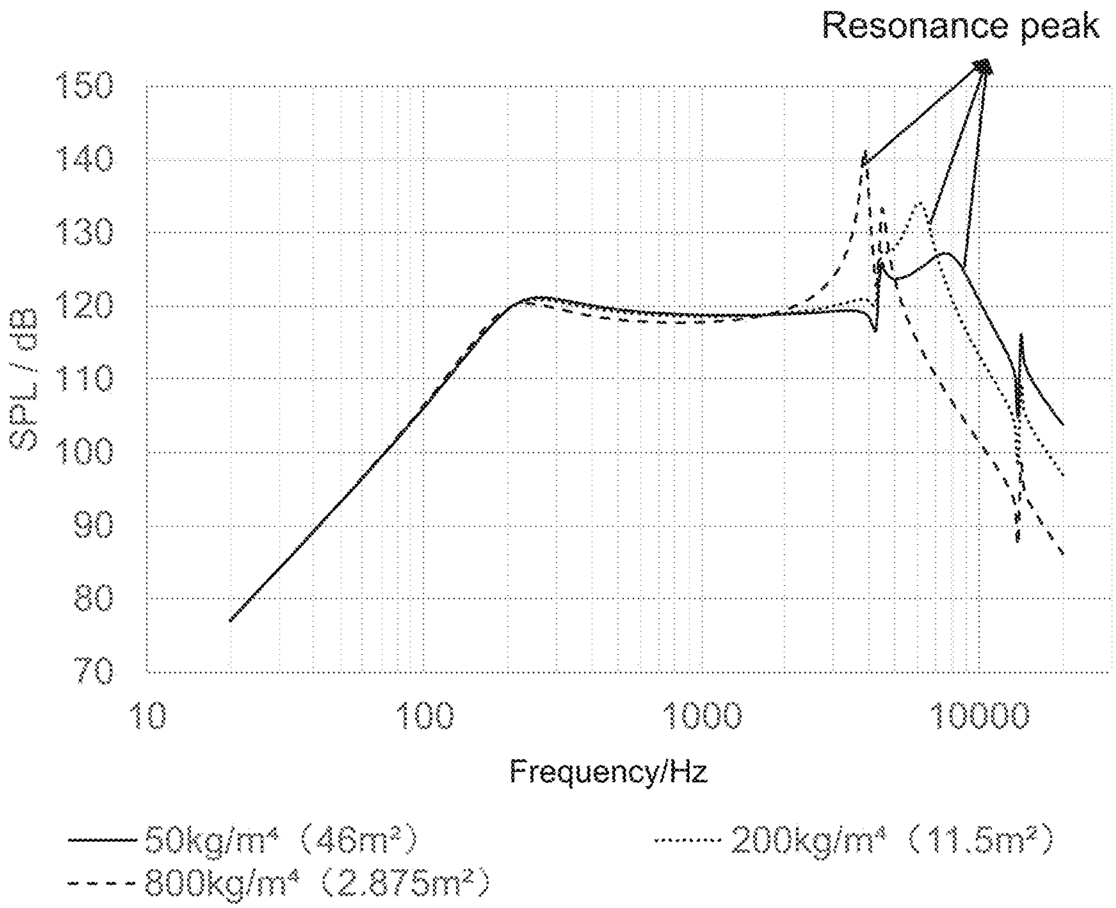
FIG. 17B is a frequency response curve diagram of a front cavity corresponding to different cross-sectional areas of sound outlets according to some embodiments of the present disclosure.

FIG. 17B is a frequency response curve diagram of a front cavity corresponding to different cross-sectional areas of sound outlets according to some embodiments of the present disclosure. As shown in FIG. 17B, when the cross-sectional area S of the sound outlet 112 increases from 2.875 $mm^2$ to 46.10 $mm^2$, the acoustic mass Ma of the sound outlet 112 decreases from 800 $kg/m^4$ to 50 kg/m 4, and the resonance frequency f1 of the front cavity gradually increases from about 4 kHz to about 8 kHz. It should be noted that the parameters, such as 200 $kg/m^4$ and 800 $kg/m^4$ shown in FIG. 17B represent only a theoretical acoustic mass of the sound outlet 112, and there may be an error with an actual acoustic mass of the sound outlet 112.

In order to improve the acoustic output of the open earphone 10, while increasing the resonance frequency f1 of the front cavity and ensuring that the acoustic mass Ma of the sound outlet 112 is large enough, the cross-sectional area S of the sound outlet 112 needs to have a suitable range of values. In addition, in the actual design, if the cross-sectional area of the sound outlet 112 is too large, it may have a certain impact on the appearance, structural strength, water and dust resistance and other aspects of the open earphone 10. In some embodiments, the cross-sectional area S of the sound outlet 112 may be in a range of 2.87 $mm^2$ to 46.10 $mm^2$. In some embodiments, the cross-sectional area S of the sound outlet 112 may be in a range of 2.875 $mm^2$-46 $mm^2$. In some embodiments, the cross-sectional area S of the sound outlet 112 may be in a range of 10 $mm^2$-30 $mm^2$. In some embodiments, the cross-sectional area S of the sound outlet 112 may be 25.29 $mm^2$. In some embodiments, the cross-sectional area S of the sound outlet 112 may be in a range of 25 $mm^2$-26 $mm^2$.

In some embodiments, in order to increase the wearing stability of the open earphone 10, the area of the inner side surface IS of the sound production component 11 needs to be adapted to the dimension of the human cavum concha. In addition, when the sound production component 11 is worn by inserting it into the cavum concha, since the inner side surface IS and a side wall of the cavum concha form a cavity structure, the sound generation efficiency of the sound production component 11 is high compared to a conventional wearing manner (e.g., placing the sound production component 11 on a front side of the tragus). At this time, the overall dimension of the sound production component may be designed to be smaller.

Therefore, a ratio of the area of the sound outlet 112 to the area of the inner side surface IS may be designed to be relatively large. At the same time, the area of the sound outlet should not be too large, otherwise, it may affect the waterproof and dustproof structure at the sound outlet and the stability of the support structure. The area of the inner side surface IS should not be too small, otherwise, it may affect the area of the transducer to push the air. In some embodiments, the ratio of the cross-sectional area S of the sound outlet 112 to the area of the inner side surface IS may be in a range of 0.015 to 0.25. In some embodiments, the ratio of the cross-sectional area S of the sound outlet 112 to the area of the inner side surface IS may be in a range of 0.02 to 0.2. In some embodiments, the ratio of the cross-sectional area S of the sound outlet 112 to the area of the inner side surface IS may be in a range of 0.06 to 0.16. In some embodiments, the ratio of the cross-sectional area S of the sound outlet 112 to the area of the inner side surface IS may be in a range of 0.1 to 0.12.

In some embodiments, the area of the inner side surface IS of the sound production component 11 (which is equal to a product of the long-axis dimension and the short-axis dimension of the sound production component 11 when the inner side surface IS is a rectangle) may be in a range of 90 $mm^2$-560 $mm^2$. In some embodiments, the area of the inner side surface IS may be considered to approximate a projected area of the diaphragm 1141 in the X direction. For example, the area of the inner side surface IS differs from the area of the projection of the diaphragm 1141 along the X direction by less than or equal to 10%. In some embodiments, the area of the inner side surface IS may be in a range of 150 $mm^2$-360 $mm^2$. In some embodiments, the area of the inner side surface IS may be in a range of 160 $mm^2$-240 $mm^2$. In some embodiments, the area of the inner side surface IS may be in a range of 180 $mm^2$-200 $mm^2$. Based on the principles described in FIG. 3A and FIG. 4, and when the open earphone 10 is worn in the manner shown in FIG. 3A, on the basis that the dimension of the open earphone 10 satisfies the wearing comfort, the acoustic performance of the open earphone 10 is superior to the existing open earphones, that is, the dimension of the open earphone 10 can be smaller than the existing open earphones while achieving the same excellent acoustic performance.

In some embodiments, consisting that the inner side surface IS may need to be in contact with the ear (e.g., the cavum concha), in order to improve the wearing comfort, the inner side surface IS may be designed as a non-planar structure. For example, an edge region of the inner side surface IS has a certain curvature relative to a central region, or a region on the inner side surface IS near the end FE is provided with a convex structure to better abut against with the ear region, etc. In this case, in order to better reflect the influence of the cross-sectional area of the sound outlet 112 on the wearing stability and sound generation efficiency of the open earphone 10, the ratio of the cross-sectional area S of the sound outlet 112 to the area of the inner side surface IS may be replaced with a ratio of the cross-sectional area S of the sound outlet 112 to the projection area of the inner side surface IS in the vibration direction of the diaphragm (i.e., the X direction in FIG. 16A). In some embodiments, a ratio of the cross-sectional area S of the sound outlet 112 to a projection area of the inner side surface IS along the vibration direction of the diaphragm may be in a range of 0.016 to 0.255. Preferably, the ratio of the cross-sectional area S of the sound outlet 112 to the projection area of the inner side surface IS along the vibration direction of the diaphragm may be in a range of 0.022 to 0.21

In some embodiments, a projection area of the diaphragm of the transducer in its vibration direction may be equal to or slightly less than the projection area of the inner side surface IS along the vibration direction of the diaphragm. In this case, a ratio of the cross-sectional area S of the sound outlet 112 to the projection area of the diaphragm in its vibration direction may be in a range of 0.016 to 0.261. Preferably, the ratio of the cross-sectional area S of the sound outlet 112 to a projection area of the inner side surface IS along the vibration direction of the diaphragm may be in a range of 0.023 to 0.23.

In some embodiments, the shape of the sound outlet 112 also has an effect on an acoustic resistance of the sound outlet 112. The narrower and longer the sound outlet 112 is, the higher the acoustic resistance of the sound outlet 112 is, which is not conducive to the acoustic output of the front cavity 114. Therefore, in order to ensure that the sound outlet 112 has a suitable acoustic resistance, a ratio of the long-axis dimension to the short-axis dimension of the sound outlet 112 (also called an aspect ratio of the sound outlet 112) needs to be within a preset appropriate range.

In some embodiments, the shape of the sound outlet 112 may include, but is not limited to, a circle, an oval, a runway shape, etc. For the sake of description, the following exemplary illustration is provided with the sound outlet 112 in a runway shape as an example. In some embodiments, as shown in FIG. 3B, the sound outlet 112 may adopt the runway shape, wherein the ends of the runway shape may be minor arced or semicircular. In this case, the long-axis dimension of the sound outlet 112 may be a maximum dimension (e.g., the long-axis dimension $d_{03}$ as shown in FIG. 14) of the sound outlet 112 along the Y direction, and the short-axis dimension (e.g., the short-axis dimension $h_{03}$ as shown in FIG. 3B) of the sound outlet 112 may be a maximum dimension of the sound outlet 112 along the Z direction.

Figure 18A:
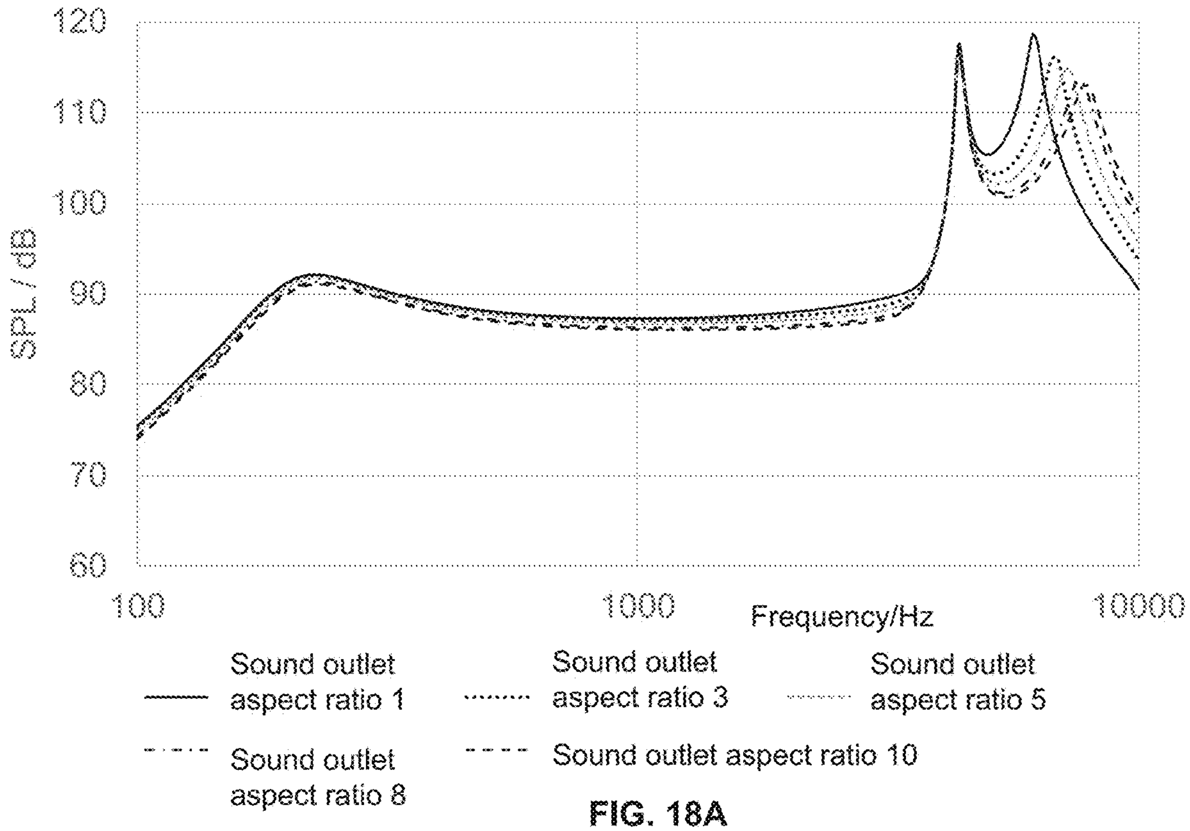
FIG. 18A is a frequency response curve diagram of an open earphone corresponding to different aspect ratios of sound outlets according to some embodiments of the present disclosure.

FIG. 18A is a frequency response curve diagram of an open earphone corresponding to different aspect ratios of sound outlets according to some embodiments of the present disclosure. FIG. 18A illustrates a frequency response curve of the open earphone corresponding to a sound outlet with aspect ratios of 1, 3, 5, 8, and 10, respectively when the other structures (e.g., the pressure relief hole 113, the volume of the rear cavity, etc.) are fixed and the area of the sound outlet is a constant.

As can be seen from FIG. 18A, when the cross-sectional area of the sound outlet 112 is a constant, as the aspect ratio of the sound outlet 112 increases, the resonance frequency f1 of the resonance peak of the front cavity 114 gradually moves toward high frequency, and the intensity of the resonance peak gradually decreases. Therefore, when the cross-sectional area of the sound outlet 112 is a constant, in order to ensure that the intensity of the resonance peak of the front cavity is strong enough, the ratio of the long-axis dimension of the sound outlet 112 to the short-axis dimension of the sound outlet 112 may be in a range from 1 to 10. In some embodiments, the ratio of the long-axis dimension of the sound outlet 112 to the short-axis dimension of the sound outlet 112 may be in a range from 2 to 8. In some embodiments, the ratio of the long-axis dimension of the sound outlet 112 to the short-axis dimension of the sound outlet 112 may be in a range from 2 to 4. In some embodiments, the long-axis dimension of the sound outlet 112 may be 7.67 mm and the short-axis dimension of the sound outlet 112 may be 3.62 mm.

Figure 18B:
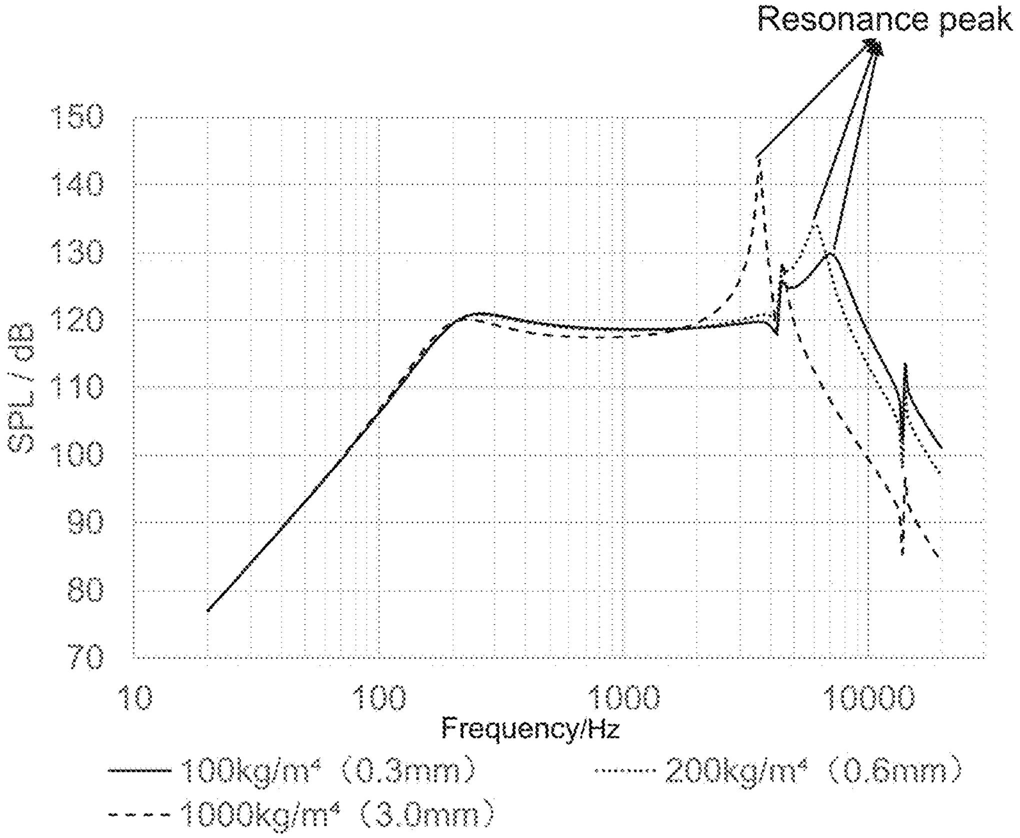
FIG. 18B is a frequency response curve diagram of a front cavity corresponding to different depths of sound outlets according to some embodiments of the present disclosure.

FIG. 18B is a frequency response curve diagram of a front cavity corresponding to different depths of sound outlets according to some embodiments of the present disclosure. As shown in FIG. 18B, when the depth $L_3$ of the sound outlet 112 increases from 0.3 mm to 3 mm, the acoustic mass Ma of the sound outlet 112 increases from 100 kg/m$^4$ to 1000 kg/m$^4$, and the resonance frequency f1 of the front cavity decreases from about 7 kHz to about 3.7 kHz.

In order to ensure that the front cavity has a sufficiently large resonance frequency, according to Equation (1), the depth $L_3$ of the sound outlet 112 is taken to be as small as possible. However, since the sound outlet 112 is set on the housing 111, the depth of the sound outlet 112 is the thickness of the side wall of the housing 111. When the thickness of the housing 111 is too small, the structural strength of the open earphone 10 may be affected, and the corresponding manufacturing process is more difficult. In some embodiments, the depth $L_3$ of the sound outlet 112 may be in a range of 0.3 mm-3 mm. In some embodiments, the depth $L_3$ of the sound outlet 112 may be in a range of 0.3 mm-2 mm. In some embodiments, the depth $L_3$ of the sound outlet 112 may be 0.3 mm. In some embodiments, the depth $L_3$ of the sound outlet 112 may be 0.6 mm.

In some embodiments, according to Equation (1), in the case where the volume of the front cavity is not easily changed, the larger the ratio $S/L_3^2$ of the cross-sectional area S of the sound outlet 112 to the square of the depth $L_3$ is, the higher the resonance frequency of the front cavity is and the better the sound emitted from the sound outlet is in the low and middle frequency range. However, since the cross-sectional area S of the sound outlet 112 should not be too large, and the depth $L_3$ (the thickness of the housing 111) should not be too small, in some embodiments, the ratio $S/L_3^2$ of the cross-sectional area S of the sound outlet 112 to the square of the depth $L_3$ may be in a range of 0.31 to 512.2. In some embodiments, the ratio $S/L_3^2$ of the cross-sectional area S of the sound outlet 112 to the square of the depth $L_3$ may be in a range of 1-400. In some embodiments, the ratio $S/L_3^2$ of the cross-sectional area S of the sound outlet 112 to the square of the depth $L_3$ may be in a range of 3-300. In some embodiments, the ratio $S/L_3^2$ of the cross-sectional area S of the sound outlet 112 to the square of the depth $L_3$ may be in a range of 5-200. In some embodiments, the ratio $S/L_3^2$ of the cross-sectional area S of the sound outlet 112 to the square of the depth $L_3$ may be in a range of 10-50.

Figure 19:
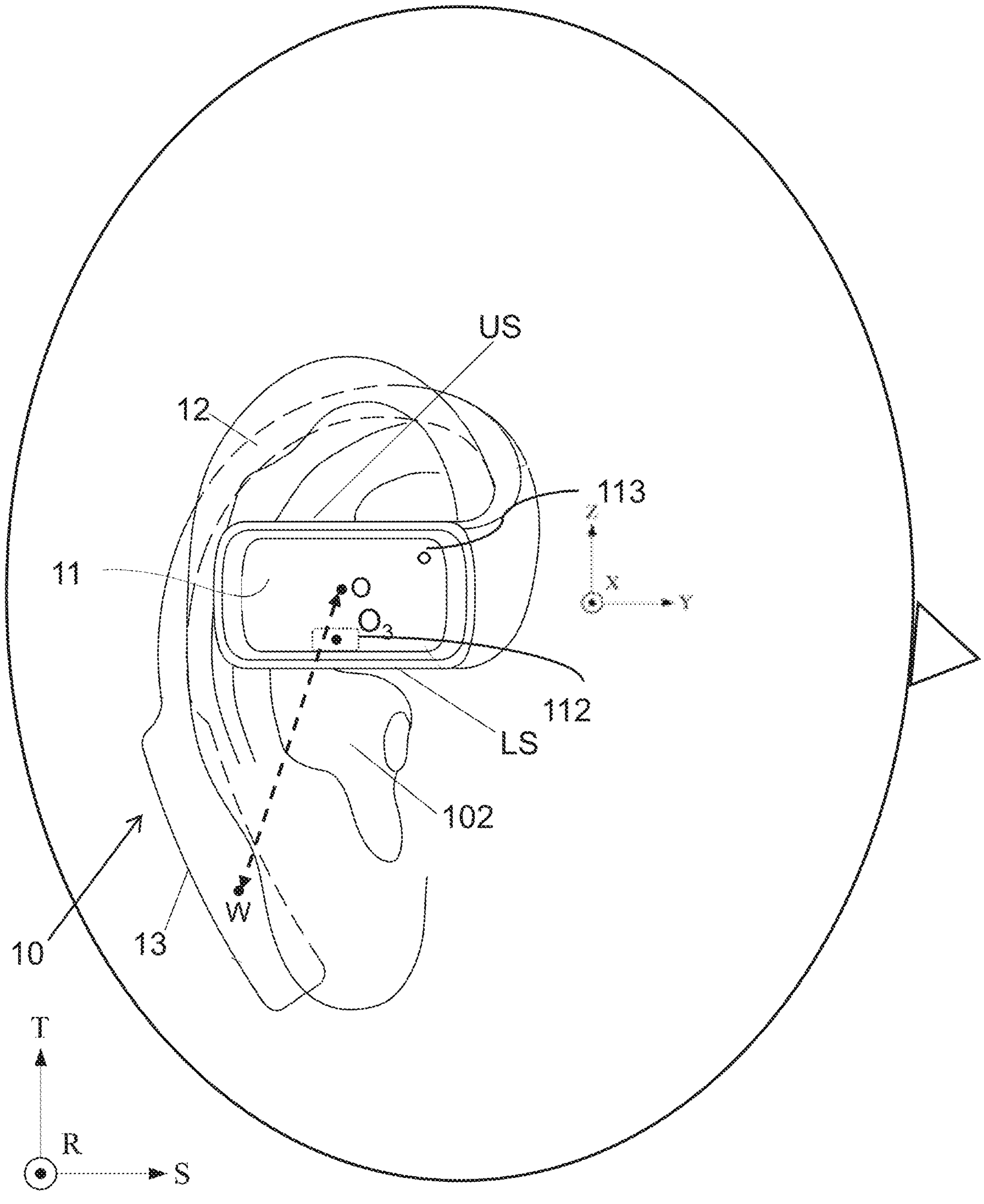
FIG. 19 is a schematic diagram illustrating an exemplary wearing state of an open earphone according to other embodiments of the present disclosure.

FIG. 19 is a schematic diagram illustrating an exemplary wearing state of an open earphone according to other embodiments of the present disclosure.

Referring to FIG. 19, in some embodiments, when the open earphone is in the wearing state, at least part of the sound production component 11 may cover the antihelix region of the user, wherein the antihelix region may include any one or more of the antihelix 105, the superior crus of antihelix 1011, and the inferior crus of antihelix 1012 in FIG. 1. At this time, the sound production component 11 may be located above the cavum concha 102 and the opening of the ear canal, and the opening of the ear canal of the user may be in an open state. In some embodiments, the housing of the sound production component 11 may include at least a sound outlet 112 and a pressure relief hole 113. The sound outlet 112 may be acoustically coupled with a front cavity of the open earphone 10, and the pressure relief hole 113 may be acoustically coupled with a rear cavity 115 of the open earphone 10. The sound output from the sound outlet 112 and the sound output from the pressure relief hole 113 may be approximately regarded as two sound sources. The sounds of the two sound sources may have anti-phases to form a dipole. When the user wears the open earphone, the sound outlet 112 may be located on a sidewall of the sound production component 11 toward or close to the opening of the ear canal of the user, and the pressure relief hole 113 may be located on a sidewall of the sound production component 11 away from the opening of the ear canal of the user. The housing of the sound production component 11 may act as a baffle to increase a sound path difference from the sound outlet 112 and the pressure relief hole 113 to an external ear canal 101, thereby increasing a sound intensity at the external ear canal 101. Furthermore, in the wearing state, the inner side surface of the sound production component 11 may be in contact with the antihelix region, and a concave-convex structure of the antihelix region may also act as a baffle, which may increase a sound path of the sound emitted from the pressure relief hole 113 to the external ear canal 101, thereby increasing the sound path difference from the sound outlet 112 and the pressure relief hole 113 to the external ear canal 101.

Figure 21:
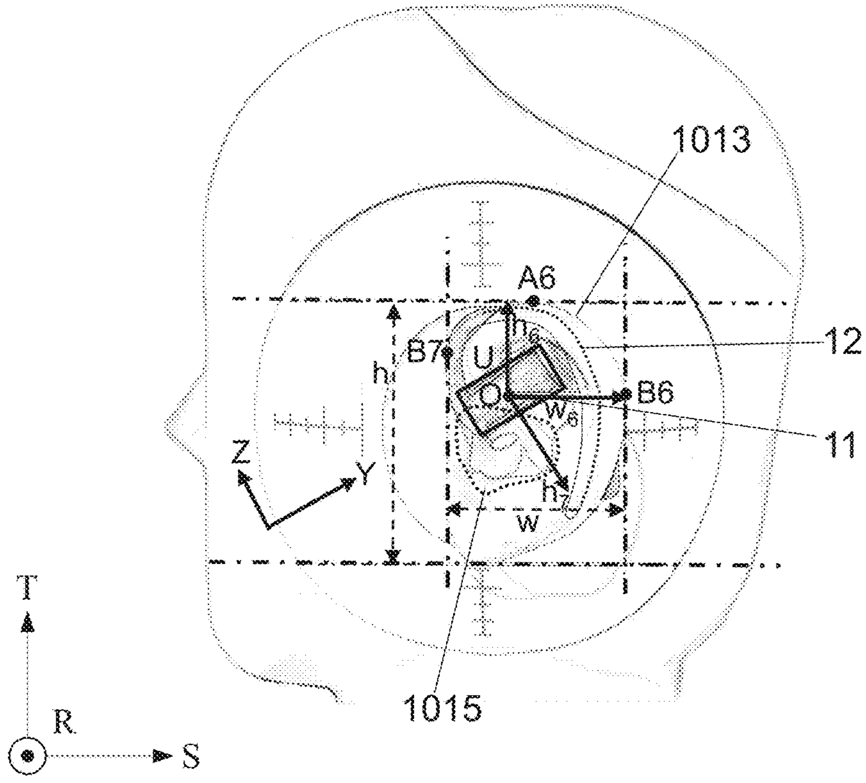
FIG. 21 is a schematic diagram illustrating an exemplary wearing state of an open earphone according to some other embodiments of the present disclosure.

FIG. 20 and FIG. 21 are schematic diagrams illustrating exemplary wearing state of an open earphone according to other embodiments of the present disclosure. As shown in FIG. 20 and FIG. 21, in some embodiments, when the open earphone 10 is in the wearing state, the sound production component may be approximately parallel or inclined at a certain angle relative to the horizontal direction. In some embodiments, when the open earphone 10 is in the wearing state, the sound production component 11 and the auricle of the user have a first projection (a rectangular region defined by a solid line box U in FIG. 20 and FIG. 21 may be approximately equivalent to the first projection) and a second projection on the sagittal plane (e.g., an S-T plane in FIG. 20 and FIG. 21) of the head of the user, respectively. In order to make the whole or part structure of the sound production component 11 cover the antihelix region of the user (e.g., the position of the antihelix, the triangular fossa, the superior crus of antihelix, or the inferior crus of antihelix, a ratio of a distance h6 between the centroid O of the first projection and a highest point A6 of the second projection in the vertical axis direction (e.g., a T-axis direction in FIG. 20 and FIG. 21) to a height h of the second projection in the vertical axis direction may be within a range of 0.25-0.4. A ratio of a distance w6 between the centroid O of the first projection U and an end point B6 of the second projection in the sagittal axis direction (e.g., an S-axis direction in FIG. 20 and FIG. 21) to a width w of the second projection in the sagittal axis direction may be within a range of 0.4-0.6.

Considering that the sidewall of the sound production component 11 may abut against the antihelix region, in order to make the sound production component 11 abut against a larger antihelix region, the concave-convex structure of the region may also act as a baffle, to increase the sound path of the sound emitted from the pressure relief hole 113 to the external ear canal 101, thereby increasing the sound path difference between the sound outlet 112 and the pressure relief hole 113 to the external ear canal 101, increasing the sound intensity at the external ear canal 101, and reducing the volume of the far-field leakage sound. Accordingly, in order to balance the listening volume and the sound leakage volume of the sound production component 11 to ensure the acoustic output quality of the sound production component 11, the sound production component 11 may be fit as closely as possible to the antihelix region of the user. Correspondingly, the ratio of the distance h6 between the centroid O of the first projection of the sound production component on the sagittal plane of the head of the user and the highest point A6 of the second projection of the auricle of the user on the sagittal plane in the vertical axis direction to the height h of the second projection in the vertical axis direction may be controlled to be within a range of 0.25-0.4. Meanwhile, the ratio of the distance w6 between the centroid O of the first projection of the sound production component 11 on the sagittal plane and the end point B6 of the second projection of the auricle of the user on the sagittal plane to the width w of the second projection in the sagittal axis direction may be controlled to be within a range of 0.4-0.6. Preferably, in some embodiments, in order to improve the wearing comfort of the open earphone while ensuring the acoustic output quality of the sound production component 11, the ratio of the distance h6 between the centroid O of the first projection and the highest point A6 of the second projection in the vertical axis direction to the height h of the second projection in the vertical axis direction may be within a range of 0.25-0.35, and the ratio of the distance w6 between the centroid O of the first projection and the end point B6 of the second projection in the sagittal axis direction to the width w of the second projection in the sagittal axis direction may be within a range of 0.42-0.6. More preferably, the ratio of the distance h6 between the centroid O of the first projection and the highest point A6 of the second projection in the vertical axis direction to the height h of the second projection in the vertical axis direction may be within a range of 0.25-0.34, and the ratio of the distance w6 between the centroid O of the first projection and the end point B6 of the second projection in the sagittal axis direction to the width w of the second projection in the sagittal axis direction may be within a range of 0.42-0.55.

Similarly, when the shapes and the dimensions of the ears of users are different, the ratio may fluctuate within a certain range. For example, when the earlobe of the user is long, the height h of the second projection in the vertical axis direction be larger than that of the general situation. At this time, when the user wears the open earphone 100, the ratio of the distance h6 between the centroid O of the first projection and the highest point A6 of the second projection in the vertical axis direction to the height h of the second projection in the vertical axis direction may be smaller, e.g., which may be within a range of 0.2-0.35. Similarly, in some embodiments, when the helix of the user is bent forward, the width w of the second projection in the sagittal axis direction may be smaller than that of the general situation, and the distance w6 between the centroid O of the first projection and the end point B6 of the second projection in the sagittal axis direction may also be smaller. At this time, the ratio of the distance w6 between the centroid O of the first projection and the end point B6 of the second projection in the sagittal axis direction to the width w of the second projection in the sagittal axis direction may be larger, e.g., which may be within a range of 0.4-0.7.

In some embodiments, the listening volume of the sound production component 11, the sound leakage reduction effect, and the wearing comfort and stability may also be improved by adjusting the distance between the centroid O of the first projection and the contour of the second projection. For example, when the sound production component 11 is located at the top of the auricle, the earlobe, the facial region on the front side of the auricle, or between the inner contour of the auricle and the edge of the cavum concha, it may be specifically embodied as that the distance between the centroid O of the first projection and a point of a certain region of the edge of the second projection may be too small, the distance between the centroid O of the first projection and a point of another region of the edge of the second projection may too large, and the antihelix region may not cooperate with the sound production component 11 to act as the baffle, affecting the acoustic output effect of the open earphone. In addition, if the distance between the centroid O of the first projection and the point of the certain region of the edge of the second projection is too large, a gap may be formed between the end FE of the sound production component 11 and the inner contour 1014 of the auricle, and the sound emitted from the sound outlet 112 and the sound emitted from the pressure relief hole 113 may produce an acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. In some embodiments, when the wearing state of the open earphone 10 is that at least part of the sound production component 11 covers the antihelix region of the user, the centroid O of the first projection of the sound production component 11 on the sagittal plane of the head of the user may also be located in a region enclosed by the contour of the second projection, but compared with at least part of the sound production component 11 extending into the cavum concha of the user, in the wearing state, the distance between the centroid O of the first projection of the sound production component 11 on the sagittal plane of the head of the user and the contour of the second projection may be different.

In some embodiments, in order to further enhance the sound intensity of the sound outlet 112 in the ear canal (i.e., the listening position), the sound outlet 112 may be placed at a position near the ear canal, i.e., the sound outlet 112 may be located near the lower side surface LS of the sound production component 11 in the Z direction. In some embodiments, a distance from the center $O_3$ of the sound outlet 112 to the lower side surface LS of the sound production component 11 in the Z direction is in a range of 2.3 mm-3.6 mm. In some embodiments, the distance from the center $O_3$ of the sound outlet 112 to the lower side surface LS of the sound production component 11 in the Z direction is in a range of 2.5 mm-3.4 mm. In some embodiments, the distance from the center $O_3$ of the sound outlet 112 to the lower side surface LS of the sound production component 11 in the Z direction is in a range of 2.7 mm-3.2 mm. In some embodiments, the distance from the center $O_3$ of the sound outlet 112 to the lower side surface LS of the sound production component 11 in the Z direction is in a range of 2.8 mm-3.1 mm. In some embodiments, the distance from the center $O_3$ of the sound outlet 112 to the lower side surface LS of the sound production component 11 in the Z direction is in a range of 2.9 mm-3.0 mm.

In some embodiments, the long-axis dimension of the sound production component 11 may not be too long, as an excessively long-axis dimension may cause the projection of the end FE on the sagittal plane to extend beyond a projection of the ear on the sagittal plane, thereby affecting the fit effect between the sound production component 11 and the ear. Thus, the long-axis dimension of the sound production component 11 may be designed to ensure that the projection of the end FE on the sagittal plane does not exceed the projection of the helix 107 on the sagittal plane. In some embodiments, when the projection of the end FE on the sagittal plane does not exceed the projection of the helix 107 on the sagittal plane, in order to ensure that at least a portion of the projection of the sound outlet 112 on the sagittal plane is located within the cymba concha 103, i.e., in actual wearing, the sound outlet 112 is at least partially facing the cymba concha 103, a distance from the center $O_3$ of the sound outlet 112 to the rear side surface RS of the sound production component 11 in the Y direction is in a range of 9.5 mm-15.0 mm. In some embodiments, the distance from the center $O_3$ of the sound outlet 112 to the rear side surface RS of the sound production component 11 in the Y direction is in a range of 10.5 mm-14.0 mm. In some embodiments, the distance from the center $O_3$ of the sound outlet 112 to the rear side surface RS of the sound production component 11 in the Y direction is in a range of 11.0 mm-13.5 mm. In some embodiments, distance from the center $O_3$ of the sound outlet 112 to the rear side surface RS of the sound production component 11 in the Y direction is in a range of 11.5 mm-13.0 mm. In some embodiments, distance from the center $O_3$ of the sound outlet 112 to the rear side surface RS of the sound production component 11 in the Y direction is in a range of 12.0 mm-12.5 mm.

Figure 22A:
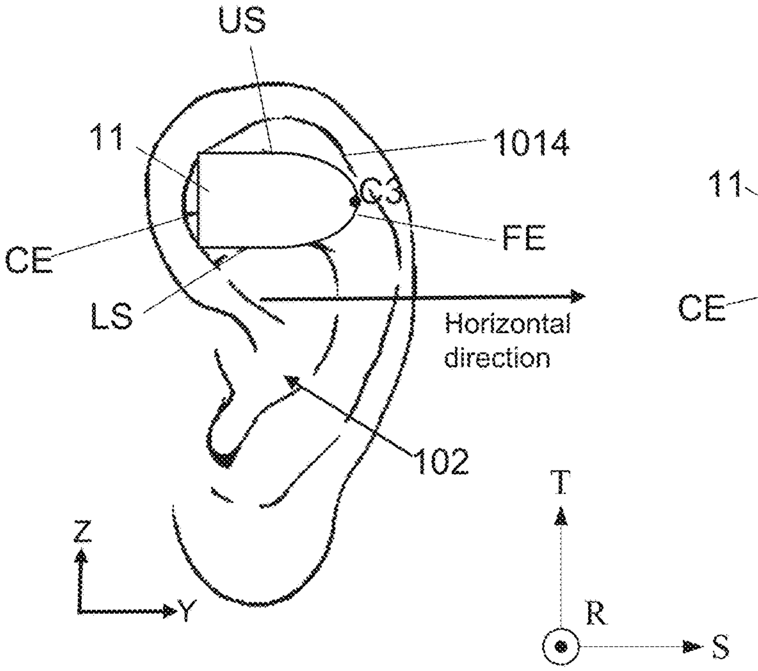
FIG. 22A is a schematic diagram illustrating an exemplary matching position of an open earphone and an ear canal of a user according to some embodiments of the present disclosure.
Figure 22B:
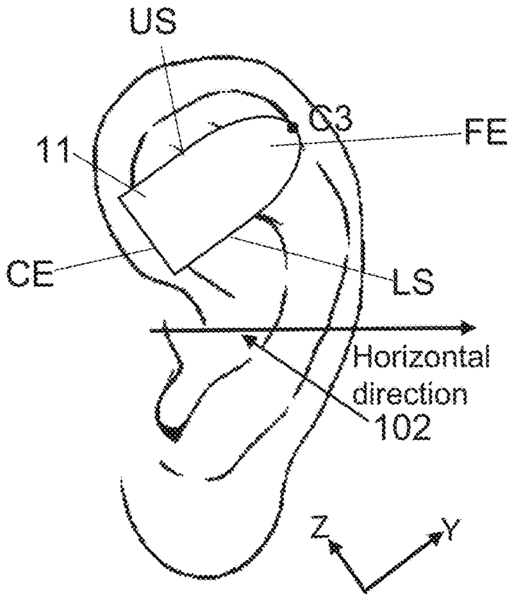
FIG. 22B is a schematic diagram illustrating an exemplary matching position of an open earphone and an ear canal of a user according to some embodiments of the present disclosure.
Figure 22C:
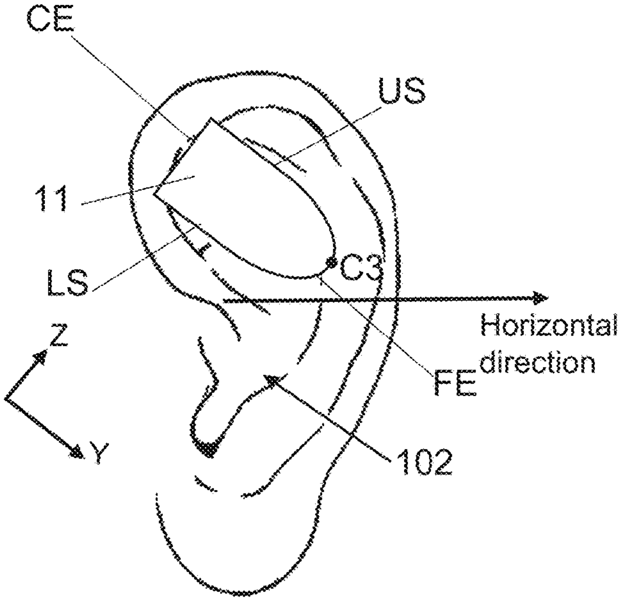
FIG. 22C is a schematic diagram illustrating an exemplary matching position of an open earphone and an ear canal of a user according to some embodiments of the present disclosure.

In the open earphones shown in FIGS. 22A-22C, at least part of the structure of the sound production component 11 may cover the antihelix region, which may fully expose the opening of the ear canal, and make the user better receive sounds from the external environment. In some embodiments, in order to consider the listening volume of the sound production component 11, the sound leakage reduction effect, the effect of receiving the sound of the external environment, and reducing the region between the end FE of the sound production component 11 and the inner contour 1014 of the auricle as much as possible in the wearing manner, to make the sound production component 11 have better acoustic output quality, the distance between the centroid O of the first projection and the contour of the second projection may be within a range of 13 mm-54 mm. Preferably, the distance between the centroid O of the first projection and the contour of the second projection may be within a range of 18 mm-50 mm. More preferably, the distance between the centroid O of the first projection and the contour of the second projection may be within a range of 20 mm-45 mm. In some embodiments, by controlling the distance between the centroid O of the first projection of the sound production component 11 on the sagittal plane of the head of the user and the contour of the second projection to be within a range of 23 mm-40 mm, the sound production component 11 may be roughly located in the antihelix region of the user, and at least part of the sound production component 11 may form the baffle with the antihelix region, to increase the sound path of the sound emitted from the pressure relief hole 113 to the external ear canal 101, thereby increasing the sound path difference from the sound outlet 112 and the pressure relief hole 113 to the external ear canal 101, increasing the sound intensity at the external ear canal 101, and reducing the volume of far-field sound leakage.

In some embodiments, in order to avoid that the distance between the centroid O of the first projection and the projection of the first portion 121 of the ear hook on the sagittal plane is too large to cause unstable wearing and the problem that the region between the end FE of the sound production component 11 and the inner contour 1014 of the auricle is relatively large, and avoid that the distance between the centroid O of the first projection and the projection of the first portion 121 of the ear hook 12 on the sagittal plane is too small to cause poor wearing comfort and be unable to match with the antihelix region to achieve relatively good acoustic output quality, the distance between the centroid O of the first projection of the sound production component 11 on the sagittal plane of the user and the first portion 121 of the ear hook on the sagittal plane may be controlled to be within 8 mm-45 mm. It can be understood that by controlling the distance to be within the range of 8 mm-45 mm, the first portion 121 of the ear hook may fit well with the rear inner side of the auricle of the user when wearing the open earphone, and the sound production component 11 may be ensured to be just located in on the antihelix region of the user, to make the sound production component 11 form the baffle with the antihelix region and increase the sound path of the sound emitted from the pressure relief hole 113 to the external ear canal 101, thereby increasing the sound path difference between the sound outlet 112 and the pressure relief hole 113 to the external ear canal 101, increasing the sound intensity at the external ear canal 101, and reducing the volume of far-field sound leakage. In addition, the distance between the centroid O of the first projection of the sound production component 11 on the sagittal plane of the user and the projection of the first portion 121 of the ear hook on the sagittal plane may be controlled to be within the range of 8 mm-45 mm, which may make the region between the end FE of the sound production component 11 and the inner contour 1014 of the auricle minimized to reduce the acoustic short circuit region around the sound production component 11, thereby increasing the listening volume at the opening of the ear canal of the user. Preferably, in order to further improve the wearing stability of the open earphone, in some embodiments, the distance between the centroid O of the first projection of the sound production component 11 on the sagittal plane of the user and the first portion 121 of the ear hook on the sagittal plane may be within a range of 10 mm-41 mm. More preferably, the distance between the centroid O of the first projection of the sound production component 11 on the sagittal plane of the user and the first portion 121 of the ear hook on the sagittal plane may be within a range of 13 mm-37 mm. More preferably, the distance between the centroid O of the first projection of the sound production component 11 on the sagittal plane of the user and the first portion 121 of the ear hook on the sagittal plane may be within a range of 15 mm-33 mm. Further preferably, the distance between the centroid O of the first projection of the sound production component 11 on the sagittal plane of the user and the first portion 121 of the ear hook on the sagittal plane may be within a range of 20 mm-25 mm.

In some embodiments, the ear hook 12 may be elastic, and may deform to a certain extent in the wearing state compared with the non-wearing state. For example, in some embodiments, the distance between the centroid O of the first projection of the sound production component 11 on the sagittal plane of the user and the first portion 121 of the ear hook on the sagittal plane in the wearing state may be greater than that in the non-wearing state. Exemplarily, in some embodiments, when the open-back earphone 100 is in the non-wearing state, the distance between the centroid of the projection of the sound production component 11 on a specific reference plane and the first portion 121 of the ear hook on the specific reference plane may be within a range of 6 mm-40 mm. Preferably, the distance between the centroid of the projection of the sound production component 11 on the specific reference plane and the first portion 121 of the ear hook on the specific reference plane may be within a range of 9 mm-32 mm. It can be understood that in some embodiments, by making the distance between the centroid of the projection of the sound production component 11 on the specific reference plane and the first portion 121 of the ear hook on the specific reference plane in the non-wearing state slightly smaller than that in the wearing state, when the open earphone 10 is in the wearing state, the ear hook and the sound production component may product a certain clamping force on the ear of the user, to improve the wearing stability for the user without affecting the wearing experience of the user. The content regarding the specific reference plane may be found elsewhere in the present disclosure, which is not repeated here.

In some embodiments, when the wearing state of the open earphone 10 is that at least part of the sound production component 11 covers the antihelix region of the user, the centroid O of the first projection of the sound production component 11 on the sagittal plane of the user may be located outside a projection region of the opening of the ear canal on the sagittal plane, making the opening of the ear canal fully open to better receive sound information from the external environment. The position of the centroid O of the first projection may be related to the dimension of the sound production component. If the dimension of the sound production component 11 in the long-axis direction Y or the short-axis direction Z is too small, the volume of the sound production component 11 may be relatively small, and then an area of a diaphragm inside the sound production component 11 may also be relatively small, resulting in low efficiency of the diaphragm pushing the air inside the housing of the sound production component 11 to produce sound, which may affect the acoustic output effect of the open earphone. When the dimension of the sound production component 11 in the long-axis direction Y is too large, the sound production component 11 may exceed the auricle, the inner contour of the auricle may not support and limit the sound production component 11, and thus the open earphone may be liable to fall off in the wearing state. In addition, if the dimension of the sound production component 11 in the longitudinal direction Y is too small, a gap may be formed between the end FE of the sound production component 11 and the inner contour 1014 of the auricle, and the sound emitted from the sound outlet 112 and the sound emitted from the pressure relief hole 113 may have acoustic short circuit in the region between the end FE of the sound production component 11 and the inner contour 1014 of the auricle, resulting in a decrease in the listening volume at the opening the ear canal of the user. The larger the region between the end FE of the sound production component 11 and the inner contour 1014 of the auricle, the more obvious the acoustic short circuit. When the dimension of the sound production component 11 in the short-axis direction Z is too large, the sound production component 11 may cover the opening of the ear canal of the user, affecting the user obtaining sound information from the external environment. In some embodiments, in order to make the sound production component have better acoustic output quality, when the open earphone is in the wearing state, the distance between the centroid of the first projection of the sound production component on the sagittal plane of the user and the centroid of the projection of the opening of the ear canal of the user on the sagittal plane may not be greater than 25 mm. Preferably, the distance between the centroid of the first projection of the sound production component on the sagittal plane of the user and the centroid of the projection of the opening of the ear canal of the user on the sagittal plane may be within a range of 5 mm-23 mm. More preferably, the distance between the centroid of the first projection of the sound production component on the sagittal plane of the user and the centroid of the projection of the opening of the ear canal of the user on the sagittal plane may be within a range of 8 mm-20 mm. In some embodiments, by controlling the distance between the centroid of the first projection of the sound production component on the sagittal plane of the user and the centroid of the projection of the opening of the ear canal of the user on the sagittal plane to be within the range of 10 mm-17 mm, the centroid O of the first projection may be roughly located in the antihelix region of the user. Therefore, the sound output by the sound production component may be better transmitted to the user, the opening of the ear canal may keep fully open to obtain the sound information from the external environment. Meanwhile, the inner contour of the auricle may also make at least part of the sound production component 11 be subjected to a force that hinders its downward movement, thereby improving the wearing stability of the open earphone 10 to a certain extent. It should be noted that the shape of the projection of the opening of the ear canal on the sagittal plane may be approximately regarded as an ellipse. Correspondingly, the centroid of the projection of the opening of the ear canal on the sagittal plane may be a geometric center of the ellipse.

In some embodiments, when the open earphone 10 is in the wearing state and at least part of the sound production component 11 covers the antihelix region of the user, a distance between the centroid O of the first projection U and a centroid W of a projection of the battery compartment 13 on the sagittal plane may vary to a certain extent compared with the wearing manner in which at least part of the sound production component 11 extends into the cavum concha of the user. It may be the same as the wearing manner in which at least part of the sound production component 11 extends into the cavum concha of the user. Referring to FIG. 19, in order to make the user have better stability and comfort when the user wears the open earphone 10, in the wearing state, a distance (sixth distance) between the centroid O of the projection of the sound production component 11 on the sagittal plane and the centroid W of the projection of the battery compartment 13 on the sagittal plane may be controlled to be within a range of 20 mm-31 mm. Preferably, the distance between the centroid O of the projection of the sound production component 11 on the sagittal plane and the centroid W of the projection of the battery compartment 13 on the sagittal plane may be within a range of 22 mm-28 mm. More preferably, the distance between the centroid O of the projection of the sound production component 11 on the sagittal plane and the centroid W of the projection of the battery compartment 13 on the sagittal plane may be within a range of 23 mm-26 mm. Due to the elasticity of the ear hook, in the wearing state and the non-wearing state of the open earphone 10, the distance between the centroid O of the projection corresponding to the sound production component 11 and the centroid W of the projection corresponding to the battery compartment 13 may vary. In some embodiments, in the non-wearing state, a distance (fifth distance) between the centroid O of the projection of the sound production component 11 on a specific reference plane and the centroid W of the projection of the battery compartment 13 on the specific reference plane may be within a range of 16.7 mm-25 mm. Preferably, in the non-wearing state, the distance between the centroid O of the projection of the sound production component 11 on the specific reference plane and the centroid W of the projection of the battery compartment 13 on the specific reference plane may be within a range of 18 mm-23 mm. More preferably, in the non-wearing state, the distance between the centroid O of the projection of the sound production component 11 on the specific reference plane and the centroid W of the projection of the battery compartment 13 on the specific reference plane may be within a range of 19.6 mm-21.8 mm.

Taking the specific reference plane as the sagittal plane for an example, in some embodiments, when the open earphone 10 is in the wearing state and the non-wearing state, a variation value (a ratio of a difference between the fourth distance and the third distance to the third distance) of the distance between the centroid O of the projection corresponding to the sound production component 11 and the centroid W of the projection corresponding to the battery compartment 13 may reflect a softness of the ear hook. It can be understood that when the softness of the ear hook is too large, the overall structure and shape of the open earphone 10 may not unstable, the sound production component 11 and the battery compartment 13 may not be strongly supported, the wearing stability may also be poor, and the open earphone 10 may be liable to fall off. Considering that the ear hook needs to be hung at a connection part between the auricle and the head, when the softness of the ear hook is too small, the open earphone 10 may not be liable to deform, and when the user wears the open earphone, the ear hook may stick tightly and even compress a region between the human ear and/or head, affecting the wearing comfort. Accordingly, in order to make the user have better stability and comfort when wearing the open earphone 10, in some embodiments, a ratio of the variation value of the distance between the centroid O of the first projection U and the centroid W of the projection of the battery compartment 13 on the sagittal plane in the wearing state and the non-wearing state of the open earphone 10 to the distance between the centroid O of the first projection U and the centroid W of the projection of the battery compartment 13 on the sagittal plane in the non-wearing state of the open earphone may be within a range of 0.3-0.7. Preferably, the ratio of the variation value of the distance between the centroid O of the projection on the sagittal plane and the centroid W of the projection of the battery compartment 13 on the sagittal plane in the wearing state and the non-wearing state of the open earphone 10 to the distance between the centroid O of the projection and the centroid W of the projection of the battery compartment 13 in the non-wearing state of the open earphone may be within a range of 0.45-0.68. The content regarding the specific reference plane may be found elsewhere in the present disclosure (e.g., FIG. 10A and FIG. 10B and corresponding content thereof).

In addition, while ensuring that the ear canal is not blocked, it is also considered that the dimension (especially the dimension along the long-axis direction Y of the first projection) of the baffle formed by the sound production component 11 and the antihelix region may be as large as possible, and the overall volume of the sound production component 11 may not be too large or too small. Therefore, on the premise that the overall volume or shape of the sound production component 11 is specific, a wearing angle of the sound production component 11 relative to the antihelix region may also be considered.

FIGS. 22A-22C are schematic diagrams illustrating different exemplary matching positions of an open earphone and an ear canal of a user according to some embodiments of the present disclosure. Referring to FIG. 22A, in some embodiments, when the sound production component 11 is a quasi-cuboid structure, the upper side surface US or the lower side surface LS of the sound production component 11 may be parallel to a horizontal plane (e.g., the ground plane) in the wearing state. Referring to FIG. 22B and FIG. 22C, in some embodiments, the upper side surface US or the lower side surface LS of the sound production component 11 may also be inclined at a certain angle relative to the horizontal plane. Referring to FIG. 22A and FIG. 22B, when the sound production component 11 is inclined upward relative to the horizontal direction, an inclination angle of the upper side surface US or the lower side surface LS of the sound production component 11 relative to the horizontal plane may be too large, which may cause the sound outlet 112 of the sound production component 11 to be away from the opening of the ear canal, affecting the listening volume at the opening of the ear canal of the user. Referring to FIG. 22A and FIG. 22C, when the sound production component is inclined downward relative to the horizontal direction, the inclination angle of the upper side surface US or the lower side surface LS of the sound production component 11 relative to the horizontal plane may be too large, which may cause the sound production component 11 to cover the opening of the ear canal, affecting user obtaining sound information from the external environment. Based on the above problems, in order to make the opening of the ear canal of the user have a better listening effect in the wearing state, and ensure that the opening of the ear canal of the user keeps fully open, in some embodiments, in the wearing state of the open earphone 10, an inclination angle of a projection of the upper side surface US or the lower side surface LS of the sound production component 11 on the sagittal plane relative to the horizontal direction may not be greater than 40°. Preferably, in the wearing state of the open earphone 10, the inclination angle of the projection of the upper side surface US or the lower side surface LS of the sound production component 11 on the sagittal plane relative to the horizontal direction may not be greater than 38°. More preferably, in the wearing state of the open earphone 10, the inclination angle of the projection of the upper side surface US or the lower side surface LS of the sound production component 11 on the sagittal plane relative to the horizontal direction may not be greater than 25°. More preferably, in the wearing state of the open earphone 10, the inclination angle of the projection of the upper side surface US or the lower side surface LS of the sound production component 11 on the sagittal plane relative to the horizontal direction may not be greater than 10°.

It should be noted that the inclination angle of the projection of the upper side surface US of the sound production component 11 on the sagittal plane relative to the horizontal direction may be the same as or different from the inclination angle of the projection of the lower side surface LS of the sound production component 11 on the sagittal plane relative to the horizontal direction. For example, when the upper side surface US is parallel to the lower side surface LS of the sound production component 11, the inclination angle of the projection of the upper side surface US on the sagittal plane relative to the horizontal direction and the inclination angle of the projection of the lower side surface LS on the sagittal plane relative to the horizontal direction may be the same. As another example, when the upper side surface US is not parallel to the lower side surface LS of the sound production component 11, or one of the upper side surface US and the lower side surface LS is a planar wall, and the other of the upper side surface US and the lower side surface LS is a non-planar wall (e.g., a curved wall), the inclination angle of the projection of the upper side surface US on the sagittal plane relative to the horizontal direction and the inclination angle of the projection of the lower side surface LS on the sagittal plane relative to the horizontal direction may be different. In addition, when the upper side surface US or the lower side surface LS is a curved surface or a concave-convex surface, the projection of the upper side surface US or the lower side surface LS on the sagittal plane may be a curved line or a broken line. Then the inclination angle of the projection of the upper sidewall on the sagittal plane relative to the horizontal direction may be an included angle between a tangent line of a point at which the curved line or the broken line has a largest distance relative to the ground plane and the horizontal direction, and the inclination angle of the projection of the lower sidewall on the sagittal plane relative to the horizontal direction may be an included angle between a tangent line of a point at which the curved line or the broken line has a smallest distance relative to the ground plane and the horizontal direction.

The whole or part structure of the sound production component 11 may cover the antihelix region to form a baffle. The listening effect when the user wears the open earphone 10 may be related to a distance between the sound outlet 112 and the pressure relief hole 113 of the sound production component 11. The closer the distance between the sound outlet 112 and the pressure relief hole 113, the more the sound emitted from the sound outlet 112 and the pressure relief hole 113 cancels out at the opening of the ear canal of the user, and the lower the listening volume at the opening of the ear canal of the user. The distance between the sound outlet 112 and the pressure relief hole 113 may be related to the dimension of the sound production component 11. For example, the sound outlet 112 may be arranged on a sidewall (e.g., the lower side surface LS or the inner side surface IS) of the sound production component 11 close to the opening of the ear canal of the user. The pressure relief hole 113 may be arranged on a sidewall (e.g., the upper side surface US or the outer side surface OS) of the sound production component 11 away from the opening of the ear canal of the user. Therefore, the dimension of the sound production component may affect the listening volume at the opening of the ear canal of the user. For example, if the dimension is too large, pressure may be brought to most region of the ear, affecting the wearing comfort of the user and the convenience of carrying around. In some embodiments, a distance between a midpoint of the projection of the upper side surface US and the lower side surface LS of the sound production component 11 on the sagittal plane and a highest point of the second projection may reflect the dimension of the sound production component 11 along the short-axis direction Z. Accordingly, in order to improve the listening effect of the open earphone 10 while ensuring that the open earphone 10 does not block the opening of the ear canal of the user, in some embodiments, when the wearing state of the open earphone 10 is that at least part of the sound production component 11 covers the antihelix region of the user, the distance between the midpoint of the projection of the upper side surface US of the sound production component 11 on the sagittal plane and the highest point of the second projection may be within a range of 12 mm-24 mm, and the distance between the midpoint of the projection of the lower side surface LS of the sound production component 11 on the sagittal plane and the highest point of the second projection may be within a range of 22 mm-34 mm. Preferably, the distance between the midpoint of the projection of the upper side surface US of the sound production component 11 on the sagittal plane and the highest point of the second projection may be within a range of 12.5 mm-23 mm, and the distance between the midpoint of the projection of the lower side surface LS of the sound production component 11 on the sagittal plane and the highest point of the second projection may be within a range of 22.5 mm-33 mm. It should be noted that, when the projection of the upper side surface US of the sound production component 11 on the sagittal plane is a curved line or a broken line, the midpoint of the projection of the upper side surface US of the sound production component 11 on the sagittal plane may be selected by the following exemplary method. A line segment may be drawn by selecting two farthest points on the projection of the upper side surface US on the sagittal plane along the major axis direction, a mid-perpendicular line may be drawn by selecting a midpoint on the line segment, and an interaction point of the mid-perpendicular line and the projection may be the midpoint of the projection of the upper side surface US of the sound production component 11 on the sagittal plane. In some alternative embodiments, a point on the projection of the upper side surface US on the sagittal plane with a smallest distance from the highest point of the second projection may be selected as the midpoint of the projection of the upper side surface US of the sound production component 11 on the sagittal plane. The midpoint of the projection of the lower side surface LS of the sound production component 11 on the sagittal plane may be selected in the same manner as above. For example, a point on the projection of the lower side surface LS on the sagittal plane with a largest distance from the highest point of the second projection may be selected as the midpoint of the projection of the lower side surface LS of the sound production component 11 on the sagittal plane.

In some embodiments, distances between midpoints of projections of the upper side surface US and the lower side surface LS of the sound production component 11 on the sagittal plane and the projection of the upper vertex of the ear hook on the sagittal plane may reflect the dimension of the sound production component 11 in the short-axis direction Z. In order to improve the listening effect of the open earphone 10 while ensuring that the open earphone 10 does not block the opening of the ear canal of the user, in some embodiments, the distance between the midpoint of the projection of the upper side surface US of the sound production component 11 on the sagittal plane and the projection of the vertex of the ear hook on the sagittal plane may be within a range of 13 mm-20 mm, and the distance between the midpoint of the projection of the lower side surface LS of the sound production component 11 on the sagittal plane and the projection of the vertex of the ear hook on the sagittal plane may be within a range of 22 mm-36 mm. Preferably, the distance between the midpoint of the projection of the upper side surface US of the sound production component 11 on the sagittal plane and the projection of the vertex of the ear hook on the sagittal plane may be within a range of 14 mm-19.5 mm, and the distance between the midpoint of the projection of the lower side surface LS of the sound production component 11 on the sagittal plane and the projection of the vertex of the ear hook on the sagittal plane may be within a range of 22.5 mm-35 mm. More preferably, the distance between the midpoint of the projection of the upper side surface US of the sound production component 11 on the sagittal plane and the projection of the vertex of the ear hook on the sagittal plane may be within a range of 15 mm-18 mm, and the distance between the midpoint of the projection of the lower side surface LS of the sound production component 11 on the sagittal plane and the projection of the vertex of the ear hook on the sagittal plane may be within a range of 26 mm-30 mm.

In some embodiments, under a condition that the open earphone 10 is in the wearing state where at least a portion of the sound production component 11 covers the antihelix region of the user, when the sound outlet 112 is provided on the inner side surface IS of the housing 111, in order to prevent the ear structure from blocking the sound outlet 112, a projection of the sound outlet 112 on the sagittal plane may partially or entirely coincide with a projection of an inner concave structure (e.g., the cymba concha 103) of the ear on the sagittal plane. In some embodiments, since the cymba concha 103 is communicated with the cavum concha 102 and the ear canal is located in the cavum concha 102, when at least a portion of the projection of the sound outlet 112 on the sagittal plane is located within the cymba concha 103, the sound output from the sound outlet 112 may reach the ear canal unobstructed, resulting in a higher sound volume received by the ear canal. In some embodiments, in order to ensure that the projection of the sound outlet 112 on the sagittal plane may be partially or entirely located within the cymba concha region, when the user wears the open earphone 10, a distance between the center $O_3$ of the sound output 112 and the upper vertex of the ear hook is in a range of 17.5 mm-27.0 mm. In some embodiments, when the user wears the open earphone 10, distance between the center $O_3$ of the sound output 112 and the upper vertex of the ear hook is in a range of 20.0 mm-25.5 mm. In some embodiments, when the user wears the open earphone 10, the distance between the center $O_3$ of the sound output 112 and the upper vertex of the ear hook is in a range of 21.0 mm-24.5 mm. In some embodiments, when the user wears the open earphone 10, the distance between the center $O_3$ of the sound output 112 and the upper vertex of the ear hook is in a range of 22.0 mm-23.5 mm. In some embodiments, when the user wears the open earphone 10, the distance between the center $O_3$ of the sound output 112 and the upper vertex of the ear hook is in a range of 22.5 mm-23.0 mm.

In some embodiments, when the open earphone 10 is in the wearing state where at least a portion of the sound production component 11 covers the antihelix region of the user, a ratio of the distance between the center $O_3$ of the sound outlet 112 and the upper vertex of the ear hook to the short-axis dimension of the sound production component 11 may not be too large or too small. In some embodiments, when the distance between the center $O_3$ of the sound output 112 and the upper vertex of the ear hook is a constant, if the above-mentioned ratio is too small, the short-axis dimension of the sound production component 11 may be too large. This may result in a larger overall weight of the sound production component and a smaller distance between the housing and the ear hook, making the user uncomfortable when wearing the open earphone. When the above-mentioned ratio is too large, the short-axis dimension of the sound production component 11 may be too small. This may result in a smaller area in which the transducer of the sound production component 11 may drive air, thereby reducing the sound generation efficiency of the sound production component. Therefore, in order to ensure a sufficiently high sound generation efficiency of the sound production component 11, improve the wearing comfort of the user, and make the projection of the sound outlet 112 on the sagittal plane at least partially located in the cymba concha region, when the user wears the open earphone 10, the ratio of the distance between the center $O_3$ of the sound outlet 112 and the upper vertex of the ear hook to the short-axis dimension of the sound production component 11 is in a range of 0.95-1.55. In some embodiments, the ratio of the distance between the center $O_3$ of the sound outlet 112 and the upper vertex of the ear hook to the short-axis dimension of the sound production component 11 is in a range of 1.05-1.45. In some embodiments, the ratio of the distance between the center $O_3$ of the sound outlet 112 and the upper vertex of the ear hook to the short-axis dimension of the sound production component 11 is in a range of 1.15-1.35. In some embodiments, the ratio of the distance between the center $O_3$ of the sound outlet 112 and the upper vertex of the ear hook to the short-axis dimension of the sound production component 11 is in a range of 1.20-1.30.

In the wearing manner shown in FIG. 19, due to the proximity of the sound outlet 112 to the ear canal on the inner side surface IS, a ratio of the distance between the center $O_3$ of the sound outlet 112 and the upper vertex of the ear hook to a distance between the center $O_3$ of the sound outlet 112 and the upper side surface US of the sound production component 11 may not be too large. In addition, to ensure sufficient gap between the sound production component 11 and the upper vertex of the ear hook (to prevent excessive pressure on the ear by the sound production component 11 and the ear hook 12), the ratio of the distance between the center $O_3$ of the sound outlet 112 and the upper vertex of the ear hook to the distance between the center $O_3$ of the sound outlet 112 and the upper side surface US of the sound production component 11 may not be too small. In some embodiments, when the user wears the open earphone 10, the ratio of the distance between the center $O_3$ of the sound outlet 112 and the upper vertex of the ear hook to the distance between the center $O_3$ of the sound outlet 112 and the upper side surface US of the sound production component 11 is in a range of 1.19-2.5. Preferably, the ratio of the distance between the center $O_3$ of the sound outlet 112 and the upper vertex of the ear hook to the distance between the center $O_3$ of the sound outlet 112 and the upper side surface US of the sound production component 11 is in a range of 1.5-1.8.

In the wearing manner shown in FIG. 19, due to the proximity of the sound outlet 112 to the ear canal on the inner side surface IS, a ratio of the distance between the center $O_3$ of the sound outlet 112 and the upper vertex of the ear hook to a distance between the center $O_3$ of the sound outlet 112 and the lower side surface LS of the sound production component 11 may not be too small. Additionally, in order to ensure that the sound outlet hole has a sufficient area (to avoid an excessively large acoustic impedance resulted from an excessively small area of the sound outlet), a width of the sound outlet 112 may not be too small, thus the ratio of the distance between the center $O_3$ of the sound outlet 112 and the upper vertex of the ear hook to the distance between the center $O_3$ of the sound outlet 112 and the lower side surface LS of the sound production component 11 may not be too large either. In some embodiments, when the user wears the open earphone 10, the ratio of the distance between the center $O_3$ of the sound outlet 112 and the upper vertex of the ear hook to the distance between the center $O_3$ of the sound outlet 112 and the lower side surface LS of the sound production component 11 is in a range of 6.03-9.05. Preferably, the ratio of the distance between the center $O_3$ of the sound outlet 112 and the upper vertex of the ear hook to the distance between the center $O_3$ of the sound outlet 112 and the lower side surface LS of the sound production component 11 is in a range of 7-8.

Referring to FIG. 22A, in some embodiments, the upper side surface US or the lower side surface LS of the sound production component 11 may be parallel or approximately parallel to the horizontal plane in the wearing state, and the end FE of the sound production component 11 may be located between the inner contour 1014 of the auricle and the edge of the cavum concha 102, i.e., the midpoint C3 of the projection of the end FE of the sound production component 11 on the sagittal plane may be located between the projection of the inner contour 1014 of the auricle on the sagittal plane and the projection of the edge of the cavum concha 102 on the sagittal plane. As shown in FIG. 22B and FIG. 22C, in some embodiments, the upper side surface US or the lower side surface LS of the sound production component 11 may also be inclined at a certain angle relative to the horizontal plane in the wearing state. As shown in FIG. 22B, the end FE of the sound production component 11 may be inclined toward the region of the top of the auricle relative to the connecting end CE of the sound production component 11, and the end FE of the sound production component 11 may abut against the inner contour 1014 of the auricle. As shown in FIG. 22C, the connecting end CE of the sound production component 11 may be inclined toward the region of the top of the auricle relative to the end FE of the sound production component 11, and the end FE of the sound production component 11 may be located between the edge of the cavum concha 102 and the inner contour 1014 of the auricle. That is to say, the midpoint C3 of the projection of the end FE of the sound production component 11 on the sagittal plane may be located between the projection of the inner contour 1014 of the auricle on the sagittal plane and the projection of the edge of the cavum concha 102 on the sagittal plane. In some embodiments, the midpoint C3 of the projection of the end FE of the sound production component 11 on the sagittal plane may be located between the projection of the inner contour 1014 of the auricle on the sagittal plane and the projection of the edge of the concha cavity 102 on the sagittal plane. In the wearing state, if the midpoint C3 of the projection of the end FE of the sound production component 11 on the sagittal plane is too small relative to the projection of the edge of the cavum concha 102 on the sagittal plane, the end FE of the sound production component 11 may not abut against the inner contour 1014 of the auricle, the sound production component 11 may not be limited and may be easy to fall off. If the midpoint C3 of the projection of the end FE of the sound production component 11 on the sagittal plane is too large relative to the projection of the edge of the cavum concha 102 on the sagittal plane, the sound production component 11 may squeeze the inner contour 1014 of the auricle, causing discomfort to the user after a long time of wearing. In order to ensure that the open earphone 10 has a better listening effect and ensure the wearing comfort and stability for the user, in some embodiments, a distance between the midpoint C3 of the projection of the end FE of the sound production component 11 on the sagittal plane and the projection of the edge of the cavum concha on the sagittal plane may not be greater than 15 mm. Preferably, the distance between the midpoint C3 of the projection of the end FE of the sound production component 11 on the sagittal plane and the projection of the edge of the cavum concha on the sagittal plane may not be greater than 13 mm. More preferably, the distance between the midpoint C3 of the projection of the end FE of the sound production component 11 on the sagittal plane and the projection of the edge of the cavum concha on the sagittal plane may not be greater than 11 mm. In addition, considering that a gap is formed between the end FE of the sound production component 11 and the inner contour 1014 of the auricle, the sound emitted from the sound outlet and the sound emitted from the pressure relief hole may have acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. In order to ensure the listening volume when the user wears the open earphone 10, in some embodiments, the end FE of the sound production component 11 may abut against the inner contour 1014 of the auricle, to make the acoustic short circuit between the end FE of the sound production component 11 and the inner contour 1014 of the auricle closed, thereby increasing the listening volume at the opening of the ear canal.

It should be noted that, when the projection of the end FE of the sound production component 11 on the sagittal plane is a curved line or a broken line, the midpoint C3 of the projection of the end FE of the sound production component 11 on the sagittal plane may be selected by the following exemplary method. A line segment may be drawn by selecting two farthest points on the projection of the end FE on the sagittal plane along the short-axis direction Z, a mid-perpendicular line may be drawn by selecting a midpoint on the line segment, and an interaction point of the mid-perpendicular line and the projection may be the midpoint C3 of the projection of the end FE of the sound production component 11 on the sagittal plane. In some embodiments, when the end FE of the sound production component 11 is a curved surface, a tangent point where a tangent line parallel to the short-axis direction Z on the projection may also be selected as the midpoint of the projection of the end FE of the sound production component 11 on the sagittal plane.

In addition, in some embodiments of the present disclosure, the distance between the midpoint of the projection of the end FE of the sound production component 11 on the sagittal plane and the projection of the edge of the cavum concha on the sagittal plane refers to a minimum distance between the midpoint of the projection of the end FE of the sound production component 11 on the sagittal plane and the projection region of the edge of the cavum concha on the sagittal plane. The distance between the midpoint C3 of the projection of the end FE of the sound production component 11 on the sagittal plane and the projection of the edge of the cavum concha on the sagittal plane refers to a distance between the midpoint C3 of the projection of the end FE of the sound production component 11 on the sagittal plane and the projection of the edge of the cavum concha on the sagittal plane in the sagittal axis.

In some embodiments, in order to make part or the whole structure of the sound production component cover the antihelix region when the user wears the open earphone as shown in FIG. 19 and FIG. 21, a certain included angle may be formed between the upper side surface US of the sound production component 11 and the second portion 122 of the ear hook. Similar to the principle that at least part of the sound production component extends into the cavum concha, referring to FIG. 14A, the included angle may be represented by an included angle β between the projection of the upper side surface US of the sound production component 11 on the sagittal plane and a tangent line 126 of a projection of a connection part between the second portion 122 of the ear hook and the upper side surface US of the sound production component 11 on the sagittal plane. Specifically, the upper sidewall of the sound production component 11 and the second portion 122 of the ear hook may have the connection part. The projection of the connection part on the sagittal plane may be a point U. The tangent line 126 of the projection of the second portion 122 of the ear hook on the sagittal plane may be drawn through the point U. When the upper side surface US is a curved surface, the projection of the upper side surface US on the sagittal plane may be a curved line or a broken line. At this time, the included angle between the projection of the upper side surface US on the sagittal plane and the tangent line 126 may be an included angle between a tangent line to a point at which the curved line or the broken line has a largest distance from the ground plane and the tangent line 126. In some embodiments, when the upper side surface US is the curved surface, a tangent line parallel to the long-axis direction Y on the projection may also be selected, and an included angle between the tangent line and the horizontal direction may be used to represent the inclination angle between the projection of the upper side surface US on the sagittal plane and the tangent line 126. In some embodiments, the included angle β may be within a range of 45°-110°. Preferably, the included angle β may be within a range of 60°-100°. More preferably, the included angle β may be within a range of 80°-95°.

The human head is approximately regarded as a quasi-sphere structure, and the auricle is a structure that protrudes relative to the head. When the user wears the open earphone, part of the ear hook 12 may be attached to the head of the user. In order to make the sound production component 11 in contact with the anthelix region, in some embodiments, a certain inclination angle may be formed between the sound production component 11 and the ear hook plane when the open earphone is in the wearing state. The inclination angle may be represented by an included angle between a plane corresponding to the sound production component 11 and the ear hook plane. In some embodiments, the plane 11 corresponding to the sound production component 11 may include an outer side and an inner side. In some embodiments, when the outer side surface or the inner side surface of the sound production component 11 is a curved surface, the plane corresponding to the sound production component 11 refers to a tangent plane corresponding to the curved surface at a center position, or a plane roughly coinciding with a curve enclosed by the edge contour of the curved surface. Taking the inner side surface of the sound production component 11 as an example, the included angle formed between the inner side and the ear hook plane may be the inclination angle of the sound production component 11 relative to the ear hook plane.

Considering that if the angle is too large, the contact area between the sound production component 11 and the antihelix region of the user may be small, sufficient contact resistance may not be provided, and the open earphone may be liable to fall off when the user wears the open earphone. In addition, the dimension (especially the dimension along the long-axis direction Y of the sound production component 11) of the baffle formed by the antihelix region covered by at least part of the sound production component 11 may be too small, and the sound path difference from the sound outlet and the pressure relief hole to the external ear canal 101 may be small, affecting the listening volume at the opening of the ear canal of the user. Furthermore, the dimension of the sound production component 11 along the long-axis direction Y may be too small, the region between the end FE of the sound production component 11 and the inner contour 1014 of the auricle may be relatively large, and the sound emitted from the sound outlet and the sound emitted from the pressure relief hole may have the acoustic short circuit in the region between the end FE of the sound production component 11 and the inner contour 1014 of the auricle, resulting in a decrease in the listening volume at the opening of the ear canal of the user. In order to ensure that the user has a better listening effect when wearing the open earphone 10, while ensuring the wearing stability and comfort, for example, in some embodiments, when the wearing manner of the open earphone is that at least part of the sound production component covers the antihelix region of the user, and the open earphone is in the wearing state, the inclination angle of the plane corresponding to the sound production component 11 relative to the ear hook plane may not be greater than 8°. Therefore, the sound production component 11 and the antihelix region of the user may have a relatively large contact region, improving the wearing stability. Meanwhile, most of the structure of the sound production component 11 may be located in the antihelix region, making the opening of the ear canal completely open, and facilitating the user to receive the sound from the external environment. Preferably, the inclination angle of the plane corresponding to the sound production component 11 relative to the ear hook plane may be within a range of 2°-7°. More preferably, the inclination angle of the plane corresponding to the sound production component 11 relative to the ear hook plane may be within a range of 3-6°.

Due to the elasticity of the ear hook, the inclination angle of the sound production component relative to the ear hook plane may vary to a certain extent in the wearing state and the non-wearing state. For example, the inclination angle in the non-wearing state may be smaller than that in the wearing state. In some embodiments, when the open earphone is in the non-wearing state, the inclination angle of the sound production component relative to the ear hook plane may be within a range of 0°-6°. By making the inclination angle of the sound production component relative to the ear hook plane in the non-wearing state slightly smaller than that in the wearing state, the ear hook of the open earphone 10 may clamp the ear of the user (e.g., the antihelix region) when the open earphone is in the wearing state. Therefore, the wearing stability for the user may be improved without affecting the wearing experience of the user. Preferably, in the non-wearing state, the inclination angle of inclination of the sound production component relative to the ear hook plane may be within a range of 1°-6°. More preferably, in the non-wearing state, the inclination angle of the sound production component relative to the ear hook plane may be within a range of 2°-5°.

When the dimension of the sound production component 11 in the thickness direction X is too small, the volume of the front cavity and the rear cavity formed by the diaphragm and the housing of the sound production component 11 may be too small, the vibration amplitude of the vibration may be limited, and a large sound volume may not be provided. When the dimension of the sound production component 11 in the thickness direction X is too large, the overall dimension or weight of the sound production component 11 is relatively large in the wearing state, which may affect the wearing stability and comfort. In some embodiments, in order to ensure that the sound production component 11 has a better acoustic output effect and ensure the wearing stability, in some embodiments, when the wearing mode of the open earphone is that at least part of the sound production component covers the antihelix region of the user, and the open earphone is in the wearing state, a distance between a point on the sound production component farthest from the ear hook plane and the ear hook plane may be within a range of 12 mm-19 mm, and a distance between a point on the sound production component closest to the ear hook plane and the ear hook plane may be within a range of 3 mm-9 mm. Preferably, when the open earphone is in the wearing state, the distance between the point on the sound production component farthest from the ear hook plane and the ear hook plane may be within a range of 13.5 mm-17 mm, and the distance between the point on the sound production component closest to the ear hook plane and the ear hook plane may be within a range of 4.5 mm-8 mm. More preferably, when the open earphone is in the wearing state, the distance between the point on the sound production component farthest from the ear hook plane and the ear hook plane may be within a range of 14 mm-17 mm, and the distance between the point on the sound production component closest to the ear hook plane and the ear hook plane may be within a range of 5 mm-7 mm. In some embodiments, by controlling the distance between the point on the sound production component farthest from the ear hook plane and the ear hook plane to be within the range of 12 mm-19 mm, and controlling the distance between the point on the sound production component closest to the ear hook plane and the ear hook plane to be within the range of 3 mm-9 mm, the dimension of the sound production component along the thickness direction X and the long-axis direction Y may be constrained, at least part of the sound production component may cooperate with the antihelix region of the user to form the baffle, and the open earphone may be ensured to have better wearing comfort and stability. The overall structure of the open earphone shown in FIG. 19 and FIG. 21 may be roughly the same as that of the open earphone shown in FIG. 14A and FIG. 14B. The content regarding the inclination angle of the sound production component relative to the ear hook plane in the open earphone shown in FIG. 19 and FIG. 21, and the distance between the point on the sound production component 11 farthest from the ear hook plane and the ear hook plane may be found in FIG. 14A and FIG. 14B.

In some embodiments, when the wearing manner of the open earphone 10 is that at least part of the sound production component covers the antihelix region of the user, and the open earphone is in the wearing state, at least part of the sound production component 11 may be subjected to an antihelix force to prevent from sliding down, thereby ensuring the acoustic output effect of the sound production component 11, and improving the wearing stability of the open earphone through the force of the antihelix region on the sound production component 11. At this time, the sound production component 11 may have a certain inclination angle relative to the auricle surface of the user. When the inclination angle of the sound production component 11 relative to the auricle surface is large, the sound production component 11 may abuts against the antihelix region, and the user may feel a strong sense of discomfort after wearing the open earphone for a long time. Therefore, in order to make the user have better stability and comfort when wearing the open earphone, and make that the sound production component 11 have a better acoustic output effect, the inclination angle of the sound production component of the open earphone relative to the auricle surface may be within a range of 5°-40° in the wearing state. Preferably, in some embodiments, in order to further optimize the acoustic output quality and the wearing experience of the open earphone in the wearing state, the inclination angle of the sound production component relative to the auricle surface may be controlled to be within a range of 8°-35°. More preferably, the inclination angle of the sound production component relative to the auricle surface may be controlled to be within a range of 15°-25°. It should be noted that the inclination angle of the sidewall of the sound production component 11 away from the head of the user or facing the opening of the ear canal of the user relative to the auricle surface of the user may be a sum of an included angle γ1 between the auricle surface and the sagittal plane and an included angle γ2 between the sidewall of the sound production component 11 away from the head of the user or facing the opening of the ear canal of the user and the sagittal plane. The content regarding the inclination angle of the sound production component relative to the auricle surface may be found elsewhere in the embodiments of the present disclosure (e.g., FIG. 15 and related descriptions thereof).

The basic concepts have been described above, and it is apparent to those skilled in the art that the foregoing detailed disclosure is intended as an example only and does not constitute a limitation of the present disclosure. Although not expressly stated herein, a person skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

The specific embodiments disclosed in the present disclosure are provided Merely by way of example. One or more technical features in specific embodiments are optional or additional and do not constitute necessary technical features of the inventive concept of the present disclosure. In other words, the scope of protection of the present disclosure encompasses and extends beyond the specific embodiments disclosed herein.

What is claimed is:

1. An earphone, comprising:

a sound production component including a transducer and a housing accommodating the transducer; and an ear hook, wherein in a wearing state, the ear hook is configured to place the sound production component at a position near an ear canal but not blocking the ear canal, wherein the sound production component is provided with a sound outlet on an inner side surface facing an auricle for guiding a sound generated by the transducer out of the housing and to the ear canal, the sound production component and the auricle have a first projection and a second projection on a sagittal plane, respectively, a centroid of the first projection has a first distance from a highest point of the second projection in a vertical axis direction, a ratio of the first distance to a height of the second projection in the vertical axis direction is in a range of 0.25-0.6, and a ratio of a distance from a center of the sound outlet to a lower side surface of the sound production component to a short-axis dimension of the sound production component is in a range of 0.25-0.50.

2. The earphone of claim 1, wherein the ratio of the distance from the center of the sound outlet to the lower side surface of the sound production component to the short-axis dimension of the sound production component is in a range of 0.35-0.40.

3. The earphone of claim 1, wherein the centroid of the first projection has a second distance from an end point of the second projection in a sagittal axis direction, a ratio of the second distance to a width of the second projection in the sagittal axis direction is in a range of 0.4-0.7, and a ratio of a distance from the center of the sound outlet to a rear side surface of the sound production component to a long-axis dimension of the sound production component is in a range of 0.35-0.60.

4. The earphone of claim 1, wherein, in the wearing state, a distance between a projection point of the center of the sound outlet on the sagittal plane and a centroid of a projection of an ear canal opening of the ear canal on the sagittal plane is in a range of 2.2 mm-3.8 mm.

5. The earphone of claim 1, wherein, in a non-wearing state, an inclination angle of an outer side surface or the inner side surface of the sound production component relative to an ear hook plane is in a range of 15°–23°.

6. The earphone of claim 1, wherein, in the wearing state, an inclination angle of the outer side surface or the inner side surface of the sound production component relative to an auricle plane is in a range of 40°-60°.

7. The earphone of claim 1, wherein the transducer includes a magnetic circuit assembly, the magnetic circuit assembly is used to provide a magnetic field, and a distance from the center of the sound outlet to a long-axis center plane of the magnetic circuit assembly is in a range of 1.45 mm-2.15 mm.

8. The earphone of claim 1, wherein, in the wearing state, a ratio of a distance between a projection point of the center of the sound outlet on the sagittal plane and a projection point of a midpoint of an upper boundary of the sound production component's inner side surface on the sagittal plane to a distance between the projection point of the midpoint of the upper boundary of the sound production component's inner side surface on the sagittal plane and a projection point of an upper vertex of the ear hook on the sagittal plane is in a range of 0.35-0.60.

9. The earphone of claim 1, wherein, in the wearing state, a ratio of a distance between a projection point of the center of the sound outlet on the sagittal plane and a projection point of a midpoint of a lower boundary of the sound production component's inner side surface on the sagittal plane to a distance between the projection point of the midpoint of the lower boundary of the sound production component's inner side surface on the sagittal plane and a projection point of an upper vertex of the ear hook on the sagittal plane is in a range of 6.1-9.6.

10. The earphone of claim 1, wherein a distance between a projection point of a midpoint of an upper boundary of the sound production component's inner side surface on the sagittal plane and a centroid of a projection of an ear canal opening of the ear canal on the sagittal plane is in a range of 12 mm-18 mm, or a distance between the centroid of the first projection and the centroid of the projection of the ear canal opening on the sagittal plane is in a range of 10 mm-16 mm.

11. The earphone of claim 1, wherein a distance between a projection point of a ⅓ point of a lower boundary of the sound production component's inner side surface on the sagittal plane and a centroid of a projection of an ear canal opening of the ear canal on the sagittal plane is in a range of 1.7 mm-2.7 mm, or a distance between the centroid of the first projection and the centroid of the projection of the ear canal opening on the sagittal plane is in a range of 10 mm-16 mm.

12. The earphone of claim 1, wherein, in the wearing state, a ratio of a distance between the center of the sound outlet and an upper vertex of the ear hook to the short-axis dimension of the sound production component is in a range of 1.2-2.2.

13. The earphone of claim 12, wherein, in the wearing state, a ratio of a distance between a projection point of the center of the sound outlet on the sagittal plane and a projection point of the upper vertex of the ear hook on the sagittal plane to a short-axis dimension of the first projection is in a range of 1.7-2.6.

14. The earphone of claim 1, wherein, in the wearing state, a ratio of a distance between the center of the sound outlet and an upper vertex of the ear hook to a distance from the center of the sound outlet to the sound production component's upper side surface is in a range of 1.9-2.95.

15. The earphone of claim 14, wherein, in the wearing state, a ratio of a distance between a projection point of the center of the sound outlet on the sagittal plane and a projection point of the upper vertex of the ear hook on the sagittal plane to a distance from the projection point of the center of the sound outlet on the sagittal plane to a projection of the sound production component's upper side surface on the sagittal plane is in a range of 2.8-4.3.

16. The earphone of claim 1, wherein, in the wearing state, a ratio of a distance between the center of the sound outlet and an upper vertex of the ear hook to a distance between the center of the sound outlet and a midpoint of an upper boundary of the sound production component's inner side surface is in a range of 1.8-2.8.

17. The earphone of claim 16, wherein, in the wearing state, a ratio of a distance between a projection point of the center of the sound outlet on the sagittal plane and a projection point of the upper vertex of the ear hook on the sagittal plane to a distance between the projection point of the center of the sound outlet on the sagittal plane and a projection point of the midpoint of the upper boundary of the sound production component's inner side surface on the sagittal plane is in a range of 1.75-2.70.

18. The earphone of claim 1, wherein, in the wearing state, a ratio of a distance between the center of the sound outlet and an upper vertex of the ear hook to a distance between the center of the sound outlet and a ⅓ point of a lower boundary of the sound production component's inner side surface is in a range of 4.9-7.5.

19. The earphone of claim 18, wherein, in the wearing state, a ratio of a distance between a projection point of the center of the sound outlet on the sagittal plane and a projection point of the upper vertex of the ear hook on the sagittal plane to a distance between the projection point of the center of the sound outlet on the sagittal plane and a projection point of the ⅓ point of the lower boundary of the sound production component's inner side surface on the sagittal plane is in a range of 4.8-7.4.

20. The earphone of claim 18, wherein in the wearing state, the ratio of the distance between the center of the sound outlet and the upper vertex of the ear hook to the distance between the center of the sound outlet and the ⅓ point of the lower boundary of the sound production component's inner side surface is in a range of 5.5-7.

* * * * *